(12) United States Patent
Kuriyama et al.

(10) Patent No.: US 7,161,872 B2
(45) Date of Patent: Jan. 9, 2007

(54) FISHING DATA DISPLAY DEVICE

(75) Inventors: Hiroaki Kuriyama, Wakayama (JP); Yuzo Kawabe, Osaka (JP); Hirokazu Hirayama, Osaka (JP); Kazuhito Yamamoto, Osaka (JP); Masakazu Nomura, Osaka (JP); Hiroyasu Fujimoto, Hyogo (JP); Yasushi Fukuda, Hyogo (JP); Hiroyuki Hamato, Hyogo (JP); Koichi Kobayashi, Hyogo (JP)

(73) Assignee: Shimano Inc., Osaka (JP)

( * ) Notice: Subject to any disclaimer, the term of this patent is extended or adjusted under 35 U.S.C. 154(b) by 100 days.

(21) Appl. No.: 10/999,079

(22) Filed: Nov. 30, 2004

(65) Prior Publication Data

US 2005/0162976 A1 Jul. 28, 2005

(30) Foreign Application Priority Data

| Dec. 4, 2003 | (JP) | .............................. 2003-405726 |
| Dec. 4, 2003 | (JP) | .............................. 2003-405727 |
| Jan. 16, 2004 | (JP) | .............................. 2004-009177 |

(51) Int. Cl.
*G01S 15/96* (2006.01)

(52) U.S. Cl. ...................................... 367/111; 367/107

(58) Field of Classification Search ................ 367/107, 367/111; 43/4, 25
See application file for complete search history.

(56) References Cited

U.S. PATENT DOCUMENTS

| 4,995,009 A * | 2/1991 | Altmire et al. ............. 367/107 |
| 5,253,220 A | 10/1993 | Wilson, Sr. et al. |
| 5,771,205 A | 6/1998 | Currier et al. |
| 6,595,315 B1 | 7/2003 | Fujimoto et al. |
| 6,628,569 B1 | 9/2003 | Steiner et al. |
| 2002/0053617 A1* | 5/2002 | Nanbu ........................ 242/223 |

FOREIGN PATENT DOCUMENTS

| JP | 05-196732 A | 8/1993 |
| JP | 2003-274823 A | 9/2003 |

* cited by examiner

*Primary Examiner*—Ian J. Lobo
(74) *Attorney, Agent, or Firm*—Global IP Counselors, LLP

(57) ABSTRACT

A fish depth monitor is a device that can display first water depth data that indicates the location of terminal tackle that is engaged on fishing line reeled out from a spool, and second water depth data that indicates the location of the bottom of a fishing location transmitted from a fish finder, and includes a case, first and second reception portions, a display unit, and a control unit. The first and second reception portions receive the first water depth data from an electric driven reel and the second water depth data from the fish finder. The control unit graphically displays the received first and second water depth data in positions that correspond to the water depth on the display unit. It is possible to intuitively determine the positional relationship between the location of the terminal tackle and the location of the bottom.

13 Claims, 39 Drawing Sheets

FISHING DATA DISPLAY DEVICE

BACKGROUND OF THE INVENTION

1. Field of the Invention

The present invention relates to a fishing data display device. More particularly the present invention relates to a fishing data display device that is capable of displaying first water depth data of a tackle engaged on fishing line reeled out from the spool, second water depth data that is obtained from the fish finder and shows the bottom position of the fishing location, and third water depth data that shows the position at which fish are gathered.

2. Background Information

Fishing reels that have a water depth display device called a counter, which is arranged on the reel unit and employs, for example, a liquid crystal display are known. Among such water depth display devices, those that are capable of displaying bottom location data for the fishing location (one example of the second water depth data), which are received from a fish finder, are also known (see for example Japanese unexamined patent application publication 2003-274823). With this type of fishing reel, for example, tackle position data (one example of the first water depth data) will be calculated with the line length data (which is based upon the number of spool rotations). The rig position data will be displayed together with the bottom position data and the position of the location where fish are gathered as measured from above the bottom, if the rig is dropped to the bottom first and lifted up to the location where the fish are gathered.

With this type of conventional fishing reel, the reeling out of the fishing line is stopped according to the position of the location of fish, which is measured from the bottom using the bottom position data from the fish finder. Because of this, the rig can be positioned to the location of fish by dropping the tackle from above or dropping the rig to the bottom and lifting it up to the location of the fish, depending on how the bottom is.

With the aforementioned conventional configuration, bottom position data from the fish finder is numerically displayed on the water depth display device, and thus the position on of the bottom can be accurately determined. However, because the rig position data and the bottom position data are only numerically displayed, it is difficult to quickly determined the relationship between these data. Moreover, because the location at which fish gather is set by operating a fish position memo switch on the reel, the location at which fish position cannot be accurately determined if that location is constantly changing.

In view of the above, it will be apparent to those skilled in the art from this disclosure that there exists a need for an improved fishing data display device that overcomes the problems of the conventional art. This invention addresses this need in the art as well as other needs, which will become apparent to those skilled in the art from this disclosure.

SUMMARY OF THE INVENTION

An object of the present invention is to make it possible to intuitively determine the relationship between the tackle position and the bottom position.

Another object of the present invention is to make it possible to accurately determine the location at which fish are present even when that location is constantly changing.

A fishing data display device in accordance with the first aspect of the present invention is adapted to communicate with a fish finder and be operatively coupled to a fishing reel. A fishing line with a terminal tackle is adapted to be reeled out from a spool of the fishing reel. The fishing data display device includes a case, a first reception portion, a second reception portion, a display unit, and a control unit. The first reception portion is arranged in the case and is configured to receive from the fishing reel first water depth data that indicates a location of the terminal tackle. The second reception portion is arranged in the case and is configured to receive from the fish finder second water depth data that indicates a location of a bottom of a fishing location. The display unit is arranged in the case so as to be visible from an exterior. The control unit is operatively coupled to the first and second reception portions and the display unit, the control unit being configured to graphically display the first and second water depth data on the display unit, so as to show a positional relationship of the terminal tackle and the bottom of the fishing location.

With this fishing data display device, when the first water depth data that indicates the location of the terminal tackle is received and the second data that indicates the location of the bottom of the fishing location is received from the fish finder, these data will be repeatedly graphically displayed on the display unit in positions which correspond to the water depths. Here, because the first water depth data that indicates the location of the terminal tackle and the second water depth data that indicates the location of the bottom are displayed graphically, rather than as numerical values, in positions that correspond to the water depth, the positional relationship between the location of the tackle and the location of the bottom can be instantly determined.

A fishing data display device in accordance with the second aspect of the present invention is the device disclosed in accordance with the first aspect, in which the second reception portion is further configured to receive from the fish finder third water depth data that indicates a location at which fish are gathered; and the control unit is further configured to graphically display the first and second water depth data as well as the third water depth data on the display unit, so as to show a positional relationship of the terminal tackle, the bottom of the fishing location, and the fish location.

With this configuration, because the third water depth data that indicates the location of fish output from the fish finder is also displayed, together with the first and second water depth data, in positions that correspond to their water depths, the location of fish can be accurately determined even if the location of the fish changes minute by minute. Also, because the relationship between the tackle and the location of the fish are graphically displayed, the fisherman can quickly understand whether the terminal tackle is accurately locate where fish are gathered.

A fishing data display device according to in accordance with the third aspect of the present invention is the device in accordance with the first or the second aspect, in which the control unit is further configured to display at least one of the first and second water depth data as a numerical value on the display unit. With this configuration, data is displayed both graphically and with numerical values, and thus it will be easier to determine the location of the terminal tackle and the location of the bottom.

A fishing data display device in accordance with the fourth aspect of the present invention is the device in accordance with the second or third aspect, in which the control unit is further configured to display the first, second and third water depth data on the display unit chronologically and graphically. With this configuration, because the location of the terminal tackle, the location of the bottom, and the location of fish are chronologically displayed, changes thereof can be easily identified.

A fishing data display device in accordance with the fifth aspect of the present invention is the device in accordance with any of the first through fourth aspects, in which the control unit is further configured to correct the first water depth data based on the second water depth data to obtain corrected first water depth data, and the control unit is further configured to display the corrected first water depth data on the display unit. With this configuration, even if the amount of line reeled out of the spool is greater than the actual water depth of the terminal tackle due to the impact of tidal currents and the like, a more accurate water depth of the terminal tackle can be obtained because the first water depth data can be corrected by the second water depth data in which a relatively accurate water depth is obtained.

A fishing data display device in accordance with the sixth aspect of the present invention is the device in accordance with any of the first through fifth aspects, in which the case is arranged on a fishing reel. With this configuration, at least the first and second water depth data can be graphically displayed on the fishing reel, and thus better visibility can be assured.

A fishing data display device in accordance with the seventh aspect of the present invention is the device disclosed in accordance with any of the first through fifth aspects of the invention, in which the case is arranged separately from the fishing reel, and the fishing reel is adapted to transmit the first water depth data to the fishing data display device. With this configuration, because the display of data can be performed separately from operation of the fishing reel, limitations on the display area can be reduced, and a display unit having a wider display area can be used. Because of this, the water depth data that will be displayed will be easily seen since the display device is separate from the fish reel.

A fishing data display device in accordance with the eighth aspect of the present invention in accordance with any of the fifth through seventh aspects of the invention, in which the control unit is further configured to graphically display the corrected first water depth data on the display unit.

With this fishing data display device, when the correction initiation signal is output, the corrected first water depth data will be obtained from the first water depth data based upon the first water depth data and the second water depth data received at that point, and thereafter the corrected first water depth data will be displayed on the display unit. Because of this, a more accurate water depth of the terminal tackle will be obtained, and if for example water depth data on the location of fish is repeatedly displayed with the first water depth data that indicates the water depth of the terminal tackle, the fisherman can instantly determine whether or not the terminal tackle is placed in the location of the fish. Here, the first water depth data can be corrected based upon the first water depth data obtained from the fishing reel and second water depth data which is obtained from the fish finder and relatively accurate, and because the corrected first water depth data will be displayed on the display unit, the water depth of the terminal tackle can be more accurately displayed even if the fishing line is curved due to tidal currents.

A fishing data display device in accordance with the ninth aspect of the present invention is the device in accordance with the eighth aspect of the present invention, in which the corrected first water depth data is obtained by first calculating a correction coefficient which is obtained by dividing the second water depth data with the first water depth data, and then multiplying the correction coefficient by the first water depth data. With this configuration, a quick correction process can be performed with a simple calculation.

A fishing data display device in accordance with the tenth aspect of the present invention is the device in accordance with the eight or the ninth aspect of the present invention, in which the control unit is configured to assume a position correction mode and to obtain the corrected first water depth data when the control unit is in the position correction mode. With this configuration, because the control unit can perform the correction when correction is needed, correction can be performed in response to the demands of a fisherman.

A fishing data display device in accordance with the eleventh aspect of the present invention is the device in accordance with any of the fifth through tenth aspects of the present invention, further including an operation key unit that a fisherman is adapted to operate. The control unit is configured to assume the position correction mode when the fisherman operates the operation key unit and sets the position correction mode. With this configuration, because the correction process will be performed when the fisherman performs a correction initiation operation.

A fishing data display device in accordance with the twelfth aspect of the present invention is the device in accordance with any of the second through eleventh aspects of the present invention, in which the display unit is configured to assume one of a standard display mode and an enlarged display mode, and the control unit is configured to display each of the first, second and third water depth data in one of the standard display mode and the enlarged display mode so as to show a positional relationship of the terminal tackle, the bottom of the fishing location, and the fish location, and is further configured to switch the display mode in which any of the first, second and third water depth data is displayed.

With this fishing data display device, when the first through third water depth data are received, the received water depth data will be graphically displayed on the display unit to correspond to the water depth thereof. In addition, when the control unit switches the display mode, the water depth data will be displayed in an enlarged view. Here, in the event that the water depth is deep, water depth data that corresponds to the water depth thereof will be displayed in an enlarged view by switching the display mode to the enlarged display mode. Because of this, water depth data obtained from the fish finder will be easy to see, regardless of how deep the water depth of the bottom is, by using the enlarged display mode and the standard display mode in accordance with the water depth to be displayed.

A fishing data display device in accordance with the thirteenth aspect of the present invention is the device in accordance with the twelfth aspect of the present invention, further including an operation key unit that a fisherman is adapted to operate. The control unit is configured to switch the display mode between the standard mode and the enlarged display mode when the fisherman operates the operation key unit to request a mode switch. With this configuration, because the display mode can be switched by operating the operation key unit, the display can be switched to match the needs of the fisherman.

A fishing data display device in accordance with the fourteenth aspect of the present invention is the device in accordance with the twelfth aspect of the present invention, in which the control unit is configured to switch the display mode between the standard mode and the enlarged display mode based on the second water depth data obtained from the fish finder. With this configuration, the display mode will automatically switch to the enlarged display mode when the water depth is deep, and thus the fishing data obtained from the fish finder will be easy to see even if no operation is performed.

A fishing data display device in accordance with the fifteenth aspect of the present invention is the device in accordance with any of the twelfth through fourteenth aspects of the present invention, in which the control unit is further configured to display the first, second and third water depth data on the display unit chronologically and graphically, and when the display mode is switched to the enlarged display mode, the control unit graphically displays the first water depth data that is in a range between a half a maximum water depth of the second water depth data and the maximum second water depth data. With this configuration, the display image will be easy to see because the display range will be restricted when in the enlarged display mode.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a lateral view of the handle side in accordance with the first embodiment of the present invention with a side cover removed and with the clutch on;

FIG. 13 is a lateral view of the side opposite the handle in accordance with the first embodiment of the present invention with a side cover removed and with the clutch on;

FIG. 15 is an enlarged lateral view of a first one-way clutch and the first clutch return mechanism in accordance with the first embodiment of the present invention when the clutch is on;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
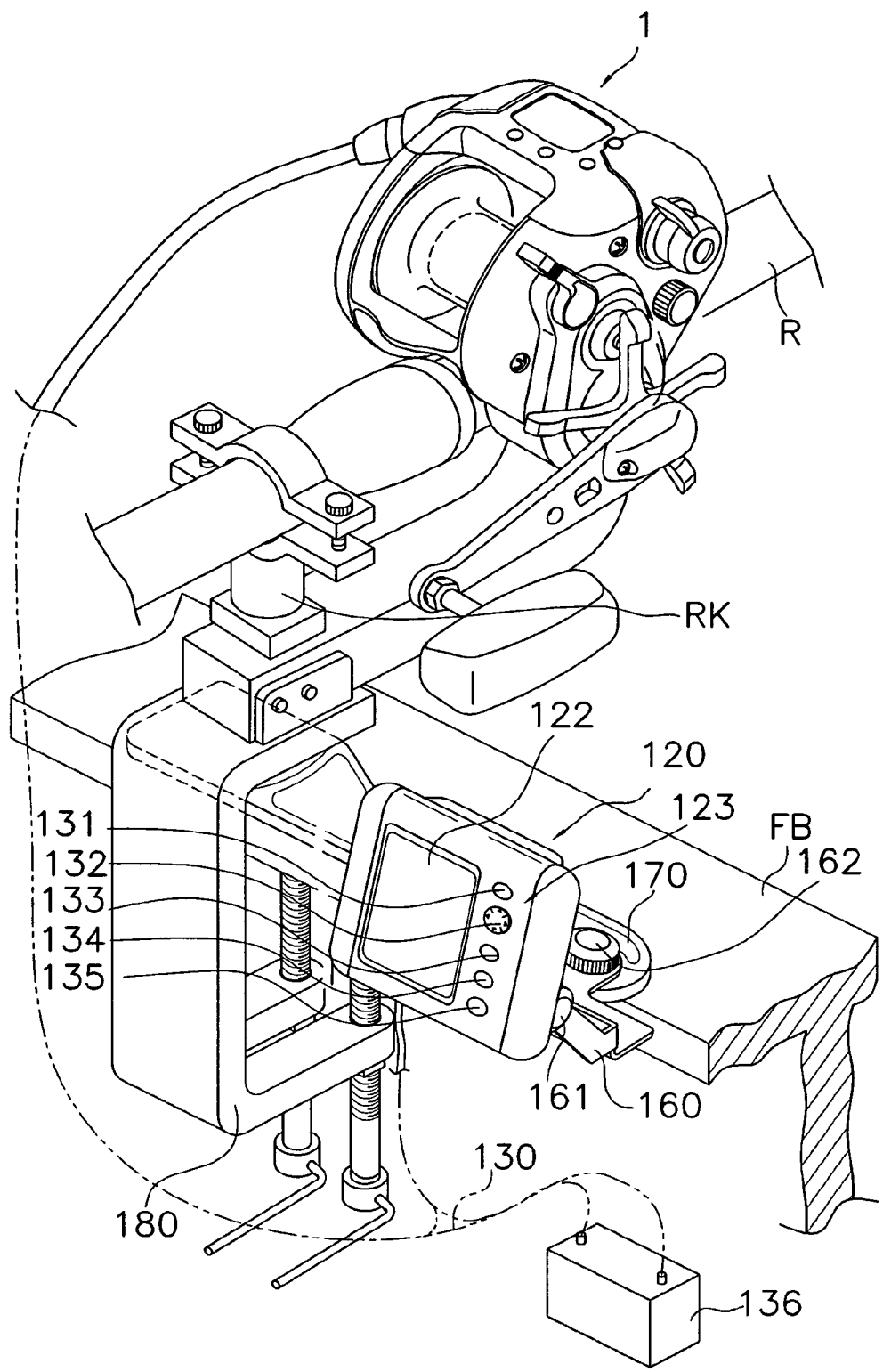
FIG. 1 is an oblique view showing an example of the connection between an electric reel and a fish finder monitor in accordance with a first embodiment of the present invention.
Figure 2:
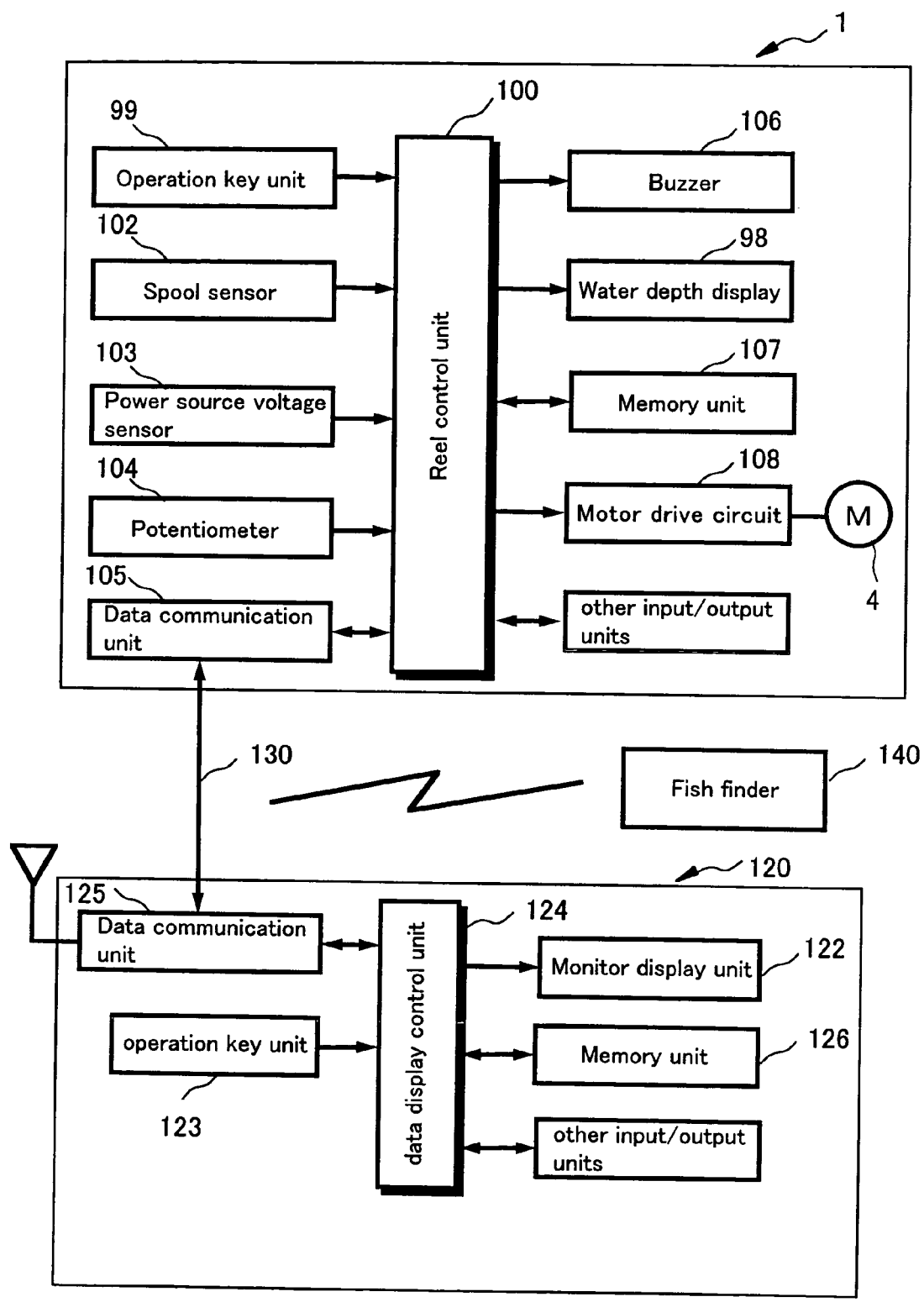
FIG. 2 is a block diagram of a fishing data display system in which an embodiment of the present invention is adopted in accordance with the first embodiment of the present invention.

As shown in FIGS. 1 and 2, a fishing display system in accordance with an embodiment of the present invention includes an electric driven reel 1, a fish finder monitor (one example of a fishing data display device) 120 that is arranged to allow data to be transmitted to and received from the electric driven reel 1, and a fish finder 140.

The electric driven reel 1 and the fish finder monitor 120 are connected together with a wire. More specifically, as shown in FIG. 2, data is transmitted to and received by the electric driven reel 1 and the fish finder monitor 120 through a communication line that is inserted in a power cord 130, which branches into two lines from a battery 136 (a power source) that supplies electric power to the electric driven reel 1 and the fish finder monitor 120. The communication line passes through the branched portion of the power cord 130, and connects the electric driven reel 1 and the fish finder monitor 120. In addition, the monitor 120 receives data from the fish finder 140 through, for example, a predetermined low power type of wireless communication. Note that when in the vicinity of a plurality of fish finders 140, the fish finder monitor 120 will receive only the strongest radio waves in order to prevent interference.

Configuration of the Fish Finder Monitor

The fish finder monitor 120 can echo-display the water depth of the bottom of the fishing location (one example of the second water depth data) and the position of a school of fish (one example of the third water depth data) that are obtained from the fish finder 140. The fish finder monitor 120 can also display the water depth data of the rig obtained from the electric driven reel 1 (one example of the first water depth data) as a graphical image so as to indicate a position that corresponds to the water depth, along with the bottom position or the position of the school of fish that are echo-displayed. In addition, the fish finder monitor 120 can perform configurations of the electric driven reel 1, such as turning on and off the fish location stop function and setting the fish position, turning the jig mode on and off and setting the jig width, turning the auto jig mode on and off, turning on and off the line dispatch mode, which reels out fishing line by the motor rotation operation in the line release direction, turning on and off the fish strike detection mode, and the like. Note that the fish finder monitor 120 can be used independently by not being connected to the electric driven reel 1. In that case, the fish finder monitor 120 will function as a remote monitor of the fish finder 140 that displays the location of fish and the bottom position, which are the data sent from the fish finder 140.

Figure 3:
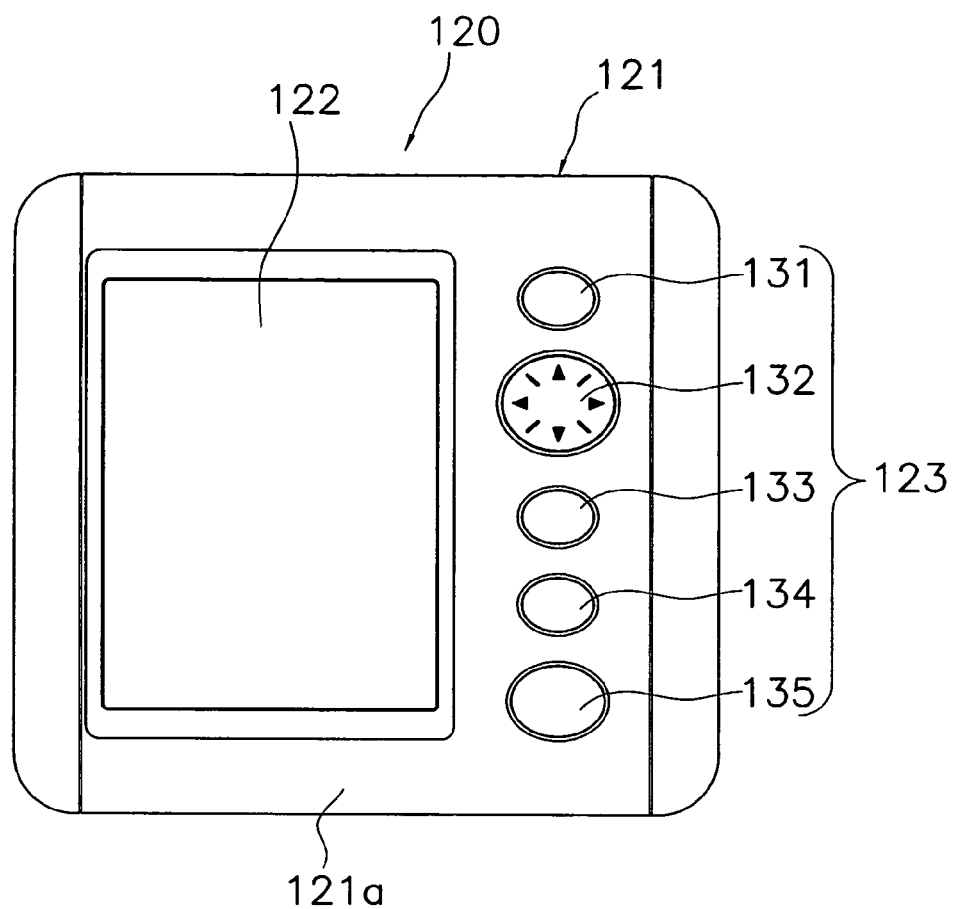
FIG. 3 is a plan view of the fish finder monitor in accordance with the first embodiment of the present invention.

As shown in FIGS. 1 and 3, the fish finder monitor 120 includes a case 121, a monitor display unit 122 that is mounted on the case 121 and an operation key unit 123. The monitor display unit 122 includes, for example, a liquid crystal display. The operation key unit 123 is exposed from the case 121 and includes 5 buttons 131–135 that are vertically arranged on the right side of the monitor display unit 122.

As shown in FIG. 1, an attachment bracket 160 is mounted on the fish finder monitor 120. When the fish finder monitor 120 is to be mounted on the boat side FB together with the rod mount RK, the attachment bracket 160 will be mounted on a fixing stand 170. The fixing stand 170 uses a vise 180 of the rod mount RK and is fixedly coupled to the boat side FB. In addition, when fishing is performed without using the rod mount (like during jigging), the attachment bracket 160 can also be directly mounted on a specialized vise (not shown in the figures). Furthermore, in the event that a stand which can be pre-screwed onto the fishing boat is installed on, for example, the edge of the boat, the attachment bracket 160 can be directly installed on the stand.

Figure 4:
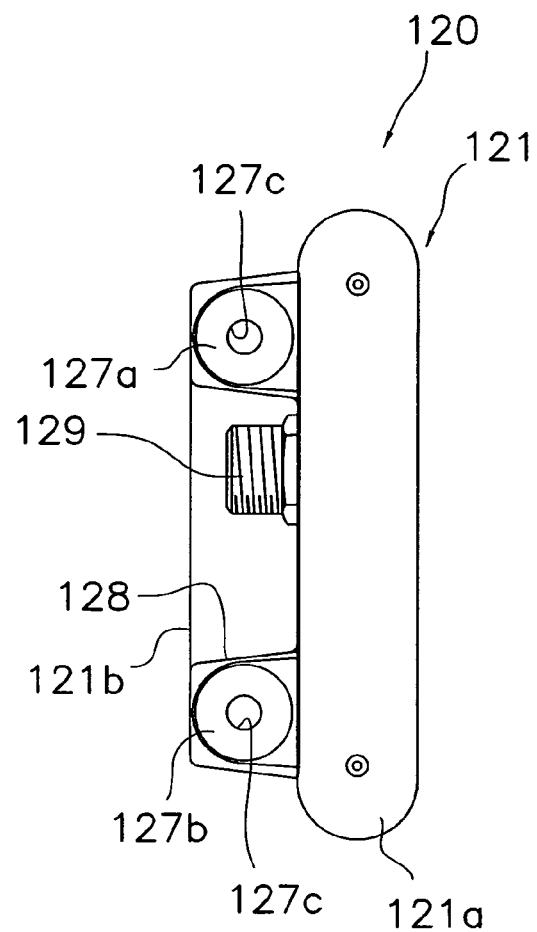
FIG. 4 is a lateral view of the fish finder monitor in accordance with the first embodiment of the present invention.
Figure 5:
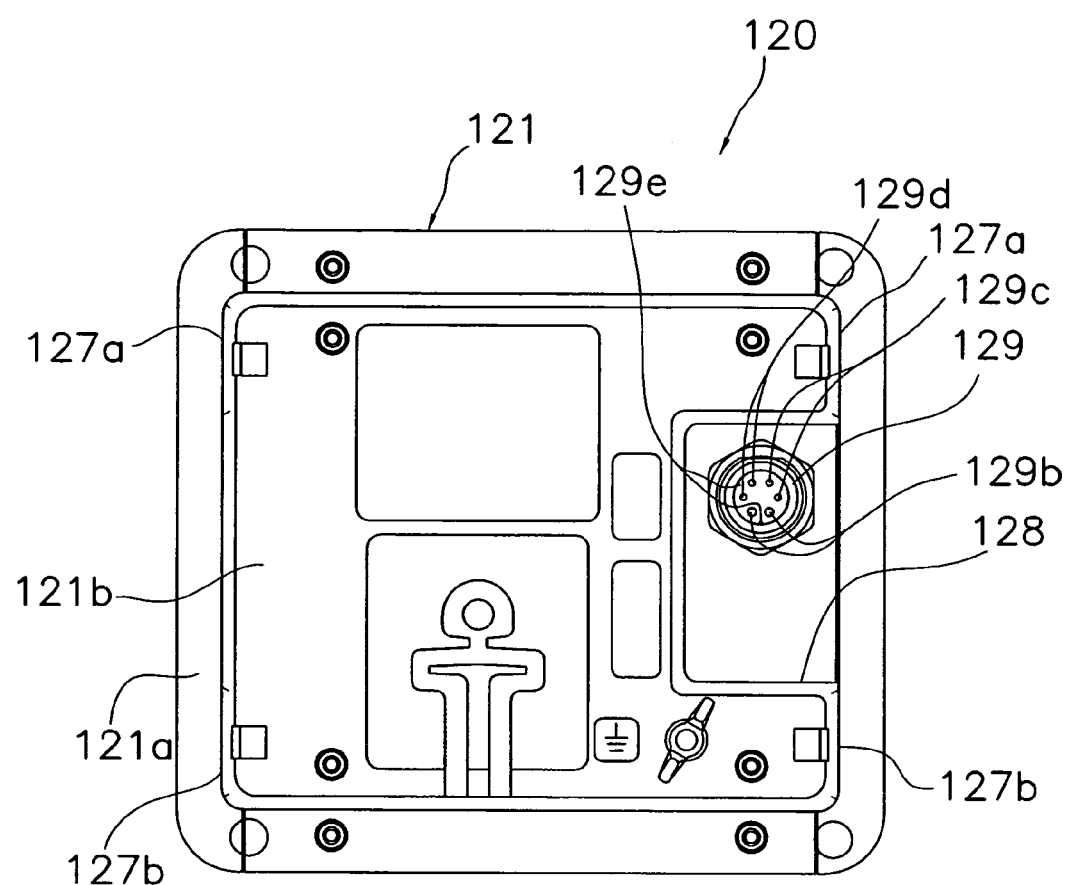
FIG. 5 is a rear view of the fish finder monitor in accordance with the first embodiment of the present invention.

As shown in FIGS. 3 to 5, the case 121 includes a display unit 121a in which the four sides thereof are rounded, and a box unit 121b that is arranged on the rear side of the display unit 121a. As shown in FIG. 4, a pair of attachment units 127a, 127b that include screw holes 127c are arranged across a vertical gap on both side surfaces of the box unit 121b. The attachment bracket 160 is mounted on either of the vertical attachment portions 127a, 127b with a screw member 161 (FIG. 1). In this manner, the fish finder monitor 120 is mounted on the attachment bracket 160.

As shown in FIG. 5, a recessed portion 128 is formed in the rear side of the box unit 121a, and two screw type sockets 129 are vertically aligned and mounted in the recessed portion 128. The power cord 130 for linking the fish finder monitor 120 and the electric driven reel 1 can be connected to the sockets 129. Thus, in addition to two power terminals 129b, two each of communication terminals 129c, 129d, to which the communication line is connected and which serve to transmit data to and receive data from the electric driven reel 1, are arranged on the sockets 129. Note that one each of the two respective communication terminals 129c, 129d for transmitting and receiving are earth terminals. In addition, positioning projections 129e are arranged in the circumferential direction in each respective socket 129, and serve to prevent mistakes in the power cord connection.

A screen switch button 131 of the operation key unit 123 is a button which switches the display of the monitor display unit 122 between a menu display and a fish finder display. A cursor button 132 is a button that serves to move a cursor up, down, left, and right in a menu process that performs various settings of the fish finder 120 and the electric driven reel 1. The set button 133 is a button which serves to select the item on which the cursor is placed during various settings. A jig on/off button 134 is a button that is used for the initiation of jig movement. An on/off button 135 is a button that serves to turn the display on and off.

As shown in FIG. 2, a data display control unit 124 is arranged in the interior of the case 121. The data display control unit 12 has a liquid crystal drive circuit, and a microcomputer that includes a CPU, a RAM, a ROM, an I/O interface, and the like and performs display control and jig control. A data communication unit 125 that serves to exchange data with the fish finder 140 and the electric driven reel 1, the 5 buttons 131–135 of the operation key unit 123, a monitor display unit 122 that serves to perform various displays, a memory unit 126 that stores various data, and other input/output units, are connected to the data display control unit 124.

The monitor display unit 122 employs, for example, a monochrome 4 grey scale dot matrix type liquid crystal display having 320 horizontal dots and 240 vertical dots.

When the data display control unit 124 obtains water depth data LX of the rig from the electric driven reel 1, the data display control unit 124 will graphically display the water depth data LX on the monitor display unit 122. When the data display control unit 124 obtains from the fish finder 140 echo data of the bottom location of the current fishing location, numerical data on the bottom location, and echo data on the location of the fish, the data display control unit 124 will display these data on the monitor display unit 122 together with the rig water depth data LX transmitted from the electric driven reel 1. In addition, various settings of the electric driven reel 1 can also be set by menu operation, such as for example turning on and off a manual jig mode (a mode in which the motor is turned on and off in a predetermined pattern by an operation of the jig on/off button 134), turning on and off an auto-jig mode (a mode in which the motor is automatically turned on and off in a predetermined pattern at the location where fish are present), configuring the jig range when in the auto-jib mode or the manual jig mode (the water depth up to which the jigging is to be performed starting from the location where fish are present or other location at which the jigging is to be initiated), and the jig pattern (at what interval the motor 4 is to be turned on and off).

Overall Configuration of the Electric Driven Reel

Figure 6:
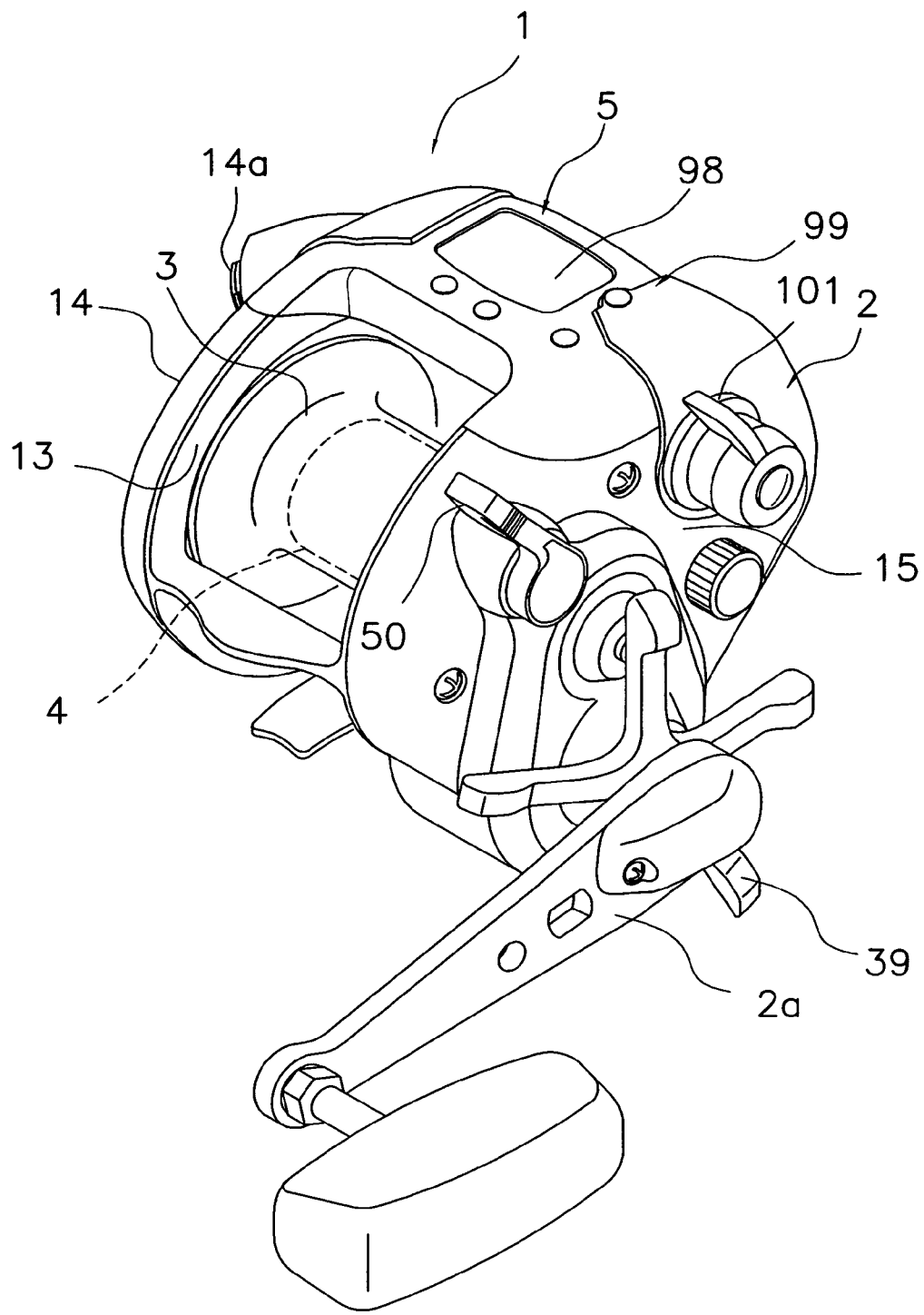
FIG. 6 is an oblique view of the electric reel in accordance with the first embodiment of the present invention.

The electric driven reel 1 is fixedly coupled to a fishing rod R that is mounted on the boat side FB of a fishing boat with, for example, the rod mount RK. As shown in FIG. 6, the electric driven reel 1 primarily includes a reel unit 2 on which a handle 2a is mounted, a spool 3 that is rotatively mounted on the reel unit 2, and a motor 4 that is mounted inside the spool 3. A counter 5 having a water depth display unit 98 is mounted on the upper portion of the reel unit 2. In addition, an adjustment lever 101 that serves to vary the rotation of the spool 3 is pivotably mounted on the front side of the reel unit 20, and a clutch operation lever 50 that serves to turn a clutch mechanism 7 (described below) on and off is pivotably mounted on the rear side of the reel unit 20.

The adjustment lever 101 is mounted to the reel unit 2 so as to be pivotable in a range of approximately 140 degrees, and a potentiometer 104 (FIG. 8) that serves to detect the pivot angle is linked to the pivot shaft of the adjustment lever 101 via three lead lines. The potentiometer 104 can detect rotational angles in a range from zero degrees to 270 degrees, and for example will detect a pivot angle of the adjustment lever 101 in a range from 50 degrees to 190 degrees.

Figure 8:
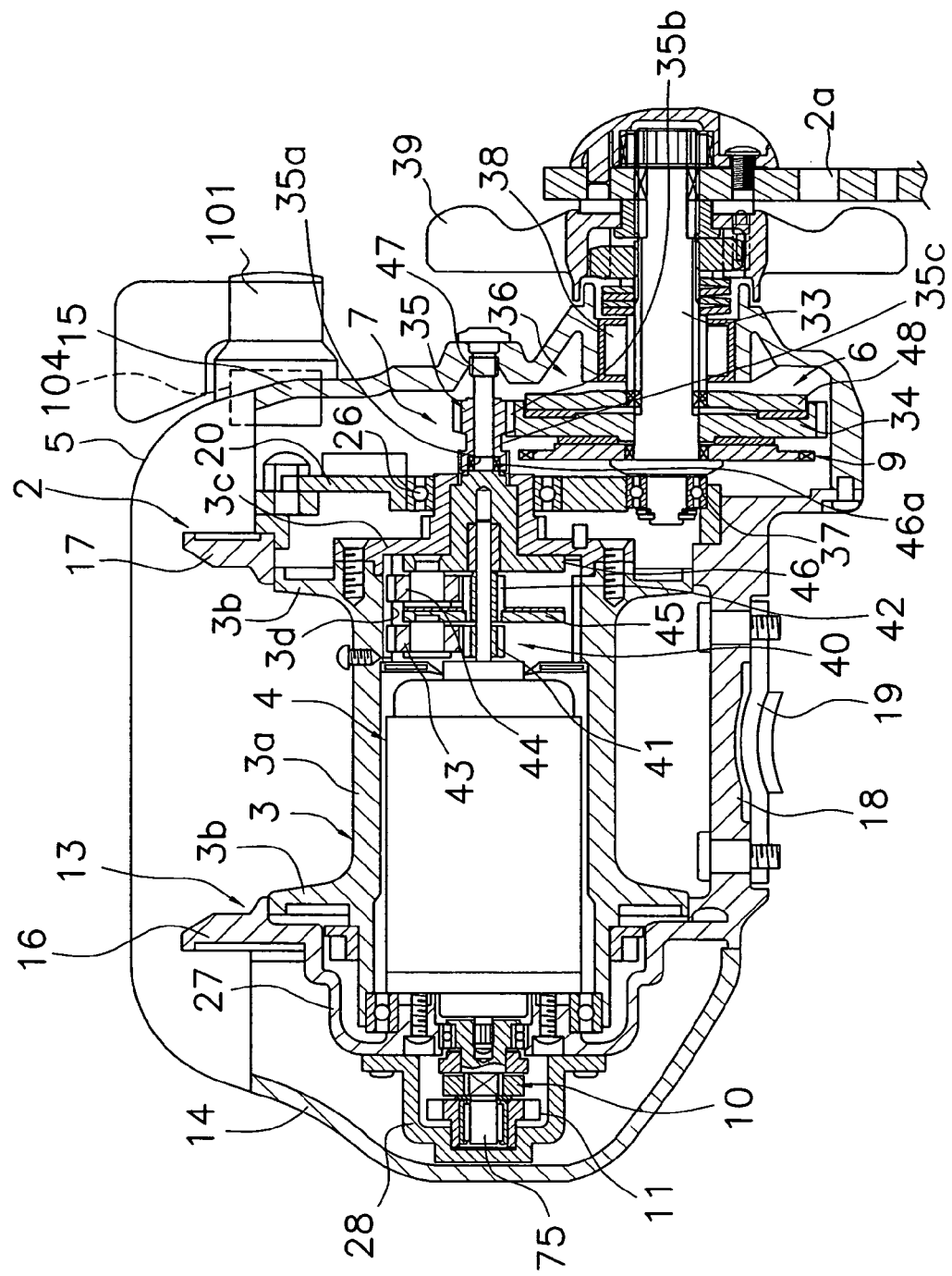
FIG. 8 is a cross-sectional view of the electric reel in accordance with the first embodiment of the present invention.

As shown in FIG. 8, the interior of the reel unit 2 includes a rotation transmission mechanism 6 that transmits the rotation of the handle 2a to the spool 3 and transmits the rotation of the motor 4 to the spool 3, a clutch mechanism 7 that is arranged along the rotation transmission mechanism 6, a clutch switching mechanism 8 (FIG. 11) that switches the clutch mechanism 7, a first one way clutch 9 that prevents the reverse rotation of the handle 2a in the line release direction, a second one way clutch 10 that prevents the reverse rotation of the motor 4 in the line release direction, a first clutch return mechanism 11 that returns the clutch mechanism 7 to the clutch-on state by reverse rotation of the motor 4, and a second clutch return mechanism 12 (FIG. 11) that returns the clutch mechanism 7 to the clutch-on state by rotation of the handle 2a in the line winding direction.

Configuration of the Reel Unit

Figure 7:
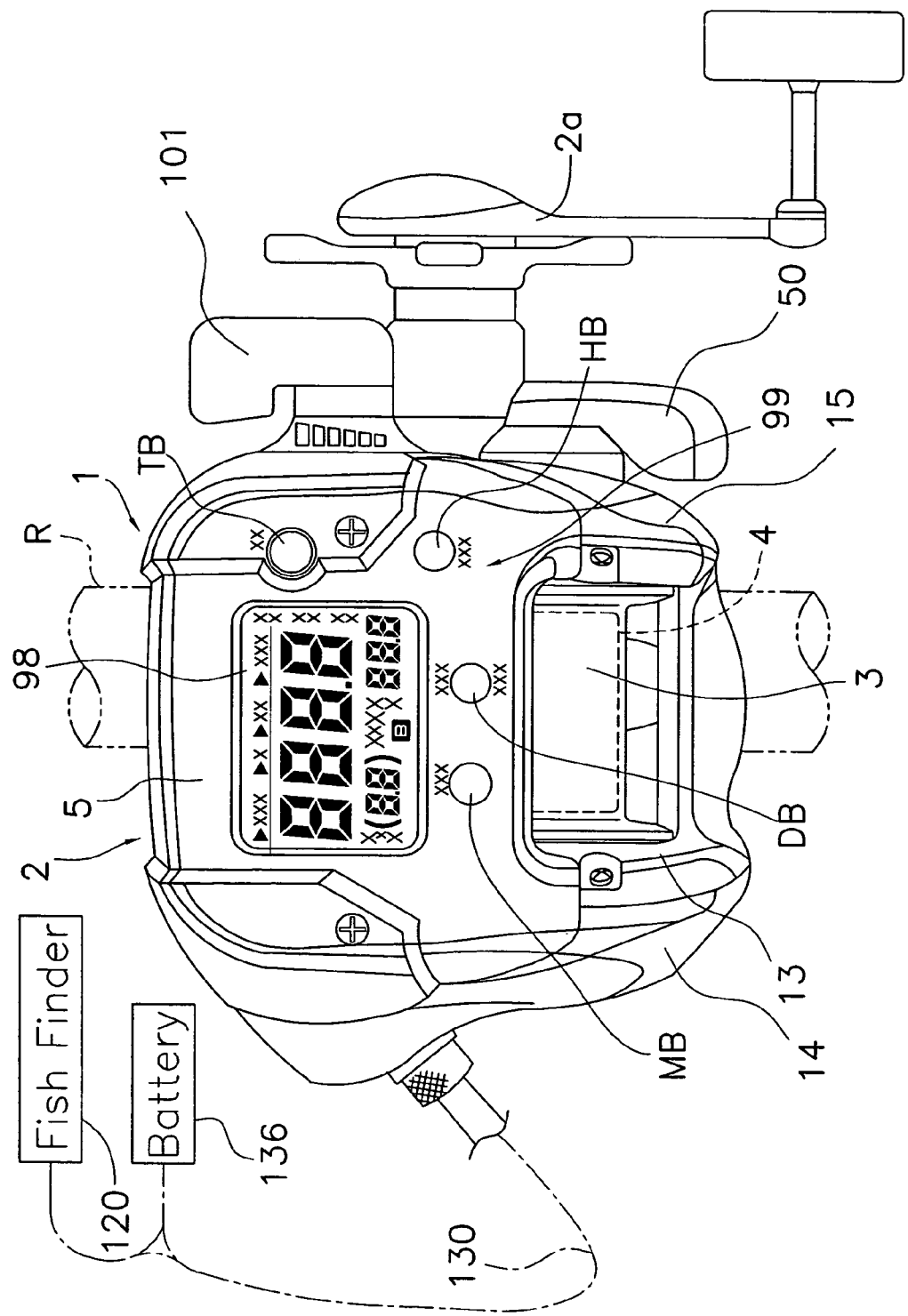
FIG. 7 is a plan view of an electric driven reel which can be connected to the fish finder monitor in accordance with the first embodiment of the present invention.

As shown in FIGS. 6–8, the reel unit 2 includes a frame 13, and side covers 14, 15 that cover both sides of the frame 13. The frame 13 is an integrally formed member that is die cast from an aluminum alloy, and includes a pair of left to right side plates 16, 17, and linking members 18 that link the side plates 16, 17 at a plurality of locations. A rod mounting leg 19 that serves to mount a fishing rod is mounted below the linking members 18.

The side cover 15 is joined to the side plate 17 with bolts. A fixing frame 20 that serves to mount the rotation transmission mechanism 6 and the like is joined to the side cover 15 with bolts. Thus, when the side cover 15 is removed from the side plate 17, the fixing frame 20 will be removed from the side plate 17 together with a portion of the rotation transmission mechanism 6 and the side cover 15.

The side cover 14 is joined to the side plate 16 with bolts. A power cord connector 14a (FIG. 6) that serves to connect to a power source such as a storage battery provided externally is arranged on the side cover 14 to project downward and diagonally forward.

The side plate 16 is a plate-shaped member made of a synthetic resin having a rib on the edge portion thereof. A bulge portion 27 that serves to mount the motor 4 is formed in the central portion of the side plate 16 to project outward. A cover member 28 that serves to cover an end portion side of the motor 4 is removably mounted on the bulge portion 27.

Configuration of the Spool

The spool 3 includes a tubular shaped bobbin portion 3a that is capable of accommodating the motor 4 in the interior thereof, and a pair of left to right flange portions 3b that are formed spaced apart on the outer periphery of the bobbin portion 3a. One end of the spool 3 extends outward from the flange portions 3b, and a bearing 25 is disposed on the inner peripheral surface of the extended end portion. A gear plate 3a c is fixedly coupled to the other end of the spool 3. The gear plate 3a c is provided in order to transmit the rotation of the spool 3 to a level wind mechanism not shown in the figures. An anti-friction bearing 26 is mounted between the gear plate 3a c and the frame 20 on a side portion of the gear plate 3a c in the center of the spool 3. The spool 3 is rotatively supported on the reel unit 2 with the two bearings 25, 26.

Configuration of the Motor

Figure 9:
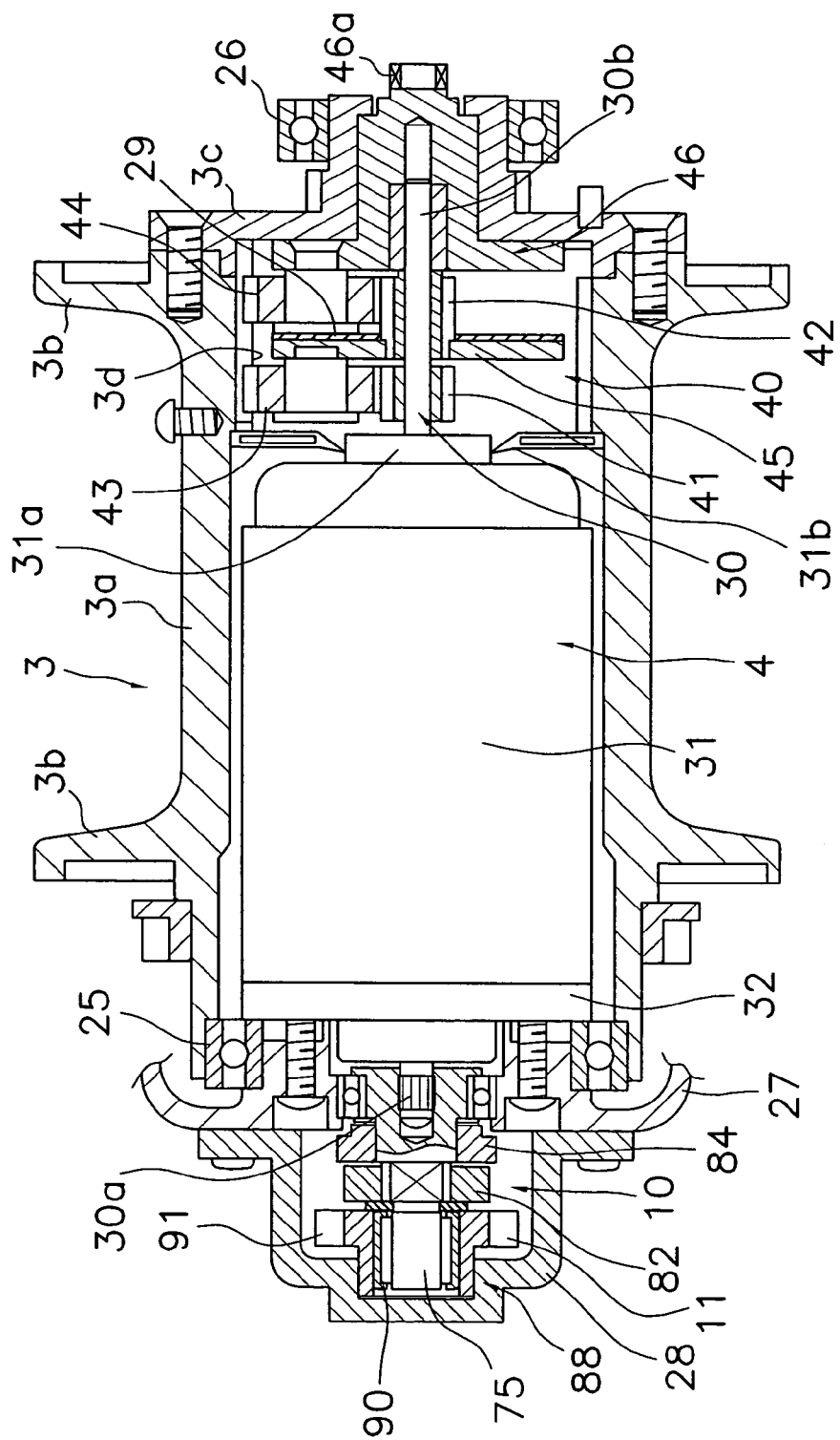
FIG. 9 is an enlarge cross-sectional view of the motor mounting portion in accordance with the first embodiment of the present invention.

As shown in FIG. 9, the motor 4 is a DC motor having a field magnet and an armature in the interior thereof, and functions as a drive unit for winding and releasing the line on spool 3 as well as for operating the first clutch return mechanism 11. The motor 4 includes a tubular, closed-end case member 31 whose base end thereof is open, a cap member 32 that is fixedly coupled to the base end of the case member 31 in order to cover the opening therein, and an output shaft 30 that is rotatively mounted on the case member 31 and the cap member 32. The case member 31 is a tubular and closed-end member, and rotatively supports the output shaft 30 with a circular support portion 31a that projects outward on the closed end of the case member 31. A seal member 31b that seals the gap between the support portion 31a and the inner peripheral surface of the spool 3 is mounted on the outer peripheral surface of the support portion 31a. In this way, even if liquid infiltrates temporarily from the bearing 25, it will be difficult for this liquid to infiltrate into the mechanical components in the interior.

Figure 14:
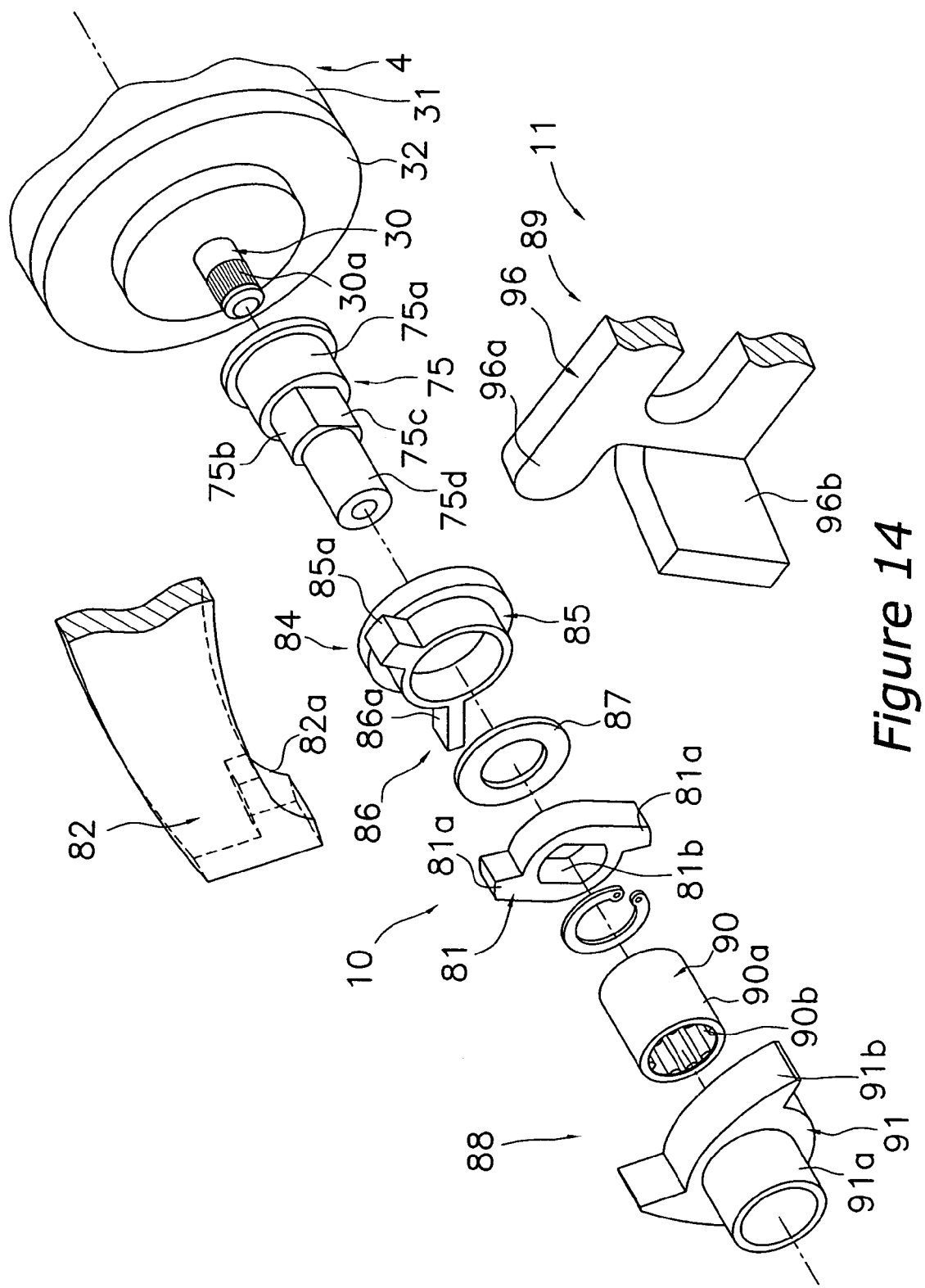
FIG. 14 is an exploded oblique view of a first clutch return mechanism in accordance with the first embodiment of the present invention.

The output shaft 30 is rotatively mounted on the case member 31 and the cap member 32. The left end of the output shaft 30 projects out from the cap member 32. Serrations 30a are formed on the outer periphery of the output shaft 30. A mechanism mounting shaft 75 is, for example, non-rotatably and fixedly coupled to the output shaft 30 by engagement with the serrations 30a. The right end of the output shaft 30 projects out from the end of the case member 31 as shown in FIG. 9. A two step speed reduction planetary gear mechanism 40 formed of the rotation transmission mechanism 6 is mounted on the end 30b that projects outward. As shown in FIG. 14, the mechanism mounting shaft 75 includes a large diameter first shaft portion 75a whose base end side is formed to have a circular shape cross-section, a second shaft portion 75b having mutually parallel chamfered portions 75c and a diameter that is smaller than that of the first shaft portion 75b, and a third shaft portion 75d whose cross section is formed into a circular shape and having a diameter that is even smaller than that of the second shaft portion 75b.

Configuration of the Counter

The counter 5 displays the water depth of the terminal tackle mounted on the end of the fishing line, and is provided in order to control the motor 4. As shown in FIG. 6, a water depth display unit 98 formed of a liquid crystal display that serves to display the water depth LX of the terminal tackle and the location of fish in two ways, in terms of the distance from the water surface and in terms of the distance the from the bottom, and an operation key unit 99 formed of a plurality of switches disposed around the periphery of the water depth display unit 98, are arranged on the counter 5.

Figure 10:
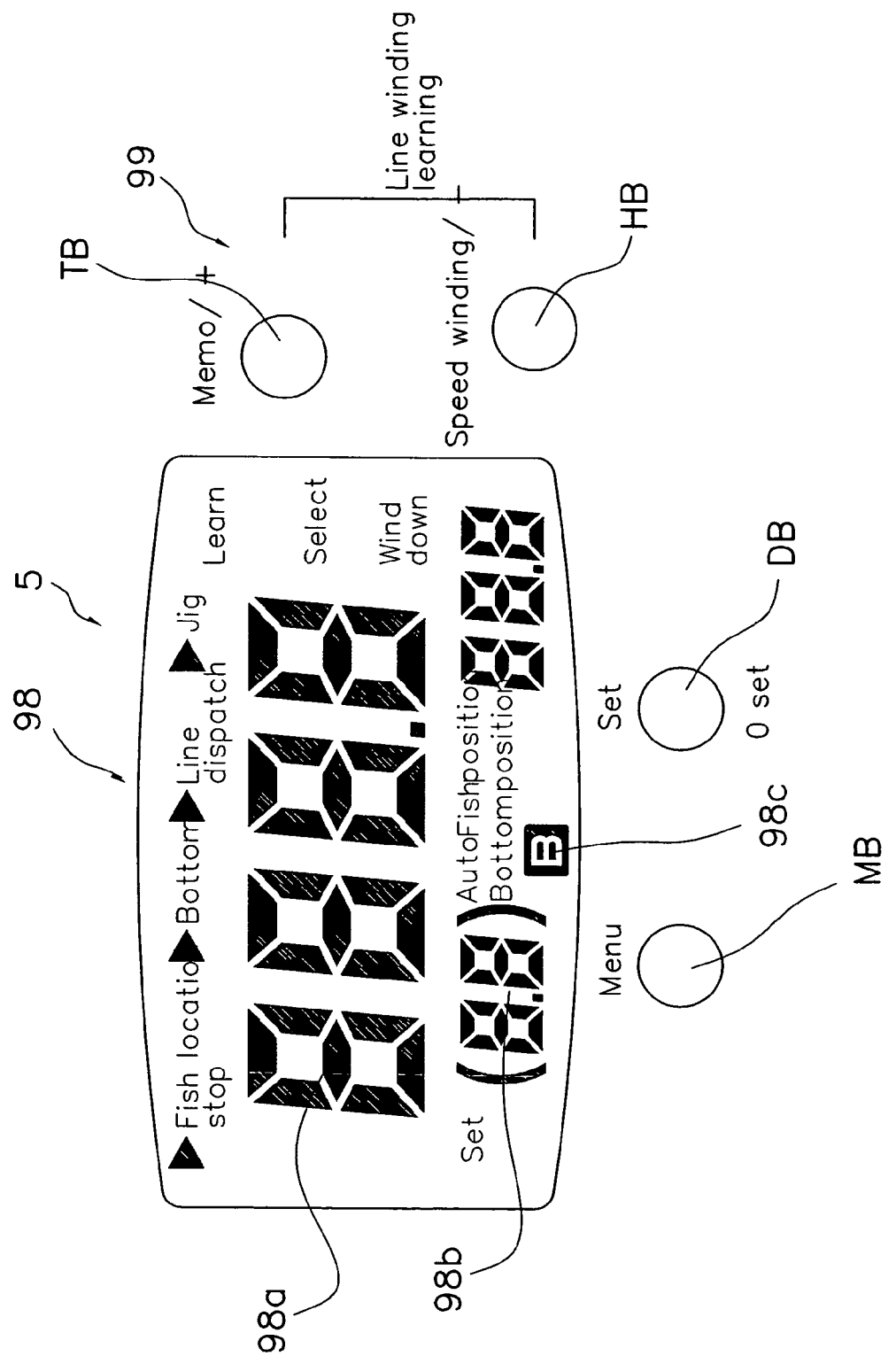
FIG. 10 is an enlarged plan view of the area around a water depth display portion of a counter in accordance with the first embodiment of the present invention.

As shown in FIG. 10, the operation key unit 99 includes a fish location memo button TB for fish location memos, and a speed winding button HB for speed winding that causes the spool 3 to rotate at the highest speed, that are vertically disposed on the right side of the water depth display unit 98, and a menu button MB, and a set button DB, that are horizontally aligned on the lower side of the water depth display unit 98. The fish location memo button TB is a button that sets the water depth of the terminal tackle as the location of fish when the fish location memo button TB is operated. The speed winding button HB is a button that is used to rotate the spool 3 at a high speed in the line winding direction when retrieving the terminal tackle and the like. The memo button MB is a button that is used in order to select the display items in the water display unit 98. The set button DB is a button that determines and sets the selection results. In addition, if the set button DB is pushed for an extended period of time (e.g., 3 seconds or more), the water depth data LX at that point can be set to zero as a reference position. Thereafter, the water depth data LX will be displayed as the length of the line as measured from the set reference position. Note that a fisherman normally pushes the set button DB for an extended period of time and performs a zero set at the point when the terminal tackle comes into contact with the ocean surface. In addition, by simultaneously pushing the fish location memo button TB and the speed winding button HB for an extended period of time at a water depth of 6 meters or less, a line winding learning mode can be activated, in which the relationship between the number of spool rotations and the line length will be learned.

In addition, as shown in FIG. 2, a reel control unit 100 formed of a microcomputer that serves to control the water depth display unit 98 and the motor 4 is arranged in the interior of the counter 5. The reel control unit 100 can also include other conventional components such as an input interface circuit, an output interface circuit, and storage devices such as a ROM (Read Only Memory) device and a RAM (Random Access Memory) device. The reel control unit 100 is configured to be able to selectively control any of the components of the electric driven reel 1 shown in FIG. 2. The operation key unit 99, a spool sensor 102 that detects the number of rotations and the rotational direction of the spool 3 with, for example, two Hall elements aligned in the rotational direction, a power source voltage sensor 103 that detects the voltage of the power source connected to the electric driven reel 1, a potentiometer 104 linked to the adjustment lever 101 which serves to adjust the speed of the spool 3 and the tension on the fishing line, and a data communication unit 105 which serves to exchange data with the fish finder monitor 120, are connected to the reel control unit 100.

Figure 13:
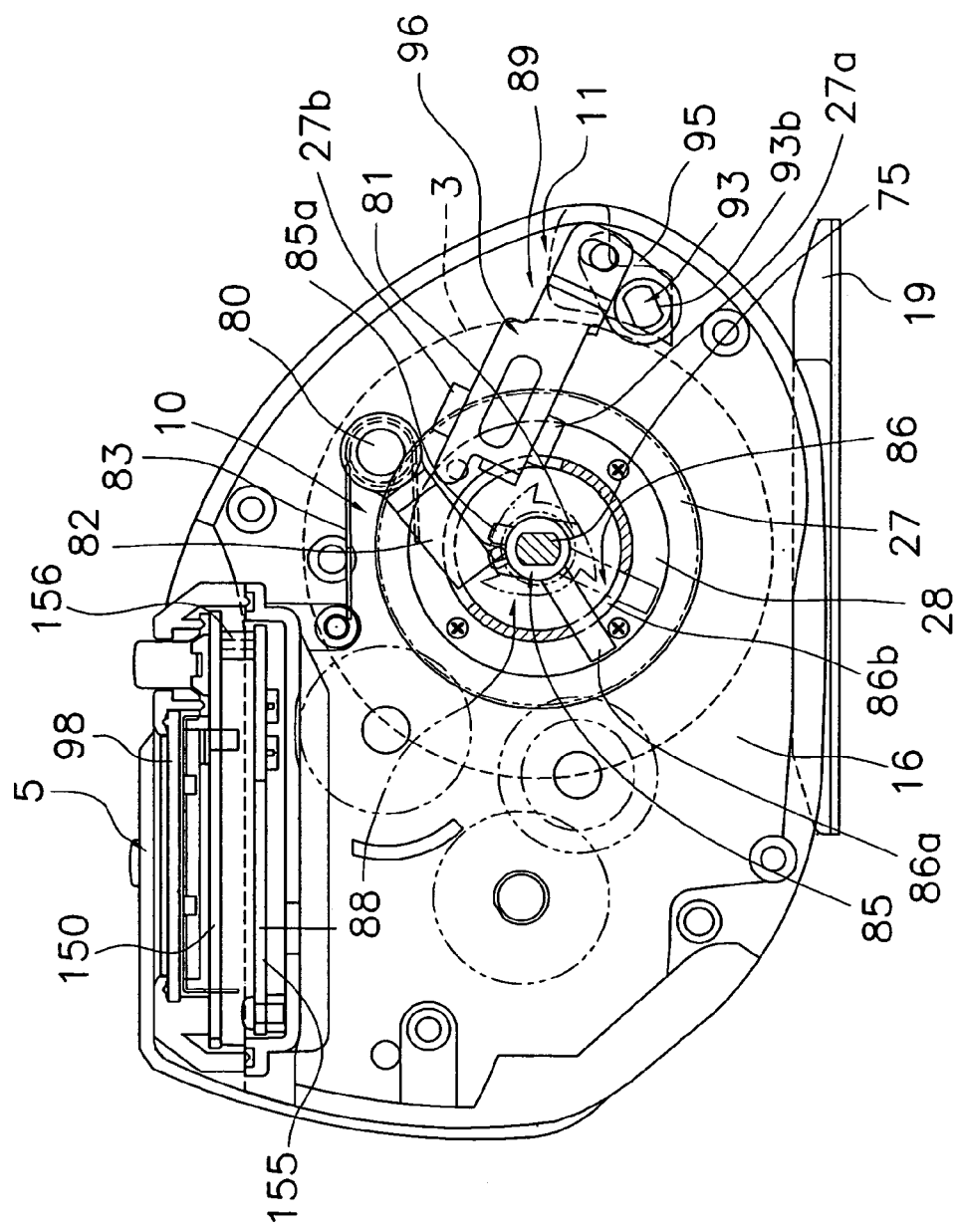

In addition, a buzzer 106 for various types of warnings, the water depth display unit 98 that displays water depth data, a memory unit 107 that stores various data, a motor drive circuit 108 that drives the motor 4 with a pulse width modulated (PWM) duty ratio, and other input/output units, are connected to the reel control unit 100. As shown in FIG. 13, a first circuit board 150, and a second circuit board 155 disposed below the first circuit board 150 across a gap, are accommodated in the counter 5. Electric components that include a liquid crystal drive circuit that drives the liquid crystal display of the water depth display unit 98 are mounted on the upper surface of first circuit board 150. Electric components that include a CPU that forms the reel control unit 100 and an EEPROM (Electrically Erasable Programmable Read-Only Memory) that forms the memory unit 107 are mounted on the rear surface of the first circuit board 150. Electric components that include two FETs that form the motor drive circuit 108, the buzzer 106, and the two Hall elements that form the spool sensor 102, are mounted on the second circuit board 155. The first circuit board 150 and the second circuit board 155 are mounted in a plastic case, and are electrically connected with an interconnector 156 that is interposed between both of the boards 150 and 155.

The water depth display unit 98 employs a segmented liquid crystal display that includes a 7-segment numerical display. As shown in FIG. 10, the water depth of the terminal tackle, the location of fish, the location of the bottom, and what modes (fish location stop mode, from bottom display mode, reel-out mode, jig mode) are activated, is displayed on the segmented liquid crystal display in text or other format. The jig mode text will be illuminated when the electric driven reel 1 and the fish finder monitor 120 are connected with the power cord 130 such that communication between the fish finding monitor 120 and the electric driven reel 1 is possible. This allows the fisherman to instantly confirm that the electric driven reel 1 and the fish finder monitor 120 can communicate with one another. In addition, a water depth display portion 98a that displays the water depth of the terminal tackle is arranged in the central portion of the water depth display unit 98, and in the lower portion thereof are arranged a set display portion 98b that displays the set level ST, the location of fish, and the like, and a power source graphic 98*c* that indicates a reduction in power source voltage.

The reel control unit 100 controls the motor 4 according to, for example, 31 levels, which include the off state of motor 4, in response to the output of the potentiometer 104 (i.e., the degree of pivot of the adjustment lever 101). More specifically, the 140 degree range of the potentiometer 104 (from 50 degrees to 190 degrees) is suitably classified into 31 levels, and which of the 31 levels is the level ST is determined based on the classification. In addition, from amongst the 31 levels, the motor 4 is turned off at the level (ST=0), where the position of the adjustment lever 101 is closest to the fisherman and no operation is performed. Then, for example, at the next 4 levels (ST=1–4), feedback speed control is performed in which a first duty ratio D1 is controlled based on the output of the spool sensor 102 so as to gradually increase the rotational speed of the spool 3. In the remaining 26 levels (ST=5–30), the motor 4 is controlled at a first duty ratio D1 that is corrected in response to the increase in each level ST and the line winding diameter. In this way, the spool 3 will not stop rotating even if a large load is applied by speed control in the first 4 levels, where the speed of the motor 4 is slow. In addition, in the remaining 26 levels, because the reel control unit 100 performs control at a constant first duty ratio D1 that is corrected according to the line winding diameter at each level, the tension that will be applied to the spool 3 is substantially constant, and it will be difficult for line breakage to occur. Note that with the operation of the adjustment lever 101, the first duty ratio D1 will not exceed 85% even at the highest level. In addition, with the operation of the speed winding button HB, even the motor 4 will be driven at a high speed at a duty ratio D1 of 95% at maximum. Because of this, problems caused by the overheating of the motor 4 can be prevented in advance.

In addition, the reel control unit 100 calculates the water depth of the terminal tackle that is attached to the end of the fishing line based on the output of the spool sensor 102, and displays the water depth of the terminal tackle on the water depth display portion 98*a*. Furthermore, if the location of the bottom or the location of fish are set by operation of the operation key unit 99, when the calculated water depth matches with the set location of the bottom or the location of fish and the terminal tackle has arrived at the location of the fish or the location of the bottom, the motor 4 will be reverse rotated, the clutch switching mechanism 8 will be operated via the first clutch return mechanism 12, and the clutch mechanism 7 will return to the clutch on state. In this way, the terminal tackle will be maintained in that location.

A plurality of map data for converting a counted value of the spool sensor 102 per each predetermined pulse into the water depth data LX of the terminal tackle are stored in the memory unit 107 for various types of fishing line. The plurality of map data takes into consideration the line diameter and the line winding diameter in the calculation of the water depth data LX from the counted values. Map data that correspond to the sizes of a plurality of fishing lines that are often used with the electric driven reel 1 are pre-stored in the memory unit 107. In addition, fishing line map data that is not pre-stored can be created by learning, and can then be stored in the memory unit 107.

When a counted value is output from the spool sensor 102, the reel control unit 100 calculates the water depth data LX of the terminal tackle for display based upon a map datum of the fishing line selected from the plurality of map data that is stored in the memory unit 107, and displays the calculated water depth data LX on the water depth display unit 98. In addition, in the event that the fish finder monitor 120 is connected, various types of other data (including the water depth data LX of the tackle) is also output to the fish finder monitor 120 via the data communication unit 105 and the communication line of the power cord 130.

Note that during the clutch return operation caused by the reverse rotation of the motor 4, the reel control unit 100 will gradually increase the duty ratio that the motor drive circuit 108 applies from 20% to 70%. In this way, the voltage applied to the motor 4 will gradually increase. Thus, it will be difficult for the mechanism mounting shaft 75 that is fixedly coupled to the output shaft 30 to spin unconnectedly during the reverse rotation of the motor 4.

Note that if a lithium battery is used and the power source voltage PV is 15 volts, the duty ratio D1 will be corrected to 12/15, for example, so as to correct the increase in the power source voltage PV. In this way, even if a storage battery having a power source voltage that is higher than that of a lead battery, such as a lithium battery or a nickel hydrogen battery is used, the voltage that is applied to the motor 4 during normal rotation through the operation of the adjustment lever 101 and the voltage that is applied to the motor 4 when reverse rotation begins will rarely fluctuate. Thus, fluctuations in the speed and torque of the motor 4 during normal rotation through the operation of the adjustment lever 101 will be reduced, and the mechanism mounting shaft 75 that is fixedly coupled to the output shaft 30 will rarely spin unconnectedly during the reverse rotation of the motor 4.

Configuration of the Rotation Transmission Mechanism

As shown in FIG. 8, the rotation transmission mechanism 6 includes a handle shaft 33 on which the handle 2*a* is non-rotatively mounted, a main gear 34 that is rotatively mounted on the handle shaft 33, a pinion gear 35 that meshes with the main gear 34, a drag mechanism 36 that is disposed around the periphery of the handle shaft 33, and the planetary gear mechanism 40 that reduces the rotation of the motor 4 in two steps.

The handle shaft 33 is rotatively supported on the fixing frame 20 with a bearing 37 and a roller clutch 38 that prevents rotation of the handle shaft 33 in the line release direction. The handle 2*a* is non-rotatively mounted on the tip of the handle shaft 33, and a star drag 39 of the drag mechanism 36 is engaged with the handle shaft 33 on the inner side of the handle 2*a*.

The rotation of the handle shaft 33 is transmitted to the main gear 34 via the drag mechanism 36. The pinion gear 35 is mounted on a pinion gear shaft 47 disposed on the side cover 15 so as to be rotatable and movable in the axial direction. The pinion gear shaft 47 is concentrically disposed with the output shaft 30 of the motor 4. An engagement recess 35*a* is formed on the left end (in FIG. 8) of the pinion gear 35, and gear teeth 35*b* that engage with the main gear 34 are formed on the right end of the pinion gear 35. In addition, a small diameter neck portion 35*c* is formed between the engagement recess 35*a* and the gear teeth 35*b*. The engagement recess 35*a* non-rotatably engages with an engagement projection 46*a* formed in the tip (the right end in FIG. 8) of a second carrier 46 (described below) of the planetary gear mechanism 40. The clutch mechanism 7 is formed by the engagement recess 35*a* and the engagement projection 46*a*. The pinion gear 35 moves in the axial direction of the pinion gear shaft 47 through the clutch switching mechanism 8 (FIG. 11) that engages with the neck portion 35*c*.

The drag mechanism 36 brakes the rotation of the spool 3 in the line release direction, and is a well-known mechanism having a star drag 39, and a drag disk 48 in which the pressing force (drag force) with respect to the main gear 34 is changed by the star drag 39.

As shown in FIG. 9, the planetary gear mechanism 40 includes a first sun gear 41 that is fixedly coupled to the right side of the output shaft 30 of the motor 4, three first planetary gears 43 that engage with the first sun gear 41 and are, for example, disposed in a uniform spaced relationship around the circumference of the first sun gear 41, a first carrier 45 that rotatively supports the first planetary gear 43, a second sun gear 42 that is fixedly coupled to the first carrier 45, three second planetary gears 44 that engage with the second sun gear 42 and are, for example, disposed in a uniform spaced relationship around the circumference of the second sun gear 42, and a second carrier 46 that rotatively supports the second planetary gear 44. The first planetary gear 43 and the second planetary gear 44 are engaged with an internal gear 3d formed on the inner peripheral surface of the spool 3. The first carrier 45 and the second carrier 46 are tubular shafts, and the output shaft 30 of the motor 4 passes through the interiors thereof. The second sun gear 42 and the second carrier 46 are arranged to be relatively rotatable with respect to the output shaft 30. In addition, the second carrier 46 is rotatively mounted on a gear plate 3a c. A washer member 29 made of a synthetic resin that easily slides is mounted between the second planetary gear 44 and the first carrier 45 as shown in FIG. 9. If this type of washer member 29 is mounted, play in the first carrier 45 can be lessened and the noise of the planetary gear mechanism 40 can be reduced.

Configuration of the Clutch Mechanism

The clutch mechanism 7 is a mechanism capable of switching the spool 3 between a line winding capable state and a free rotation capable state. As shown in FIG. 8 and described previously, the clutch mechanism 7 is formed of the engagement recess 35a of the pinion gear 35 and the engagement projection 46a of the second gear 46. The clutch on state is when the pinion gear 35 moves leftward and the engagement recess 35a is engaged with the engagement projection 46a of the second gear 46, and the clutch off state is the state in which the engagement recess 35a is separated from the engagement projection 46a. In the clutch on state, the spool 3 is in the line winding capable state, and in the clutch off state, the spool 3 is in the free rotation capable state. Note that when the motor 4 rotates in the line winding direction in the clutch off state, there will be little frictional resistance from the planetary gear mechanism 40. As a result, the free rotation speed of the spool 3 can increase, and the terminal tackle can rapidly fall to the location of the fish. This is the line dispatch process.

Configuration of the Clutch Switching Mechanism

Figure 11:
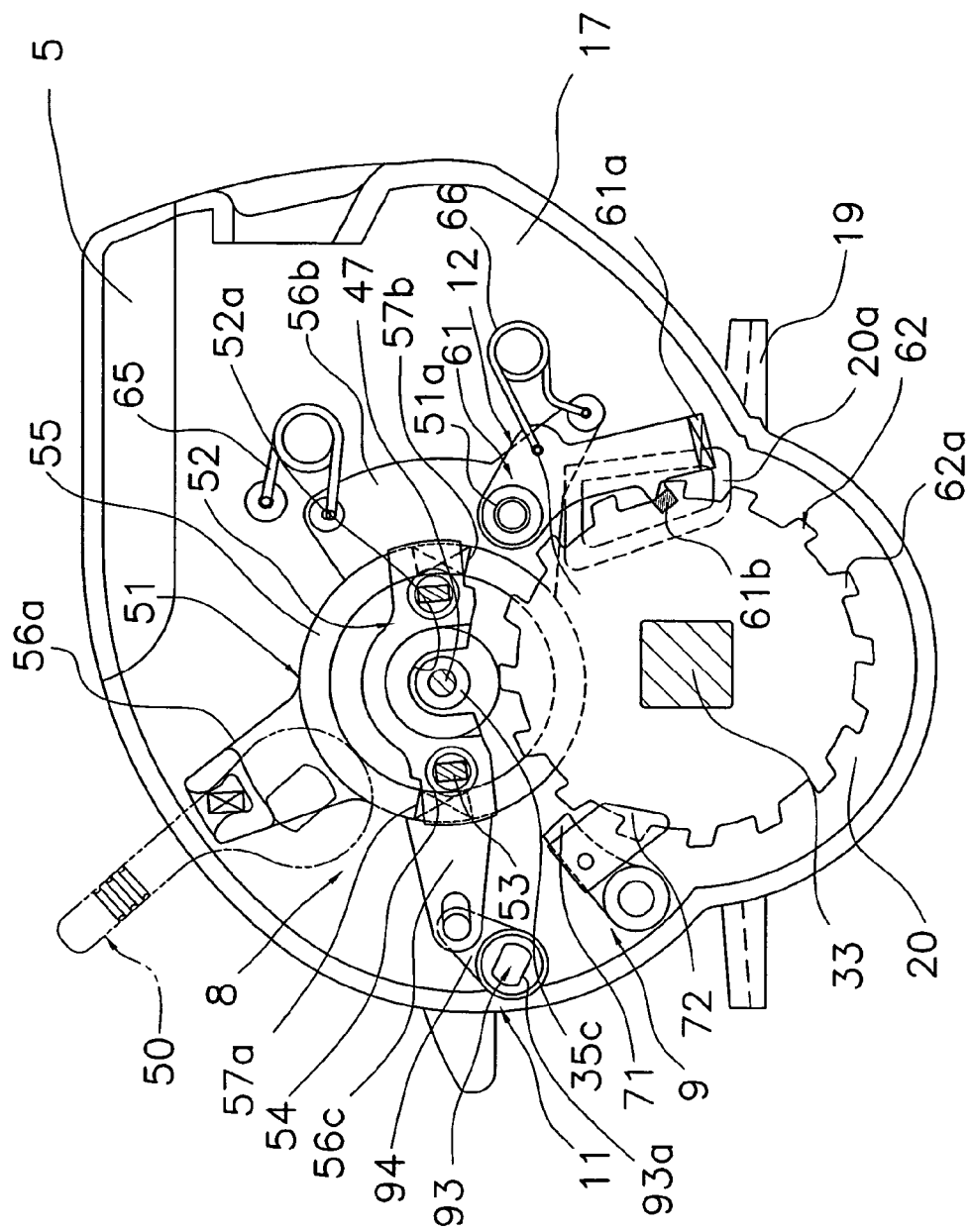
Figure 12:
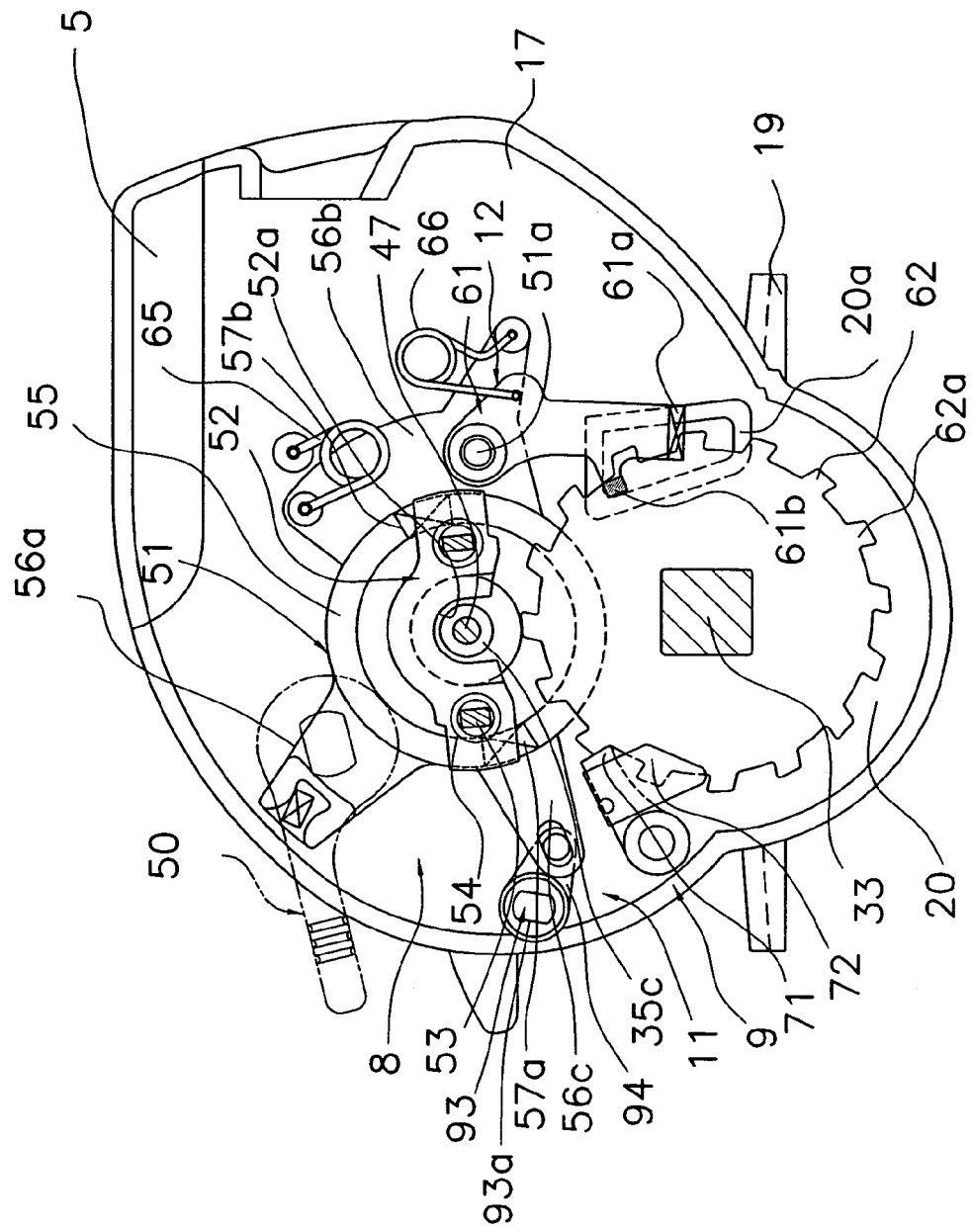
FIG. 12 is a lateral view of the handle side in accordance with the first embodiment of the present invention with a side cover removed and with the clutch off.

The clutch switching mechanism 8 switches the clutch mechanism 7 between the on and off states. As shown in FIGS. 11 and 12, the clutch switching mechanism 8 includes a clutch operation lever 50 that is pivotably mounted on the side cover 15, a clutch cam 51 that rotates around the pinion gear shaft 47 by the pivot of the clutch operation lever 50, and a clutch yoke 52 that moves in the direction of the pinion gear shaft 47 by the rotation of the clutch cam 51.

The clutch operation lever 50 is pivotably mounted on the side cover 15 above and to the rear of the spool 3. The clutch operation lever 50 is pivotable between the clutch on position shown in FIG. 11 and the clutch off position shown in FIG. 12.

The clutch cam 51 is a member that rotates around the pinion gear shaft 47 by the pivot of the clutch operation lever 50, and causes the clutch yoke 52 to move outward of the spool shaft through the rotation of the clutch cam 51. The clutch cam 51 includes a rotation portion 55 that is rotatively mounted around the pinion gear shaft 47, a first projection portion 56a that extends from the rotation portion 55 to the clutch operation lever 50 side, a second projection portion 56b that extends forward from the rotation portion 55, a third projection portion 56c that extends rearward from the rotation portion 55, and a pair of cam projections 57a, 57b that make up diagonal cams that are formed on the lateral surfaces of the rotation portion 55. Cam receivers (not shown in the figures) that come into contact with the cam projections 57a, 57b are formed on both ends of the clutch yoke 52 that face the cam projections 57a, 57b.

The rotation portion 55 is formed into a ring shape, and disposed between the clutch yoke 52 and the fixing frame 20. The rotation portion 55 is rotatively supported by the fixing frame 20.

The first projection portion 56a extends upward and rearward from the rotation portion 55, and the tip of the first projection portion 56a is separated into two branches so as to engage with the clutch operation lever 50. The first projection portion 56a is provided in order to rotate the clutch cam 51 in response to the pivoting of the clutch operation lever 50.

The second projection portion 56b is provided in order to link the clutch switching mechanism 8 with the second clutch return mechanism 12. The second projection portion 56b extends forward of the reel, and extends on the outer side of a ratchet wheel 62 of a first one way clutch 9 disposed between the main gear 34 and a fixing frame 20. A first torque spring 65 composed of a spiral coil spring is engaged with the second projection portion 56b. The other end of the first torque spring 65 is engaged with the fixing frame 20. The clutch cam 51 is maintained in the clutch on position shown in FIG. 11 and the clutch off position shown in FIG. 12 by the first torque spring 65. In addition, a pivot shaft 51a is mounted on the second projection portion 56b, and an engagement member 61 of the second clutch return mechanism 12 is pivotably mounted on the pivot shaft 51a.

The third projection portion 56c is provided in order to link the clutch switching mechanism 8 with the first clutch return mechanism 11. The third projection portion 56c extends downward and rearward of the reel, and the first clutch return mechanism 11 is linked to the tip thereof.

The cam projections 57a, 57b are provided in order to press the clutch yoke 52 outward in the spool shaft direction. In other words, when the clutch cam 51 rotates from the clutch on position shown in FIG. 11 to the clutch on position shown in FIG. 12, the clutch yoke 52 will come into contact with the cam projections 57a, 57b and move outward in the spool shaft direction (out from the surface of FIGS. 11 and 12).

The clutch yoke 52 is disposed on the outer peripheral side of the pinion gear shaft 47, and is supported by two guide pins 53 so as to be capable of moving parallel to the axis of the pinion gear shaft 47. In addition, the clutch yoke 52 includes a semi-circular arc-shaped engagement portion 52a on the central portion thereof that engages with the neck portion 35c of the pinion gear 35. In addition, coil springs 54 are disposed in the compressed state between the clutch yoke 52 and the side cover 15 around the outer periphery of the guide shaft 53 that supports the clutch yoke 52, and the clutch yoke 52 is continually urged inward (toward the side plate 17) by the coil springs 54.

With this configuration, the pinion gear 35 will be positioned in the inward clutch engagement position in the normal state, and the engagement recess 35a and the engagement projection 46a of the second gear 46 will be engaged to place the clutch mechanism 7 in the clutch on state. On the other hand, when the pinion gear 35 moves outward due to the clutch yoke 52, the engagement between the engagement recess 35a and the engagement projection 46a will be separated, and the clutch mechanism 7 will be placed in the clutch off state.

Configuration of the First One Way Clutch

The first one way clutch 9 is provided in order to prevent the handle 2a from rotating during the driving by the motor 4 by preventing the rotation of the handle shaft 33 in the line release direction. The first one way clutch 9 includes the ratchet wheel 62 non-rotatably mounted on the handle shaft 33, a ratchet pawl 71, and a grasping member 72.

The ratchet wheel 62 is non-rotatably mounted on the handle shaft 33 between the main gear 34 and the fixing frame 20. Saw-tooth shaped ratchet teeth 62a are formed on the outer peripheral side of the ratchet wheel 62.

The ratchet pawl 71 is rotatively mounted on the side plate 17. In addition, the grasping member 72 is installed on the tip of the ratchet pawl 71, and can grasp the outer peripheral surface of the ratchet wheel 62. Through the friction between the grasping member 72 and the ratchet wheel 62, the ratchet pawl 71 will be separated up to the position in which it does not interfere with the ratchet teeth 62a during the clockwise rotation (the line winding direction) of the ratchet wheel 62. Therefore, the ratchet pawl 71 will no longer come into contact with the ratchet wheel 62 during the rotation of the ratchet wheel 62 in the line winding direction, and thus the operation can be quieted. On the other hand, during the counter-clockwise rotation (the line releasing direction), the ratchet pawl 71 will be pulled up to a position in which it interferes with the ratchet teeth 62, and rotation in the line release direction will be prevented. Note that in this electric driven reel, in addition to this first one way clutch 9, a roller clutch 38 that instantly prohibits the reverse rotation of the handle shaft 33 is disposed between the side cover 15 and the handle shaft 33.

Configuration of the Second One Way Clutch

The second one way clutch 10 is provided in order to prevent the planetary gear mechanism 40 from moving by reverse rotating the motor 4 during the operation of the handle 2a. As shown in FIGS. 13 and 14, the second one way clutch 10 includes a ratchet 81 that is non-rotatably mounted on the second shaft portion 75b of the mechanism mounting shaft 75, a pivot pawl 82 that contacts with and separates from the ratchet 81, a spiral coil spring 83 that urges the pivot pawl 82 toward the ratchet 81, and a pawl control mechanism 84 that controls the pivot pawl 82 during normal rotation of the motor 4 in the line winding direction.

The ratchet 81 includes an oval-shaped hole 81b that engages non-rotatably in the center thereof with the chamfered surfaces 75c formed in the second shaft portion 75b of the mechanism mounting shaft 75. In addition, the ratchet 81 includes projections 81a (two for example) that are formed on the outer periphery thereof to project outward in the radial direction.

The base end of the pivot pawl 82 is pivotably mounted on a pivot shaft 80 that is disposed on the bulge portion 27 of the side plate 16. A pawl portion 82a that projects outward toward the rear (right hand side) direction as seen in FIG. 14 is formed on the tip of the pivot pawl 82. The pawl portion 82a is provided in order to come into contact with the projections 81a of the ratchet 81 and stop the reverse rotation of the ratchet 81 (the output shaft 30), and to cause the pivot pawl 82 to come into contact with a quieting cam 85 (described below) of the pawl control mechanism 84 and pivot up to a position that intersects with the projections 81a.

Figure 15:
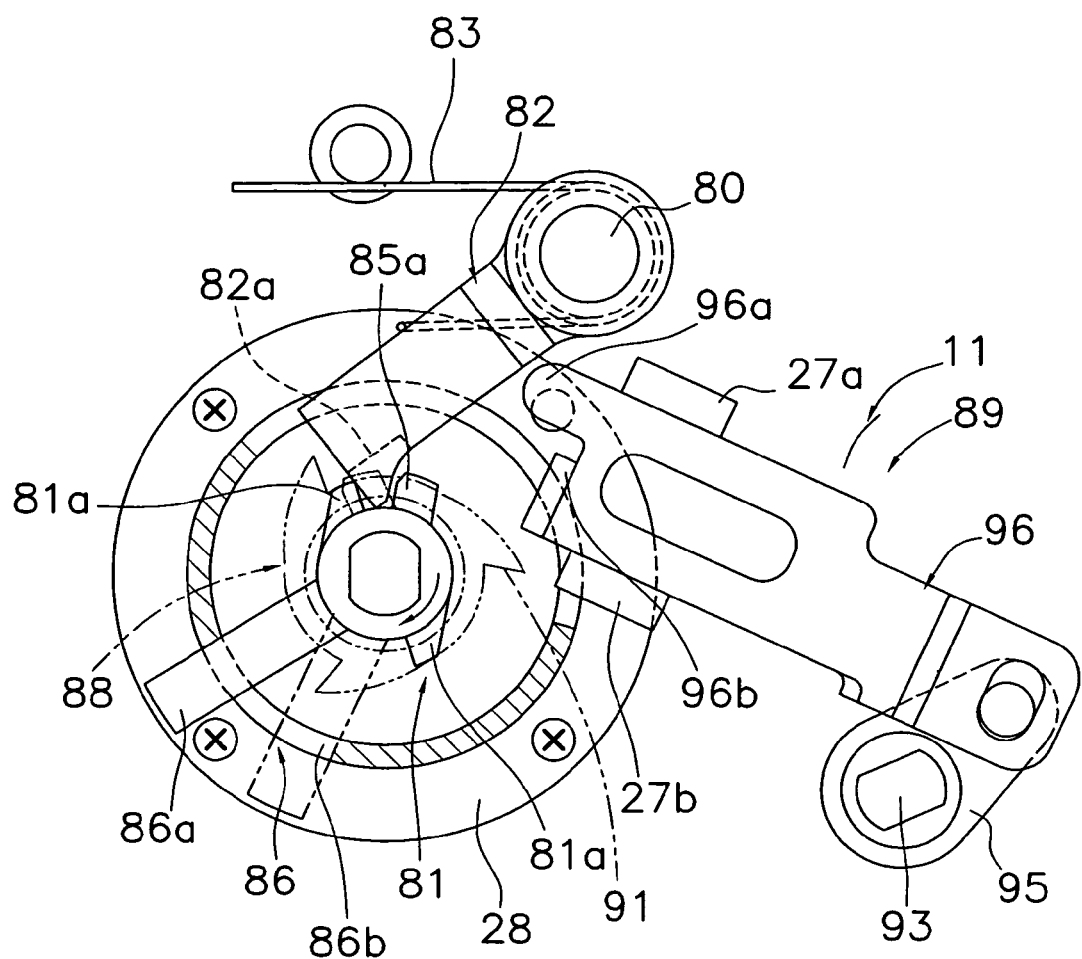
Figure 16:
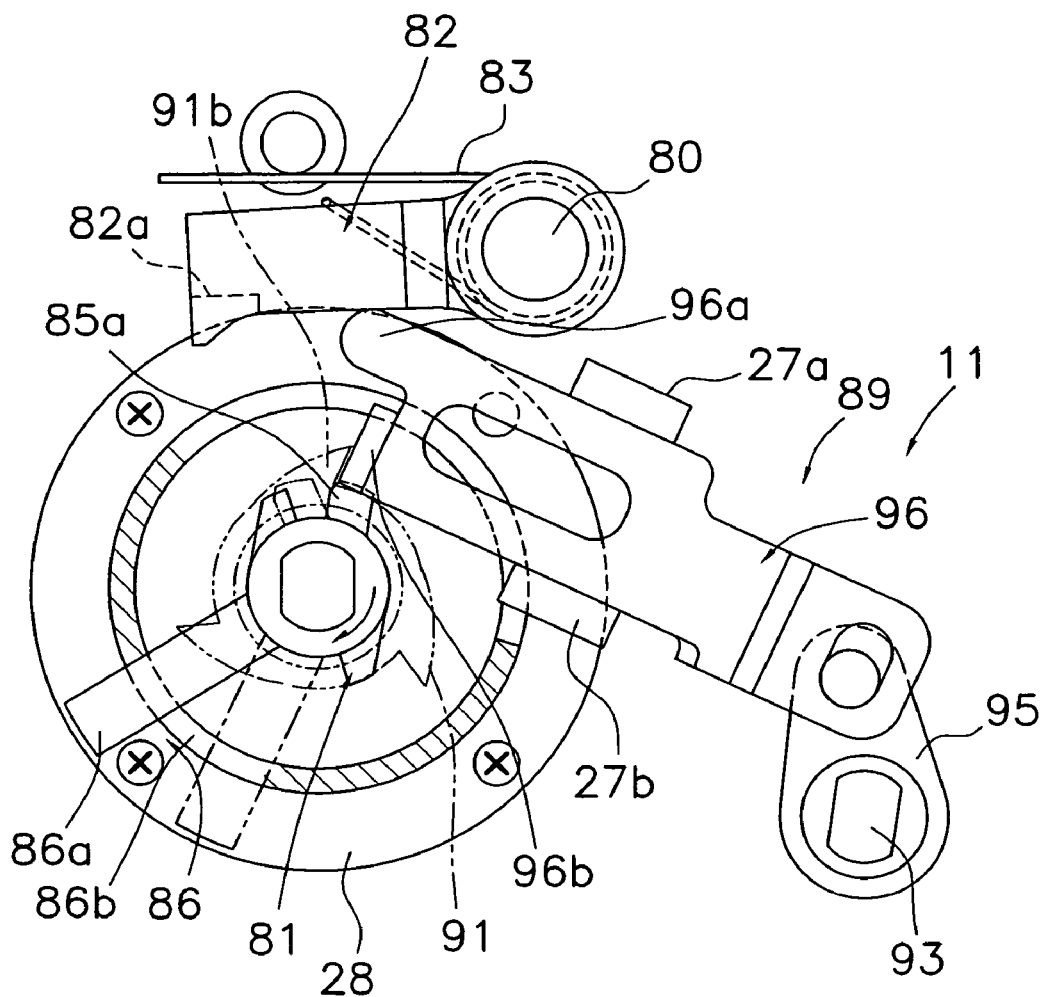
FIG. 16 is an enlarged lateral view of the first one-way clutch and the first clutch return mechanism in accordance with the first embodiment of the present invention when the clutch is off.
Figure 17:
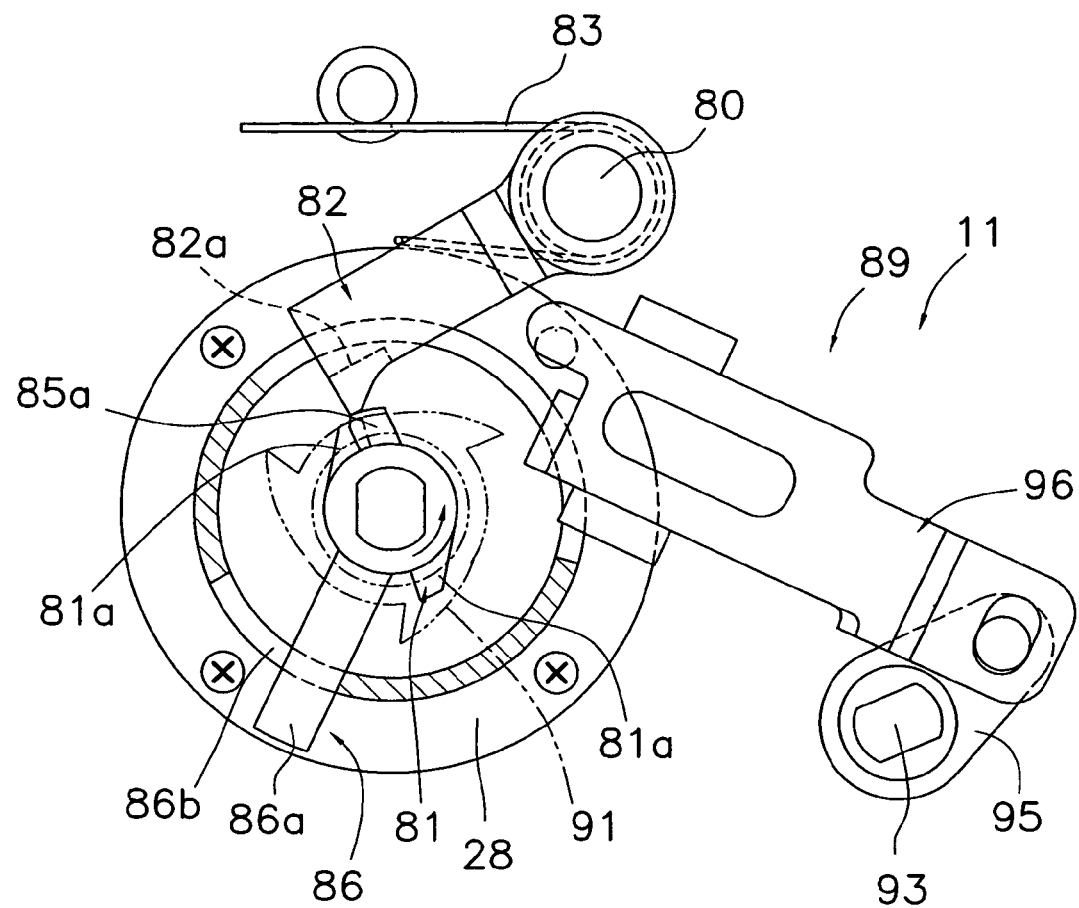
FIG. 17 is an enlarged lateral view of the first one-way clutch and the first clutch return mechanism in accordance with the first embodiment of the present invention when the motor rotates normally.

The pivot pawl 82 will pivot between a reverse rotation prevention position shown in FIG. 15 in which the pivot pawl 82 can come into contact with the projections 81a, and a reverse rotation allowance position shown in FIG. 16, by means of the first clutch return mechanism 11. As shown in FIG. 17, the pivot pawl 82 will pivot slightly toward the reverse rotation allowance position side up to the position at which it intersects with the projections 81a of the ratchet 81 during normal rotation of the motor 4.

The pawl control mechanism 84 is a mechanism that serves to cause the pivot pawl 82 to pivot toward the reverse rotation allowance position up to the position at which the pivot pawl 82 intersects with the projections 81a of the ratchet 81 when the motor 4 rotates normally. The pawl control mechanism 84 is rotatively mounted on the first shaft portion 75a of the mechanism mounting shaft 75, and includes the quieting cam 85 having on the outer periphery thereof a pressing portion 85a that projects outward in order to press the pivot pawl 82 toward the reverse rotation prevention position, and a rotation limiting portion 86 that limits the range of rotation of the quieting cam 85. The quieting cam 85 frictionally engages with the first shaft portion 75a, and links with the rotation of the mechanism mounting shaft 75 to rotate in the same direction. The mechanism mounting shaft 75 can rotate even if the rotation of the quieting cam 85 is limited by the rotation limiting portion 86. The rotation limiting portion 86 includes an integrally formed engagement portion 86a that projects radially outward on the quieting cam 85, and a cut-out portion 86b formed on the cover member 28 and in which the engagement portion 86a engages. The cut-out portion 86b is cut out in an arc shape from the arc-shaped side surface of the cover member 28 so as to cover only the pivot range. A washer 87 is mounted between the quieting cam 85 and the ratchet 81 as shown in FIG. 14.

Configuration of the First Clutch Return Mechanism

The first clutch return mechanism 11 returns the clutch mechanism 7 from the clutch off state to the clutch on state via the clutch switching mechanism 8 by the reverse rotation of the motor 4. As shown in FIGS. 9 to 14, the first clutch return mechanism 11 includes a pressing mechanism 88 that is aligned with the ratchet 81, mounted on the mechanism mounting shaft 75, and rotates in association with at least the reverse rotation of the motor 4, and a linking mechanism 89 that acts in association with the clutch switching mechanism 8.

The pressing mechanism 88 is aligned with the ratchet 81 and disposed on the third shaft portion 75d of the mechanism mounting shaft 75, and rotates in association with the reverse rotation of the motor 4. The pressing mechanism 88 includes a roller clutch 90 mounted on the third shaft portion 75d, and a pressing member 91 non-rotatably mounted on the outer peripheral side of the roller clutch 90. The roller clutch 90 is a freely rotating outer ring type of one-way clutch that has an outer ring 90a and a plurality of rollers 90b accommodated in the outer ring 90a. Note that the inner ring is integrally formed with the third shaft portion 75d of the mechanism mounting shaft 75. The roller clutch 90 transmits only the reverse rotation of the motor 4 to the pressing member 91. Here, the roller clutch 90 is mounted to the pressing member 91 such that when, in the line dispatch mode in which the linking mechanism 89 comes near the pressing member 91 and the motor 4 rotates normally in the clutch off state, problems will not occur even if the pressing member 91 comes into contact with the linking mechanism 89. When the motor 4 reverse rotates, the rotation thereof is transmitted to the pressing member 91 via the roller clutch 90, and the pressing member 91 will rotate. The pressing member 91 includes a tubular portion 91a that is non-rotatably mounted on the outer ring 90a of the roller clutch 90, and a plurality of (for example three) projections 91b that project outward in the radial direction from the outer peripheral side of the tubular portion 91a and are formed spaced apart in the circumferential direction. The projections 91b are capable of pressing the linking mechanism 89.

The linking mechanism 89 acts in association with the operation of the clutch switching mechanism 8. When the clutch mechanism 7 is switched to the clutch off state by the clutch switching mechanism 8, the linking mechanism 89 will come into contact with the pivot pawl 82 to separate the pivot pawl 82 from the ratchet 81, and will move to a release position where pressing by the pressing mechanism 88 is possible. In this way, the motor 4 will be placed in a state in which reverse rotation is allowed. In addition, when the motor 4 reverse rotates in this state, the linking mechanism 89 will be pushed by the pushing mechanism 88 and move to the engagement position in which pushing is not possible. When moving to the engagement position, the linking mechanism 89 will separate from the pivot pawl 82 and the pivot pawl 82 will engage with the ratchet 81.

The linking mechanism 89 includes a linking shaft 93, first and second lever members 94, 95, and an extending/retracting member 96. The linking shaft 93 is rotatively mounted on the side plates 16 and 17, and has one end that is disposed outside the fixing frame 20. The first and second lever members 94, 95 are non-rotatively mounted on both ends of the linking shaft 93. The extending/retracting member 96 is linked to the tip of the second lever member 95.

The linking shaft 93 is an axial member that is rotatively mounted on the side plates 16 and 17, and has one end that projects outward of the fixing frame 20 and the other end that projects outward of the side plate 16. Mutually parallel chamfered portions 93a, 93b, which serve to non-rotatably mount the first and second lever members 94, 95 to the linking shaft 93, are formed on both projecting ends of the linking shaft 93.

The base end of the first lever member 94 is non-rotatively mounted on the chamfered portion 93a of the linking shaft 93 on the fixing frame 20 side, as shown in FIG. 12. The tip of the first lever member 94 is engaged on the tip of the third projection portion 56c of the clutch cam 51 that forms the clutch switching mechanism 8, such that the tip of the first lever member 94 is rotatable and movable in a predetermined distance relative to the tip of the third projection portion 56c. In this way, the rotation of the clutch cam 51 will be transmitted to the first clutch return mechanism 11, and the return operation of the first clutch return mechanism 11 can be transmitted to the clutch cam 51 and can cause the clutch switching mechanism 8 to be operated.

The base end of the second lever member 95 is non-rotatively mounted on the chamfered portion 93b of the linking shaft 93 on the fixing frame 16 side, as shown in FIG. 13. The tip of the second lever member 95 is engaged with the base end of the extending/retracting member 96 so as to be rotatable and movable in a predetermined distance relative to the base end of the extending/retracting member 96. In this way, the extending/retracting member 96 will extend and retract in association with the operation of the clutch switching mechanism 8, and the clutch switching mechanism 8 will move in the clutch off direction by the retraction movement of the extending/retracting member 96.

The extending/retracting member 96 will be movably guided in a straight line toward the pivot pawl 82 and the pressing member 88 by a pair of guide portions 27a, 27b formed on the bulge portion 27. The extending/retracting member 96 is a plate shaped member in which the second lever member 95 is linked to the base end of the extending/retracting member 96 so as to be rotatable and movable within a predetermined range. The extending/retracting member 96 includes on the tip thereof a first contact portion 96a that extends toward the pivot pawl 82 and is capable of contacting the lower surface of the pivot pawl 82, and a second contact portion 96b that is curved toward the pressing member 91 from the base of the first contact portion 96a. The extending/retracting member 96 is movable between a release position shown in FIG. 16 in which the second contact portion 96b can push with the pushing member 91 and the first contact portion 96a pushes the pivot pawl 82 and pivots the pivot pawl 82 to the reverse rotation allowed position, and an engaged position shown in FIG. 15 in which the first contact portion 96a is separated from the pivot pawl 82 and pushing by the pushing member 91 is not possible. More specifically, when the clutch switching mechanism 8 moves from the clutch off position to the clutch on position, the first and second lever members 94, 95 will pivot and the extending/retracting member 96 will extend out to the release position, and when the pressing member 91 is pressed by the reverse rotation of the motor 4, the extending/retracting member 96 will retract to the engaged position. In this way, the clutch cam 51 will rotate in the clutch on direction via the second and the first lever members 95, 94, and the clutch operation lever 50 will return to the clutch on position and the clutch mechanism 7 will be placed in the clutch on state.

Configuration of the Second Clutch Return Mechanism

The second clutch return mechanism 12 will, in response to the rotation of the handle 2a in the line winding direction, return the clutch cam 51 disposed in the clutch off position to the clutch on position and restore the clutch mechanism 7 to the clutch on state, and will return the clutch operation lever 50 from the clutch off position to the clutch on position by the clutch cam 51, as seen in FIGS. 11 and 12. The second clutch return mechanism 12 is formed from the engagement member 61 described earlier, the ratchet wheel 62 having ratchet teeth 62a formed on the outer periphery thereof, and a second torque spring 66 that alternately urges the engagement member 61 toward an engaged position and a non-engaged position. The engagement member 61 is pivotably supported on the second projection portion 56b of the clutch cam 51 as described above, and includes a first projection 61a in which the tip thereof engages with the ratchet teeth 62a of the ratchet wheel 62, and a second projection 61b that extends leftward in FIG. 11 of the first projection 61a.

The first projection 61a is curved toward the outside of the ratchet wheel 62, and the second projection 61b is curved in the opposite direction toward the fixing frame 20. A deformed trapezoidal shaped guide projection 20a that engages with the second projection 61b is formed on the fixing frame 20. The guide projection 20a is provided in order to control the pivot direction of the engagement member 61 by engaging with the second projection 61b.

When the engagement member 61 is disposed in the engaged position, the first projection 61a is positioned on the inner peripheral side of the outer periphery of the ratchet wheel 62 and is engagable with the ratchet teeth 62a, and when the engagement member 61 is disposed in the non-engaged position, the first projection 61*a* will be positioned in a slightly separated position from the outer periphery of the ratchet wheel 62. The engagement member 61 is disposed forward and upward of the axial center of the ratchet wheel 62. Because of this, the amount of empty space on the rear side of the ratchet wheel 62 will be smaller compared to a conventional example in which the engagement member 61 is disposed rearward of the ratchet wheel 62. The first projection 61*a* of the engagement member 61 is pulled by the ratchet teeth 62*a*, and rotates from the engaged position in FIG. 12 to the non-engaged position shown in FIG. 11.

Note that a description of the level wind mechanism and the casting control mechanism will be omitted because they have the same configuration as those in conventional electric reels.

Clutch Switching Operation

Next, the clutch switching operation of the electric reel will be described.

In the normal state, the clutch yoke 52 is pushed inside in the pinion gear shaft direction by the coil spring 54, and in this way the pinion gear 35 is moved to the clutch on position. In this state, the engagement recess 35*a* of the pinion gear 35 and the engagement projection 46*a* of the second gear 46 will mesh, and will be placed in the clutch on state.

When the tackle is to be thrown into the water, the clutch operation lever 50 will be pivoted to the clutch off position shown in FIG. 12. When the clutch operation lever 50 is pivoted from the clutch on position shown in FIG. 11 to the clutch off position shown in FIG. 12, the clutch cam 51 will rotate counter-clockwise in FIG. 11. As a result, the clutch yoke 52 will come into contact with the cam projections 57*a*, 57*b* of the clutch cam 51, and the clutch yoke 52 will be moved outward in the pinion gear shaft direction. Because the clutch yoke 52 is engaged with the neck portion 35*c* of the pinion gear 35, by moving the clutch yoke 52 outward, the pinion gear 35 will also move in the same direction. In this state, the mesh between the engagement recess 35*a* of the pinion gear 35 and the engagement projection 46*a* of the second gear 46 will separate, and will be placed in the clutch off state. In this clutch off state, the spool 3 will be placed in a freely rotatable state. As a result, the fishing line will be reeled out from the spool 3 by the weight of the terminal tackle.

Then, during the line dispatch mode, if for example the amount of line reeled out exceeds a predetermined amount (e.g., when the water depth display of the terminal tackle is 6 meters), or if the rotational speed of the spool 3 exceeds a predetermined speed, the motor 4 will rotate in the line winding direction. In this clutch off state, even if the motor 4 is rotating normally, the planetary gear mechanism 40 will not reduce speed because the second gear 46 rotates. However, the friction between the planetary gear mechanism 40 and the spool 3 will be reduced, and the spool 3 will rotate in the line release direction at a speed faster than the free rotation state.

In addition, when the clutch cam 51 rotates to the clutch off position, the engagement member 61 of the second clutch return mechanism 12 will be guided by the guide projection 20*a* and pivot in the clockwise direction, and at the point at which the dead point is exceeded, the clutch cam 51 will be urged inward of the ratchet wheel 62 by the second torque spring 66. As a result, the engagement member 61 is disposed in the engaged position that is engaged with the ratchet teeth 62*a*.

Furthermore, when the clutch cam 51 rotates to the clutch off position, the linking mechanism 89 of the first clutch return mechanism 11 will extend outward from the engaged position shown in FIG. 15 to the release position shown in FIG. 16. When the extending/retracting member 96 extends outward to the release position, the first contact portion 96*a* will contact with the pivot pawl 82 of the second one way clutch 10, and the pivot pawl 82 will pivot from the reverse rotation prevention position shown in FIG. 15 to the reverse rotation allowable position shown in FIG. 16. As a result, the motor 4 will be placed in the reverse rotation capable state. In addition, when the extending/retracting member 96 extends outward to the release position, the second contact portion 96*c* will be disposed in a position in which the projection portion 91*b* of the pressing member 91 can press.

When the terminal tackle is to be placed in a location where fish are, the motor 4 will be reverse rotated, the handle 2*a* will be rotated in the line winding direction, or the clutch operation lever 50 will be pivoted to the clutch on position and the line release of the spool 3 will be stopped. During the automatic fish location stop mode, the line release of the spool 3 will automatically stop at the location of fish by the reverse rotation of the motor 4.

When the motor 4 reverse rotates, the clutch on state will return due to the first clutch return mechanism 11. When the motor 4 reverse rotates, as shown in FIG. 16, the pressing member 91 will reverse rotate (rotation in the clockwise direction of FIG. 16), any of the three projection portions 91*b* will press the second contact portion of the extending/retracting member 96, and the extending/retracting member 96 will retract from the release position to the engaged position. Then, the clutch cam 51 linked to the first lever member 94 will rotate in the clockwise direction in FIG. 12 via the second lever member 95 and the linking shaft 93. At this point, when the dead point of the first toggle spring 65 is exceeded, the clutch cam 51 will return to the clutch on position and thus the extending/retracting member 96 will also return to the engaged position. In addition, when the clutch cam 51 is rotated clockwise toward the clutch on position, the clutch yoke 52 that came into contact with the cam projections 57*a*, 57*b* of the clutch cam 51 will go downward from the cam projections 57*a*, 57*b*, and will move inward in the spool shaft direction by the urging force of the coil spring 54. As a result, the pinion gear 35 will also move inward in the spool shaft direction, and will be placed in the clutch on position. In addition, when the clutch cam 51 rotates clockwise in FIG. 12, the clutch operation lever 50 engaged with the first projection portion 56*a* will also pivot to the clutch on position. In this way, the clutch mechanism 7 can be placed in the clutch on state from the clutch off state without operating the clutch operation lever 50. In addition, when the extending/retracting member 96 returns to the engaged position, the pivot pawl 82 urged by the spiral coil spring 83 will return to the reverse rotation prevention position, the first one way clutch 9 will be placed in the reverse rotation prevention state, and the reverse rotation of the motor 4 will be prohibited.

During the reverse rotation of the motor 4, the pressing member 91 mounted on the mechanism mounting shaft 75 via the roller clutch 90 will strike the second contact portion 96*b* of the extending/retracting member 96 and push the same. At this point, friction will be applied to the pressing member 91, and in that way torque will be applied to the serrations 30*a* of the fixing component of the mechanism mounting shaft 75 and the output shaft 30. Because this component has a small diameter, the force in the tangential direction will increase, and this component may spin unconnectedly when a power source voltage is applied as is to the motor 4. Accordingly, in the present embodiment as described above, the motor 4 will be controlled with a gradually increasing duty ratio, and the voltage applied to the motor 4 will be gradually raised up to a voltage capable of pressing the extending/retracting member 96. As a result, when reverse rotation begins, the torque at the point in which the pressing member 91 strikes the extending/retracting member 96 will be reduced, and it will be difficult for the drive components mounted on the output shaft 30 of the mechanism mounting shaft 75 on which the pressing member 91 is mounted to spin unconnectedly.

When the handle 2a rotates in the line winding direction, the clutch on state will return due to the operation of the second clutch return mechanism 12. When the handle 2a is rotated in the line winding direction, the handle shaft 33 will rotate in the clockwise direction in FIG. 12. The ratchet wheel 62 non-rotatably and fixedly coupled to the handle shaft 33 will also rotate in the clockwise direction. When the ratchet wheel 62 rotates in the clockwise direction, the first projection 61a of the engagement member 61 will be blocked by the ratchet teeth 62a and the engagement member 61 will be pulled.

When the engagement member 61 is pulled, the engagement member 61 will be guided by the guide projection 20a and pivot in the counter-clockwise direction, and the engagement member 61 will be urged outward of the ratchet wheel 62 at the point at which the dead point of the second toggle spring 66 is exceeded. Then, the engagement member 61 will pivot outward toward the non-engaged position at which the engagement member 61 is not engaged with the ratchet wheel 62.

In addition, when the engagement member 61 is pulled, the clutch cam 51 linked with the engagement member 61 will rotate in the clockwise direction in FIG. 12, and will return to the clutch on position in the same way as described above. Here as well, the clutch mechanism 7 can be placed in the clutch on state from the clutch off state without operating the clutch operation lever 50.

The engagement member 61 of the second clutch return mechanism 12 is disposed upward and forward of the handle shaft 33. The upward and forward position of the handle shaft 33 will be in an empty space in the event that the counter 5 is provided. When the engagement member 61 is arranged in this empty space, the bulge of the reel unit can be reduced compared to a conventional configuration in which the engagement member is disposed rearward and below the handle shaft.

Note that even if the first and second clutch return mechanism 11, 12 returns the clutch operation lever 50 from the clutch off position to the clutch on position, it goes without saying that the extending/retracting member 96 will return to the engaged position and the engagement member 61 will return to the non-engaged position.

When a fish is hooked on the tackle in the clutch on state, the spool 3 will be rotated in the line winding direction and the fishing line wound up by the rotational drive of the handle 2a or the motor 4.

During manual line winding, the rotation of the handle 2a in the line winding direction (rotation in the clockwise direction in FIG. 11) will be accelerated and transmitted to the spool 3 via the handle shaft 33, the main gear 34, the pinion gear 35, and the planetary gear mechanism 40. At this point, the reverse rotation of the motor 4 (rotation in the counter-clockwise direction viewed from the right side of FIG. 8) will be prohibited by the second one-way clutch 10. Because of this, the first sun gear 41 of the planetary gear mechanism 40 will not reverse rotate, the rotation will be transmitted from the second gear 46 that rotates in the line winding direction (rotation in the clockwise direction viewed from the right side of FIG. 8) to the internal gear 3d via the second planetary gear 44, the first carrier, and the first planetary gear 43, and the spool 3 will be driven at an increased speed in the line winding direction.

In addition, during motor drive, the rotation of a normally rotating motor 4 (rotation in the clockwise direction viewed from the right side of FIG. 8) will be transmitted to the spool 3 via the planetary gear mechanism 40. At this point, the rotation of the handle shaft 33 in the line release direction (rotation in the counter-clockwise direction viewed from the right side of FIG. 9) will be prohibited by the first one-way clutch 9, and thus the reverse rotation of the second carrier 46 (rotation in the clockwise direction viewed from the right side of FIG. 9) will be prohibited. Because of this, the rotation of the decelerated second sun gear 42 will be transmitted to the internal gear 3d via the second planetary gear 44, and the spool 3 will be driven at a reduced speed.

In addition, as shown in FIG. 17, when the motor 4 normally rotates in the clutch on state (rotation in the counter-clockwise direction in FIG. 17), the quieting cam 85 of the pawl control mechanism 84 will rotate in the same direction, and the pawl portion 82a of the pivot pawl 82 will stop in a position in which the pressing portion 85a will press by the rotation restriction portion 86. At this point, the quieting cam 85 is only frictionally engaged with the mechanism mounting shaft 75, and thus the motor 4 will rotate as is. As a result, the pivot pawl 82 will be pressed by the pressing portion 85a and the projection portion 81a of the ratchet 81 will pivot up to a position that intersects with the projection portion 81a toward the reverse rotation allowable position, and the ratchet 81 will no longer be in contact with the pivot pawl 82. Because of this, when the motor 4 rotates normally, clicking sounds caused by repeated contact of the pivot pawl 82 of the one-way clutch 9 with the ratchet 81 will not be produced, and quieting can be achieved.

When the motor 4 reverse rotates, the quieting cam 85 will rotate in the same direction, and as shown in FIG. 16, the pressing portion 85a will stop at a position separated from the pawl portion 82a by the rotation restriction portion 86, and the pivot pawl 82 will be urged by the spiral coil spring 83 and return to the reverse rotation prevention position.

In addition, when the motor 4 rotates normally in the clutch off state like in the line dispatch mode, the quieting cam 85 will rotate in the same direction and quieting can be produced. At this point, the pressing member 91 is mounted on the mechanism mounting shaft 75 via the roller clutch 90 that transmits only the reverse rotation of the motor 4, and thus the rotation of the mechanism mounting shaft 75 will not be transmitted to the pressing member 91. Because of this, even if the extending/retracting member 96 comes close to contacting the pressing member 91 in the clutch off state, the pressing member 91 will not press the extending/retracting member 96, and problems caused due to the pressing member 91 pressing the extending/retracting member 96 will not occur.

Operation of the Reel Control Unit

Next, the specific control processes that are performed by the reel control unit 100 will be described in the control flowcharts of FIG. 18 and onward.

Figure 18:
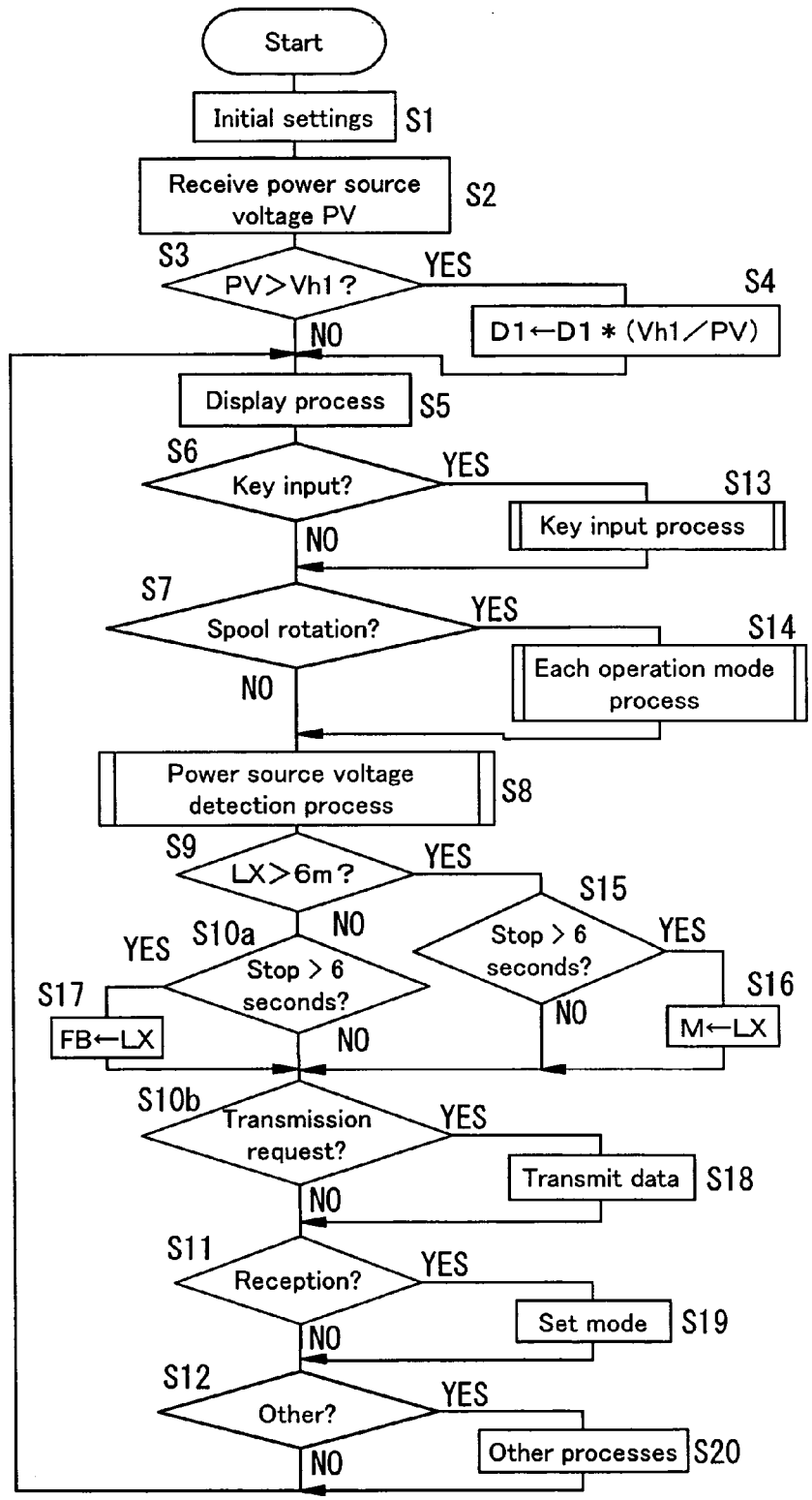
FIG. 18 is a control flowchart of a main routine of a reel control unit in accordance with the first embodiment of the present invention.

When the electric reel is connected to an external power source, the initial setting will be performed in Step S1 of FIG. 18. In these initial settings, the counted value of the number of spool rotations is reset, and various variables and flags will be also reset. In Step S2, the power source voltage PV detected by the power source voltage sensor 103 is read in. In Step S3, it will be determined whether or not the power source voltage PV is higher than Vh1 (e.g., 12 volts), in other words, it will be determined whether or not a type of high power source voltage storage battery different from a lead battery is connected to the reel. If a battery of a type having a high power source voltage PV (e.g., a lithium battery or a nickel hydrogen battery) is connected, then the routine will move from Step S3 to Step S4, and the duty ratio D1 during normal motor rotation will be corrected in accordance with the detected power source voltage PV. More specifically, a value (Vh1/PV) in which Vh1 (e.g., 12) is divided by the power source voltage PV will be multiplied by the basic duty ratio D1 to arrive at a new duty ratio D1. In this way, even if the power source voltage PV fluctuates, the rotational state of the spool 3 will rarely fluctuate when the control is performed with the duty ratio during normal rotation (during line winding). Also, the voltage applied to the motor 4 during reverse rotation (during clutch return) will rarely fluctuate. Note that in this embodiment, after the initial settings in which the power source is connected, the determination of the power source voltage PV is performed only once in order to identify the power source. However, the determination may be performed a plurality of times after the power source connection.

Next, display processes will be performed in Step S5. Here, various display processes such as the water depth display and the like are performed. In Step S6, it will be determined whether or not any of the buttons of the operation key unit 99 or the adjustment lever 101 have been operated. In Step S7, it will be determined whether or not the spool 3 is rotating. This determination is based on the output of the spool sensor 102. In Step S8, the power source voltage detection process shown in FIG. 24 will be performed in order to monitor for voltage irregularities. In Step S9, it will be determined whether or not the water depth data LX calculated based on the output of the spool sensor 102 exceeds 6 meters. In Step S10a, when the water depth data LX is 6 meters or less, it will be determined whether or not the spool 3 has stopped for longer than 6 seconds. In Step S10b, the presence or absence of a request to transmit data to the fish finder monitor 120 will be determined. In Step S11, it will be determined whether or not any data has been received from the fish finder monitor 120. In Step S12, it is determined whether or not other commands or input have been performed. If these determinations are complete, the routine will return to Step S5.

Figure 19:
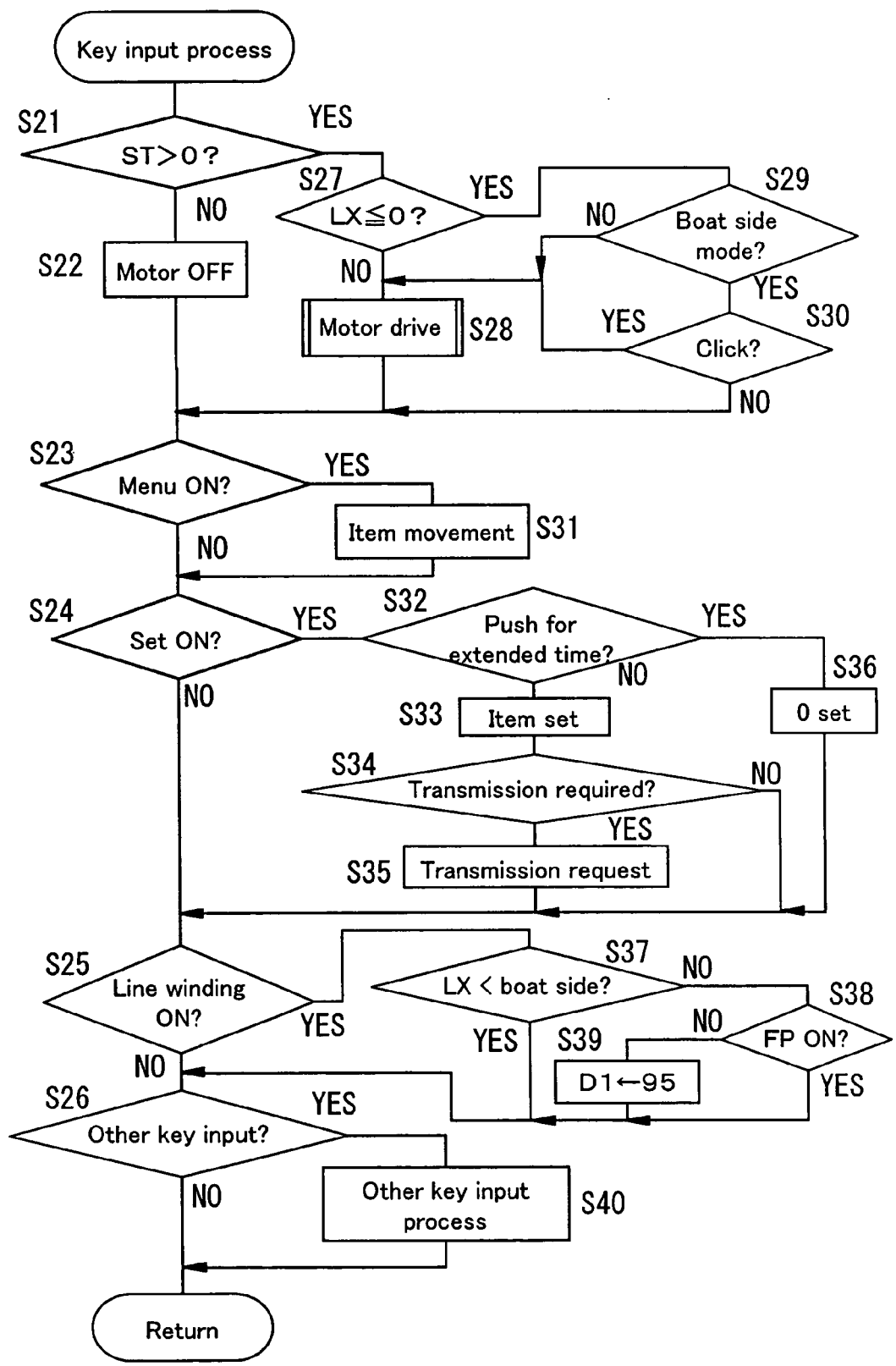
FIG. 19 is a control flowchart of a key input process of the reel control unit in accordance with the first embodiment of the present invention.

In the event that there has been a key input from the operation key unit 99 or the adjustment lever 101, the routine will move from Step S6 to Step S13, and the key input process shown in FIG. 19 will be executed. In Step S7, if rotation of the spool 3 has been detected, the routine will move from Step S7 to Step S14, where each operation mode process shown in FIG. 21 will be executed. In Step S9, if the water depth data LX exceeds 6 meters, the routine will move from Step S9 to Step S15.

In Step S15, it will be determined whether or not the duration of time during which the terminal tackle has stopped at the water depth LX exceeds 6 seconds. If 6 seconds have been exceeded, the terminal tackle is thought to be stopped at the location of fish, and thus the routine will move to Step S16 and the water depth LX will be set as a fish location M. When the water depth data LX is 6 meters or less in Step S9, and if the spool 3 is stopped for more than 6 seconds in Step S10a, it is thought that the terminal tackle is stopped at the side of the boat. Because of this, the routine will move from Step S10a to Step S17, and the water depth data LX will be set to a boat side line length FB.

In Step S10b, if there is a transmission request, the routine will move from Step S10b to Step S18. In Step S18, the requested data will be transmitted to the fish finder monitor 120. For example, the water depth data LX and the items set on the reel side will be transmitted to the fish finder monitor 120. If it is determined that the data from the fish finder monitor 120 has been transmitted, the routine will move from Step S11 to Step S19. In Step S19, a reception setting process will be performed in which various settings such as the jig mode and the auto-jig mode will be performed by the received details. If other commands or input have been performed in Step S12, the routine will move from Step S12 to Step S20 and other processes will be executed.

Key Input Process

In the key input process of Step S13 shown in FIGS. 18 and 19, it will be determined in Step S21 whether or not the level ST operated by the adjustment lever 101 is zero. Here, when the level ST is zero, the routine will move to Step S22, and the motor 4 will stop (turn off). Note that if the motor 4 has already been stopped, the motor 4 will remain in the stopped state. In Step S23, it will be determined whether or not the menu button MB has been operated. In Step S24, it will be determined whether or not the set button DB has been operated. In Step S25, it will be determined whether or not the speed winding button HB has been operated. In Step S26, it will be determined whether or not other key operations have been performed, such as for example the operation of the fish location memo button TB, or an operation in which the learning mode is set by operating the fish memo button TB and the speed wind button HB for a predetermined period of time.

If the level ST of the adjustment lever 101 is not zero in Step S21, the routine will move from Step S21 to Step S27. In Step S27, it will be determined whether or not the water depth data LX is zero or less. Note that when the water depth data LX is 6 meters or less as described above, the boat side mode will be set automatically when the spool 3 is in the stopped state for a predetermined time period of time or longer (e.g., six seconds). When the water depth data LX is not zero or less, the routine will move to Step S28 and the motor drive process shown in FIG. 20 will be executed. When the water depth data LX is zero or less, the routine will move from Step S27 to Step S29.

In Step S29, it will be determined whether or not the boat side mode has been set. With this embodiment, in a boat side mode that is set in order to protect the tip of the fishing rod (a mode in which the winding of the spool is stopped automatically in a state in which it will be easy to recover the terminal tackle), when the water depth data LX is zero or less, further line winding will not be performed even if the adjustment lever 101 is operated. When not in the boat side mode, the routine will move to Step S28 and the motor drive process will be executed. When in the boat side mode, the routine will move to Step S30, and it will be determined whether or not there have been more than two clicks of operation of the adjustment lever 101 (i.e., at least three pivoting operations in different pivoting directions) toward the level ST=0 (the pivot initiation position) within a predetermined time period (e.g., 3 seconds). By this special click operation, the spool 3 can be driven in the line winding direction even when in the boat side mode and when the water depth data LX is zero or less. Thus, if it is determined that the click operation has been performed, the routine will move to Step S28 and the motor drive process will be executed. If the click operation has not been performed, the routine will move to Step S23 without performing any process in order to prevent motor drive.

If the menu button MB is operated in Step S23, the routine will move from Step S23 to Step S31, and the items such as text and the location of fish displayed on the water depth display unit 98 will flash each time the menu button MB is operated, and the selection of items will be performed.

If the set button DB is operated in Step S24, the routine will move from Step S24 to Step S32. In Step S32, it will be determined whether or not the set button DB has been pushed for and extended period of time (three seconds or more). If the set button DB has not been pushed for an extended period of time, the routine will move to Step S33. On the other hand, if it is determined that the set button DB has been pushed for an extended period of time, the routine will move from Step S32 to Step S36. In Step S36, the current water depth data LX will be set to zero as the reference line length (a standard line length). In this way, additional water depth will be displayed with the line length from the position of the water depth data LX set to zero.

In Step S33, the selected items will be set, and the routine will move to Step S34. In Step S34, it will be determined whether or not there is a need to transmit the selected items to the fish finder monitor 120. If there is, the routine will move to Step S35, where a transmission request for those items will be performed. If transmission is not necessary in Step S34, the routine will skip Step S35 and move to Step S25.

In Step S25, if the speed winding button HB is operated, the routine will move from Step S25 to Step S37. In Step S37, it will be determined whether or not the water depth data LX is less than the boat side line length FB. When the water depth data LX is equal to or greater than the boat side line length FB, the routine will move to Step S38, and it will be determined whether or not a prevent flag FP that serves to prevent the drive of motor 4 and which is set in a power source voltage detection process (described below) has been set (turned on). When the prevent flat FP is not set, the routine will move to Step S39, and the first duty ratio D1 will for example be set to 95%, and the motor 4 will be driven at the highest speed.

When the water depth data LX is less than the boat side length FB in Step S37, the routine will move to Step S26 in order to make operation of the speed winding button HB invalid. If there is other key input such as operation of the memo button TB or an operation to enter the line winding learning mode in Step S26, the routine will move from Step S26 to Step S40, the key input process corresponding to the operation will be performed, and the routine will return to the main routine.

The motor drive process by the adjustment lever 101 of Step S28 in FIG. 19 will now be explained in more details. In the motor drive process, if the level ST is one of level 1 to level 4, the rotational speed of the spool 3 (one example of the rotational speed of the motor 4) will be detected and the motor 4 will be controlled at a constant speed. If the level ST is one of level 5 to level 30, the motor 4 will be torque controlled so that the tension on the fishing line is constant.

Motor Drive Process

Figure 20:
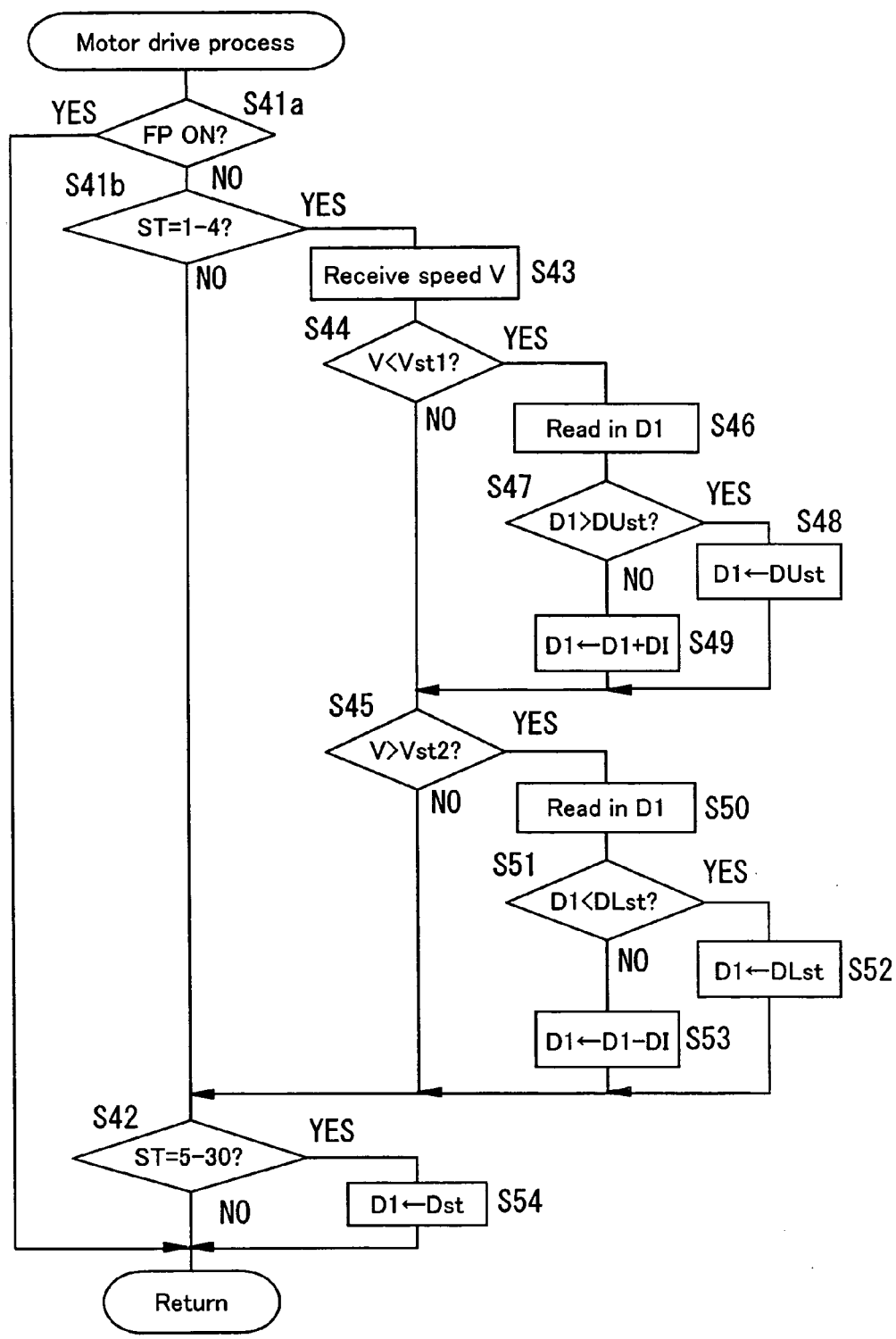
FIG. 20 is a control flowchart of a motor drive process of the reel control unit in accordance with the first embodiment of the present invention.

In the motor drive process shown in FIG. 20, it will be determined in Step S41a whether or not the prevent flat FP described above is set. If the prevent flag FP is set, the process will be completed and the routine will return to the key input process. If the prevent flag FP is not set, the routine will move to Step S41b. In Step S41b, it will be determined whether or not the level ST is at one of levels 1 to 4 according to the pivot angle of the adjustment lever 101. Note that this determination will be performed based on the voltage of the signal output from the potentiometer 104. In Step S42, it will be determined whether or not level ST is at one of levels 5 to 30.

If the level ST is at one of levels 1 to 4, the routine will move from Step S41b to Step S43. In Step S43, the speed V output from the spool sensor 102 will be read in. In Step S44, it will be determined whether or not the speed V of the spool 3 is less than a minimum speed Vst1 that corresponds to level ST. If the speed is not less than the minimum speed Vst1, the process proceeds to Step S45. In Step S45, it will be determined whether or not the speed V of the spool 3 exceeds a maximum speed Vst2 that corresponds to level ST. Note that the minimum speed Vst1 and the maximum speed Vst2 are provided for each level ST that controls the speed when the level ST is one of the levels 1 to 4, because as long as the fluctuation of the speed is between the speeds Vst1 and Vst2, the duty ratio will not fluctuate, repeated fluctuations of the duty ratio will not occur, and feedback control will be stable. The maximum speed Vst2 and the minimum speed Vst1 will be set to be within, for example, ±10% of a target speed Vst.

If the speed V is less than the minimum speed Vst1 in S44, the routine will move from Step S44 to Step S46, and the current first duty ratio D1 will be read in. The first duty ratio D1 is stored in the memory unit 107 each time the setting is changed. In addition, a maximum value DUst and a minimum value DLst are set for each level ST, and when each level ST is first set, the first duty ratio D1 is set to be the medium value those two values, e.g., first duty ratio D1= ((DUst+DLst)/2).

In Step S47, it is determined whether or not the current first duty ratio D1 exceeds the maximum value DUst of the set level. If the current first duty ratio D1 does exceed the maximum value DUst of the set level, the routine moves to Step S48, and the maximum value DUst is set to be the first duty ratio D1. If the current first duty ratio D1 does not exceed the maximum value DUst of the set level, the routine moves from Step S47 to Step S49, the first duty ratio will be increased only by a predetermined increment DI (e.g., 1%), and the routine will move to Step S45. Note that the maximum value DUst of the highest level (ST=4) is set to be 85% or less. Thus, the maximum value of the adjustment operation by the adjustment lever 101 will be a duty ratio of 85%.

If the speed V exceeds the maximum speed Vst2, the routine will move from Step S45 to Step S50, and the current first duty ratio D1 will be read in. The first duty ratio D1 should be the same as that read in in Step S46. In Step S51, it is determined whether or not the current first duty ratio D1 is less than the minimum value DLst of the set level. If the current first duty ratio D1 is less than the minimum value DLst of the set level, the routine moves to Step S52, and the minimum value DLst is set to be the first duty ratio D1. If the current first duty ratio D1 is not below the minimum value DLst of the set level, the routine moves from Step S51 to Step S53, the first duty ratio will be decreased only by a predetermined increment DI (e.g., 1%), and the routine will move to Step S42.

If the level ST is level 5 to 30, the routine will move from Step S42 to Step S54. In Step S54, the first duty ratio D1 will be set to a duty ratio Dst corresponding to the level ST. In this way, when the level ST is one of the levels 5 to 30, the electrical current that flows to the motor 4 will be controlled so as to increase for each level, and the motor 4 will be torque controlled. The duty ratio Dst that corresponds to each level ST is the value of a reference line winding diameter (e.g., the diameter of the spool bobbin) for each level ST, and when the line winding diameter increases, the duty ratio Dst will also gradually increase in a step-wise manner in proportion to the increase in the line winding ratio. In this way, the torque will increase in accordance with the line winding diameter, the torque will increase as the line winding diameter increases, and the tension on the fishing line will be approximately constant. Note that the maximum duty ratio at the maximum value DUst of the highest level (ST=4) during constant speed control and the highest level (ST=30) during torque control is set to be 85% or less. Thus, the maximum value of the adjustment operation by the adjustment lever 101 will have a duty ratio of 85%.

Operation Mode Process

The operation mode process of Step S14 in FIG. 18 will now be explained referring to FIG. 21. In S61, it will be determined whether or not the rotational direction of the spool 3 is in the line release direction. This determination is made based on whether or not any of the Hall elements of the spool sensor 102 has generated a pulse. If it is determined that the rotational direction of the spool 3 is the line release direction, the routine moves from Step S61 to Step S62. In Step S62, each time the counted value of the pulse output from the spool sensor 102 decrease, data showing the relationship between the water depth stored in the reel control unit 100 and the counted value will be read out, and based upon the counted value, the water depth data LX will be calculated. The water depth data LX will be eventually displayed as a large seven-segment text in the central portion of the water depth display unit 98 in the display process of Step S5 shown in FIG. 18. In Step S63, a transmission request for the water depth data LX will be performed, and the water depth data LX will be transmitted to the fish finder monitor 120 if there is a request to do so.

In Step S64, it is determined whether or not the line dispatch mode has been set. In Step S65, it is determined whether or not the fish position stop mode has been set. In Step S66, it is determined whether or not there are other modes being activated. When there are no other modes, each operation mode process is complete, and the routine will return to the main routine.

When the line dispatch mode is set in Step S64, the routine will move from Step S64 to Step S67. In Step S67, it will be determined whether or not the water depth data LX exceeds 6 meters. In the line dispatch mode, the release of the fishing line will wait to rotate the motor 4 normally until a predetermined water depth (6 m in this example) is reached, at which point it can be confirmed that the fishing line is released. If the water depth data LX exceeds 6 meters, the routine will move to Step S68, and the motor 4 will rotate normally. In this way, as described above, the friction between the planetary gear mechanism 40 and the spool 3 can be reduced, and the spool 3 will rotate in the line release direction at a high speed. When the water depth data LX is 6 meters or less, the routine will skip Step S68.

If the fish locations stop mode is set, the routine will move from Step S65 to Step S69. In Step S69, it is determined whether or not the obtained water depth data LX matches the fish location M, i.e., whether or not the terminal tackle has reached the location of the fish. The fish location will be automatically set when, as noted above, the terminal tackle is stopped for a predetermined period of time or longer, or will be set when the terminal tackle reaches the fish location and the memo button TB is pushed. If the water depth data LX matches the fish location M, the process moves from Step S69 to Step S70.

In Step S70, the buzzer 106 will sound in order to alert the fisherman that the terminal tackle is in the fish location. In Step S71, the motor 4 is reverse rotated for a predetermined period of time. At this point, the duty ratio will be gradually increased, and the voltage applied to the motor 4 will be gradually increased accordingly. In this way, it will be rare for excessive torque from friction to be applied to the mechanism mounting shaft 75, and for the mechanism mounting shaft 75 mounted on the output shaft 30 of the motor 4 to spin unconnectedly. Through the reverse rotation of the motor 4, the clutch mechanism 7 will, as described above, return to the clutch on state, via the clutch switching mechanism 8, by operation of the first clutch return mechanism 11. In this way, the rotation of the spool in the line release direction will stop. If the water depth data LX does not match the fish location M, the routine will skip Steps S70, S71 and proceed to Step S66. In Step S66, if other modes are activated, the routine moves from Step S66 to Step S72, and the other set mode processes will be executed.

In S61, if it is determined that the rotation of the spool 3 is the line winding direction, the routine moves from Step S61 to Step S73. In Step S73, each time the counted value of the spool sensor 102 is increased, the data stored in the reel control unit 100 will be read in and the water depth data LX will be calculated. The water depth data will be eventually displayed in the display process of Step S5 shown in FIG. 18. In Step S74, a transmission request for the water depth data LX will be performed as in Step S63, and the water depth data LX will be transmitted to the fish finder monitor 120 if there is a request to do so.

In Step S75, it will be determined whether or not the auto-jig mode has been set. If it is determined that the auto-jig mode is set, the routine will move from Step S75 to Step S78, where the auto-jig mode process shown in FIG. 22 will be executed. The auto-jig mode can be set with the fish finder monitor 120. In addition to when the auto-jig mode or the jig mode described below are set, the jig width (the range in which the jig operation will be performed) of the jig mode or the auto-jig mode, and the jig pattern, in other words the interval in which the motor 4 is turned on and off, can also be set.

Figure 28:
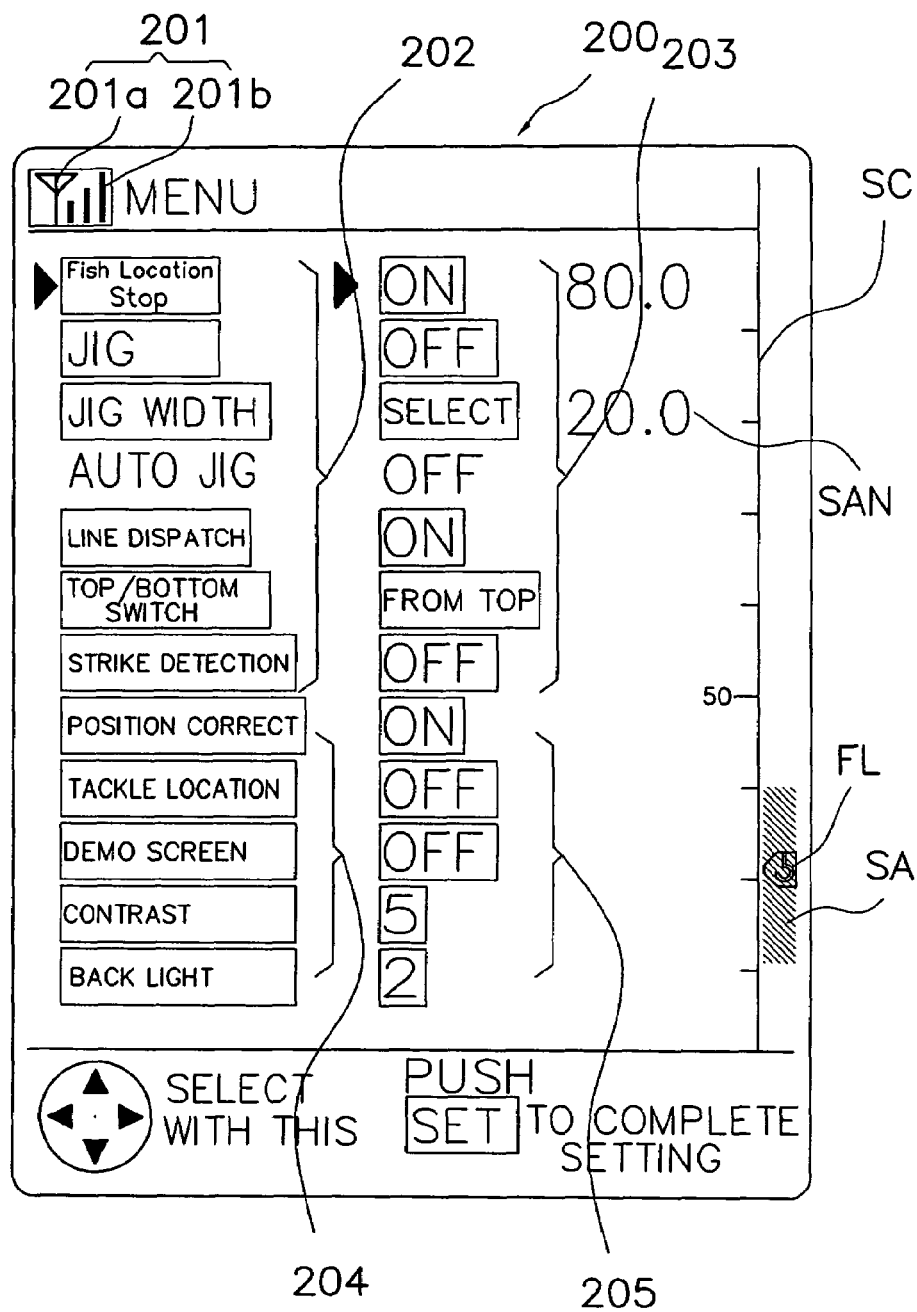
FIG. 28 is a figure showing a menu screen of a fish finder monitor in accordance with the first embodiment of the present invention.

If the jig width is set, the jig width SA will be displayed on the fish finder monitor 120 in the position corresponding to the water depth as shown in FIG. 28 with the hatching. Note that other data such as the fish location TL output from the fish finder 140, the terminal tackle location FL calculated from the water depth data LX, and the sea bottom BL are displayed on the fish finder monitor 120. In addition, as shown in FIG. 28, with the menu screen on the fish finder monitor 120, various types of settings can be performed on the electric driven reel 1, including the auto-jig setting AS and the jig width SA.

In Step S76, it will be determined whether or not the jig mode has been set. The jig mode is a mode in which when the jig on/off button of the fish finder monitor 120 is operated, a jig operation will be performed with a jig pattern set with the jig width range set from the water depth. If the jig mode is on, the routine proceeds to Step S79 and performs the jig mode, otherwise, the routine proceeds to Step S77. In Step S77, it will be determined whether or not the boat side mode has been set.

Auto-Jig Process

Figure 22:
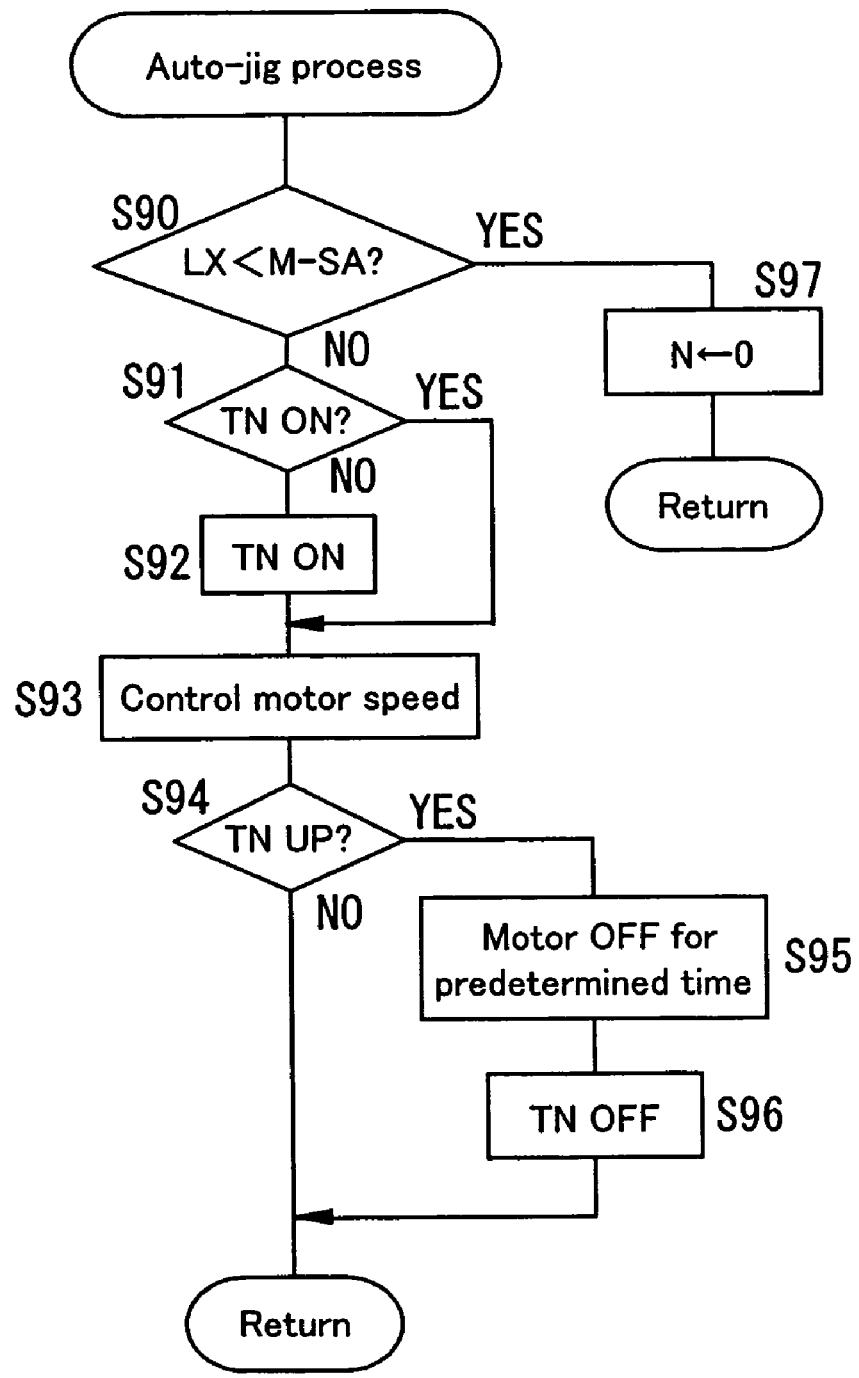
FIG. 22 is a control flowchart of an auto-jig process of the reel control unit in accordance with the first embodiment of the present invention.

The auto-jig mode of Step S78 will now be explained referring to FIG. 22. The auto-jig process will perform a jig operation that will turn the motor 4 on and off in a range (the jig width SA) set according to a jig pattern set from the fish location M. More specifically, it will be determined in Step S90 of FIG. 22 whether or not the water depth LX is being wound up beyond the jig width SA from the fish location M.

If the terminal tackle is within the jig width SA, the routine will move to Step S91. In Step S91, it will be determined whether or not a timer TN that sets the jig frequency, which determines the duration of time during which the terminal tackle is to be wound up during jigging, is on (started). The value of the timer TN will differ according to the jig pattern. If the timer TN is not on, then a beginning jig operation will be performed. When the timer TN is not on, the routine will move to Step S92, and the timer TN will be turned on (be started).

In Step S93, the motor 4 will be set to a duty ratio DN, and the motor 4 will be controlled at a speed that corresponds to the jig pattern. The details of the process of speed control will be omitted because they are similar to the control details of the motor drive process. The duty ratio DN will also differ depending upon the jig pattern. When the timer TN is already on in Step S91, the routine will skip Step S92.

In Step S94, it will be determined whether or not the timer TN has expired, or whether or not the terminal tackle has been wound up for a period of time that corresponds to the jig pattern. If the one wind-up operation is completed, the routine will move to Step S95, where the duty ratio D1 of the motor 4 will be set to zero, and the motor 4 will stop for a predetermined period of time. In Step S96, the timer TN is turned off.

If the distance the terminal tackle has been moved up exceeds the jig width SA in Step S90, the routine will move to Step S97, a variable N will be cleared to zero, and the routine will return to the each mode operation process S14 shown in FIG. 18. If the routine returns to the each operation mode process S14, the winding process of the motor 4 will continue until the terminal tackle reaches the side of the boat.

Jig Process

Figure 21:
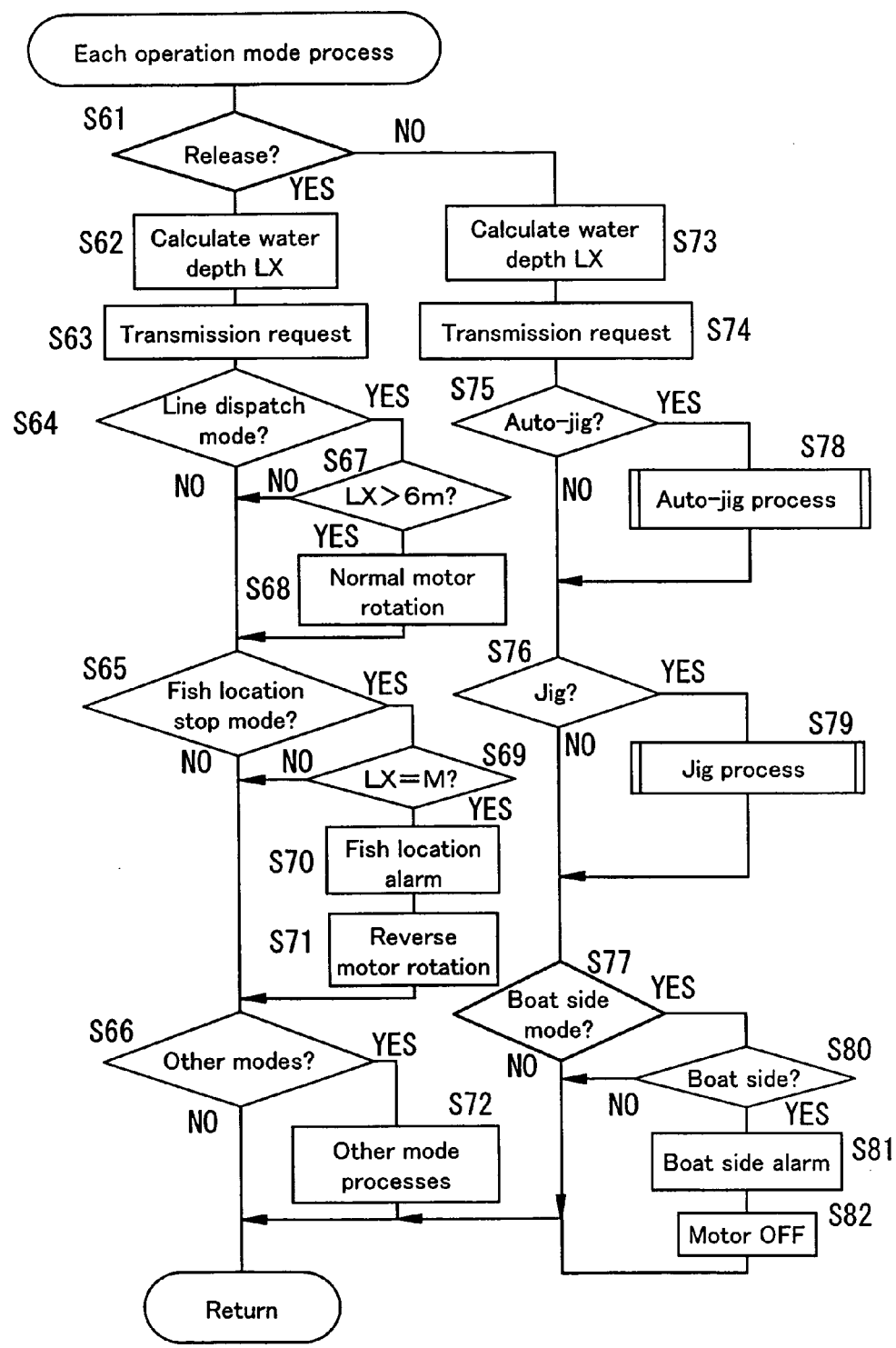
FIG. 21 is a control flowchart of each operation mode process of the reel control unit in accordance with the first embodiment of the present invention.

If it is determined in Step S79 of FIG. 21 that the jig mode has been set, then the routine will move from Step S76 to Step S79. In Step S79, the jig process shown in FIG. 23 will be executed. The jig process will perform a jig operation in which the motor 4 will be turned on and off according to a range (the jig range SA) of a jig pattern that is set with reference to an initial water depth RLX when the jig on/off button 134 is operated.

Figure 23:
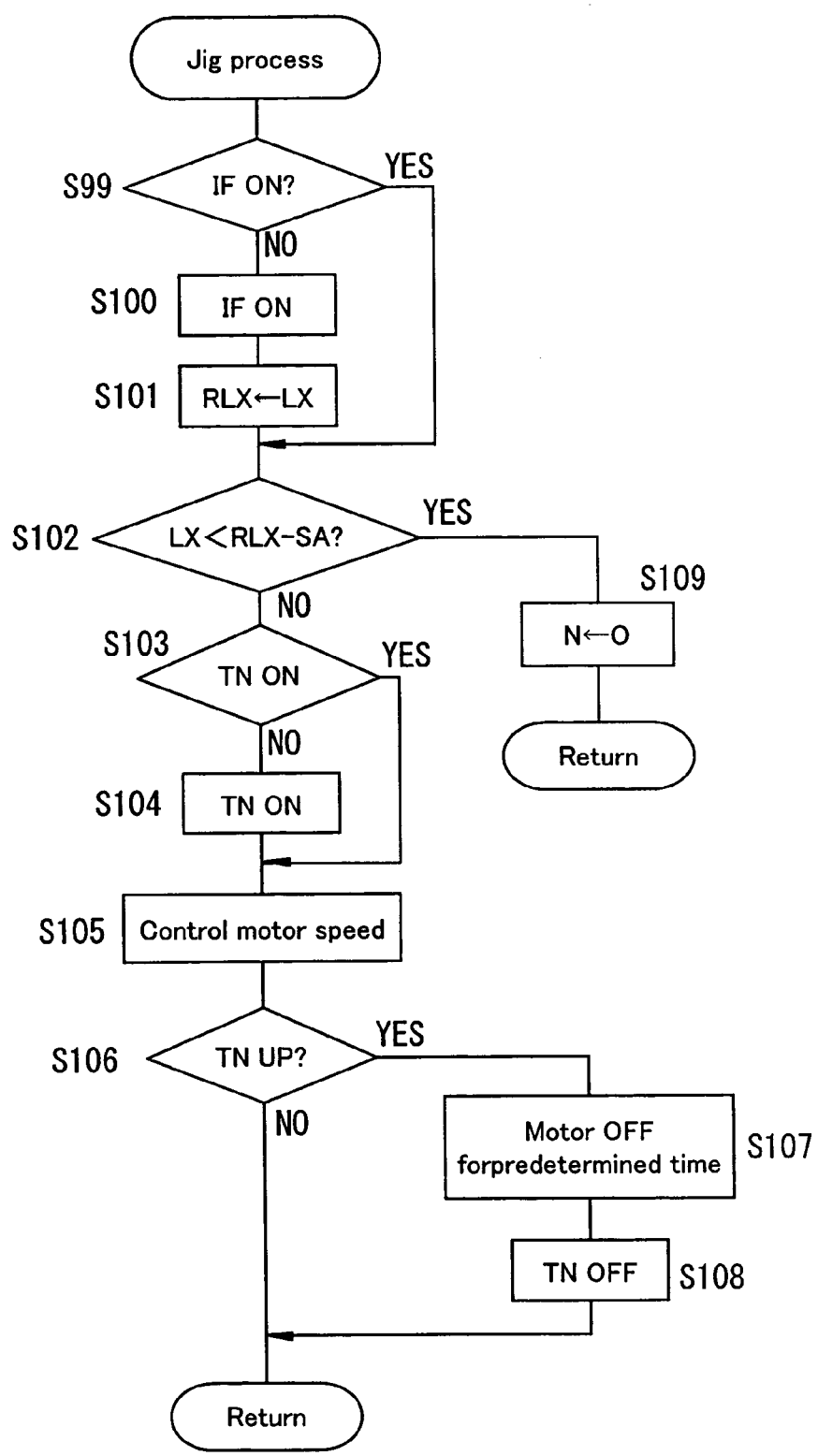
FIG. 23 is a control flowchart of a jig process of the reel control unit in accordance with the first embodiment of the present invention.

More specifically, in Step S99 of FIG. 23, it will be determined whether or not a jig flag IF is on, and whether the fact that the jig on/off button 134 has been pushed has been received with a reception means and that the jig mode has been entered. This determination is performed in order to determine whether or not the jig mode process has been entered for the first time after the jig on/off button 134 was operated. When the jig flag IF is not on in Step S99, e.g., when the jig mode has been entered for the first time, the routine will move to Step S100, and the jig flag IF will be turned on. In Step S101, the water depth LX at that point will be set as the initial water depth RLX.

When the jig flag IF is already on in Step S99, the routine will skip Steps S100 and S101, and will move to Step S102. The details of the process from Step S102 through Step S108 are the same as Step S90 through Step S97 of the auto-jig mode shown in FIG. 22 except that the initial water depth RLX is used instead of the fish location M in Step S102. Therefore, description of Steps 102 through Steps S108 will be omitted herein. Note that if the jig width SA is not set, the jig operation will be performed until the terminal tackle reaches the boat side.

Note also that in this embodiment, during the auto-jig mode and the jig mode, the spool 3 will be rotated and the fishing line will be wound with the same wind-up time and the same stop time, which are determined based on the jig frequency. However, the jig pattern is not limited to this, and the wind-up times and the stop times may be variable. Furthermore, the speed may also be varied during jigging.

If it is determined that the boat side mode has been set in Step S77 of FIG. 21, then the routine will move from Step S77 to Step S80. At Step S80, it will be determined whether or not the water depth data matches the boat side stop position. If the water depth data does not match the boat side stop position, in other words if fishing line has not be wound up until the terminal tackle reaches the boat side stop position, the process will return to the main routine. If the water depth data matches the boat side position, in other words the fishing line has been wound up until the terminal tackle reaches the boat side stop position, the routine will move from Step S80 to S81.

In Step S81, the buzzer 106 will sound in order to alert the fisherman that the terminal tackle is at the side of the boat. In Step S82, the motor 4 is turned off. This allows a fish that has been caught to be placed in a position where it is easy to grasp. As described above, the boat side stop position is set, for example, where the water depth is 6 meters or less and the spool 3 is stopped for a predetermined period of time or longer. The routine then returns to the main routine.

Power Source Voltage Detection Process

Figure 24:
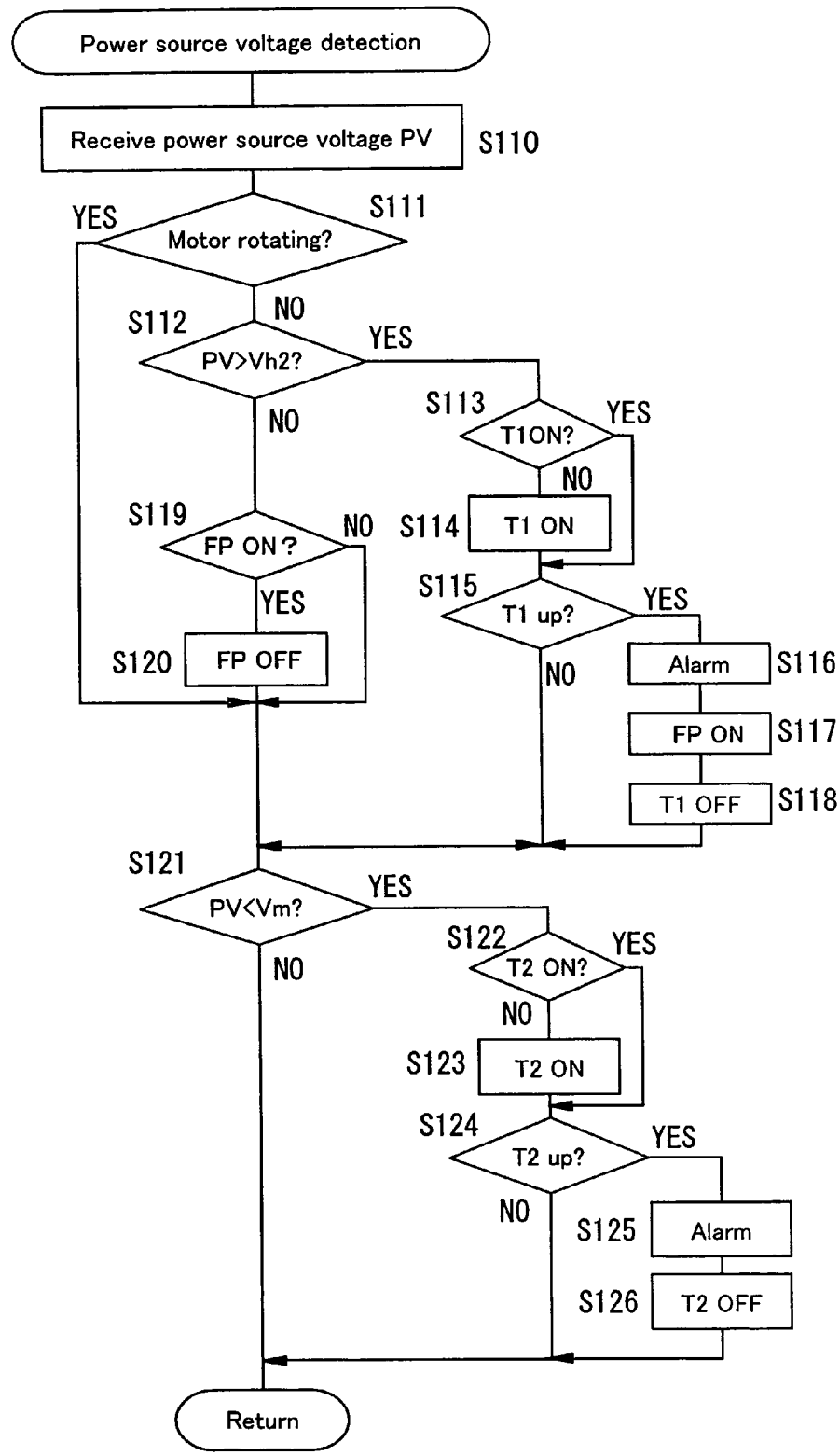
FIG. 24 is a control flowchart of a power source voltage detection process of the reel control unit in accordance with the first embodiment of the present invention.

In the power source voltage detection process of Step S8 of FIG. 18 will now be explained with reference to FIG. 24. In Step S110, the power source voltage PV will be obtained. In Step S111, it will be determined whether or not the motor 4 is rotating with, for example, the electrical current flowing to the motor 4. If the motor 4 is not rotating, the routine will move to Step S112. In Step S112, it will be determined whether or not the power source voltage PV exceeds an allowable maximum voltage Vh2 (e.g., 18 volts). If the power source voltage PV exceeds the allowable maximum voltage Vh2, the routine will move from Step S112 to Step S13.

In Step S113, it will be determined whether or not a timer T1 has been set that measures the time during which the allowable maximum voltage Vh2 is exceeded. If, for example a shared power source is being used by a plurality of electric reels during boat fishing, the timer T1 can eliminate a voltage increase caused by a momentary in-rush of voltage. When the timer T1 has not yet been set, the routine will move to Step S114, and the timer T1 will be set. The value of the timer T1 is, for example, preferably in a range between 0.1 to 1 second. In this range, damage to electrical equipment will rarely occur even if, for example, the voltage increase continues. If the timer T1 is already set, the routine will skip Step S14.

In Step S115, it will be determined whether or not the timer T1 has expired, i.e., it will be determined whether or not the power source voltage PV has exceeded the allowable maximum voltage Vh2 through the time T1. If the power source voltage PV has exceeded the allowable maximum voltage Vh2 through the time T1, the routine will move to Step S116, and for example the text "Err1" will be displayed instead of the water depth display on the water depth display portion 98a of the water depth display unit 98. In Step S17, the prevent flag FP will be set (turned on), which serves to make invalid the operation of the motor 4 by the adjustment lever 101 or the speed winding button HB, and prevent the operation of the drive of motor 4 until the power source voltage has dropped to or below the allowable maximum voltage Vh2. In Step S118, the timer T1 will be reset, and the routine will move to Step S121.

If the power source voltage PV is equal to or lower than the allowable maximum voltage Vh2 in Step S112, the routine will move from Step S112 to Step S119. In Step S119, it will be determined whether or not the prevent flag FP is set. In this way, it will be determined whether or not excessive voltage will be prevented. If the prevent flag FP is set, the routine will move to Step S120, the prevent flag FP will be reset (turned off), and the routine will move to Step S121. In other words, if the power source voltage PV is equal to or less than the allowable maximum voltage Vh2 in the motor drive prevent state, the motor drive prevention will be canceled.

In Step S121, it will be determined whether or not the power source voltage PV has been reduced to less than an allowable minimum voltage Vm (e.g., 9 volts), and if the power source voltage PV is equal to or greater than the allowable minimum voltage, the routine will return to the main routine. If the power source voltage PV declines to less than the allowable minimum voltage Vm, the routine will move from Step S121 to Step S122.

In Step S122, it will be determined whether or not a timer T2 has already been set that measures the time during which the power source voltage PV has dropped below the allowable minimum voltage Vm. The timer T2 eliminates momentary voltage drops that are caused by, for example, an increase in load. When the timer T2 has not yet been set, the routine will move to Step S123, and the timer T2 will be set. The value of the timer T2 is, for example, preferably in a range between 0.1 to 1 second. When in this range, momentary voltage drops can be reliably eliminated. If the timer T2 is already set, the routine will skip Step S123. In Step S124, it will be determined whether or not the timer T2 has expired, i.e., it will be determined whether or not the power source voltage PV has dropped below the allowable minimum voltage Vm through the time T2. If the power source voltage PV has dropped below the allowable minimum voltage Vm through the time T2 and, the routine will move to Step S125, and for example the power source graphic 98c on the water display unit 98 will flash. In Step S126, the timer T2 will be reset, and the routine will return to the main routine.

As shown in the aforementioned description, with this electric reel, because the linking mechanism 89 will be pressed by the pressing mechanism 88 and the pressing mechanism will cause the linking mechanism 89 to separate only when the linking mechanism 89 is operated and the clutch on state is restored by the reverse rotation of the motor 4, the need to continually operate the motor 4 and the linking mechanism 89 will be eliminated. Because of this, the motor 4 will not rotate when the clutch switching mechanism 8 is manually operated and the clutch mechanism 7 is switched from the clutch off state to the clutch on state, and it will become easier to manually perform the return operation.

In addition, because the pivot pawl 82 will pivot up to a position that intersects with the ratchet 81 by the pawl control mechanism 84 when the motor rotates normally, the pivot pawl 82 will no longer vibrate during normal rotation of the motor 4 because of the prevention of reverse rotation, and thus quieting can be achieved.

Furthermore, because the roller clutch 90 is interposed between the pressing member 91 of the pressing mechanism 88 and the output shaft 30, and the normal rotation of the output shaft 30 is not transmitted to the pressing member 91, pressing will be eliminated when in the line dispatch mode even if the pressing member 91 comes into contact with the lining mechanism 89, and thus the line dispatch mode can be smoothly executed.

Moreover, because the voltage applied to the motor 4 is gradually increased from a first voltage V1 to a second voltage V2 during the clutch return operation by the reverse rotation of the motor 4, there will be no frictional torque load from the time rotation starts to the time the switching operation begins, an excessive force will not be applied to the mechanism mounting shaft 75 fixedly coupled to the output shaft 30 of the motor 4, and the unconnected rotation of the mechanism mounting shaft 75 can be prevented.

In addition, when the power source voltage is detected and the power source voltage is high during power supply, the duty ratio D1 and the like is corrected in accordance with the detected power source voltage. Because of this, each duty ratio will have a value that is smaller than the value before correction, and the rotational state at each set level of motor 4 during normal rotation and the rotational state thereof during reverse rotation can be maintained as constant as possible even if the power source voltage increases. Moreover, because the power source voltage is detected immediately after power supply, it can be immediately recognized that a different type of power source is connected by comparing the detected power source voltage with a predetermined voltage data.

In addition, by a special operation that rarely malfunctions that involves click operations to the initial pivot position within a predetermined time period of the adjustment lever 101, the motor 4 can be driven by a reference line length in the line winding direction even if the boat side mode has been set. Because of this, damage to the tip of the fishing pole due to malfunctions can be prevented while rotating the spool 3 toward the line winding side by the reference line length.

Furthermore, because abnormal power source voltages are determined by the power source voltage when the motor 4 is not rotating, the rotation of the motor 4 will not stop due to an abnormal power source during use. Moreover, because the determination with respect to the power source voltage will be continuously performed when the motor 4 is not rotating, damage to equipment due to abnormal power source voltage during use can be prevented.

Furthermore, at a predetermined number M (for example four) of low levels amongst a predetermined number N of levels, the motor 4 is speed controlled so that the detected speed will become the target speed that is set so that the speed becomes quicker. Thus, at the low levels, the motor 4 will be controlled to a target speed that corresponds to each level. In addition, at the higher levels (e.g., level 5 to level 30), the motor 4 will be torque controlled. Because of this, at the low levels, the rotation of the motor 4 will rarely stop even if the load is large, and the motor 4 will rarely rotate at a high speed even if the load is small. Thus, the rotation of the motor 4 will be stable even at low levels.

Control of the Fish Depth Monitor

Next, specific details on the control of the data display unit 61 of the fish finder monitor 120 will be described based upon the control flowcharts shown in FIGS. 25 to 27, and the display screens shown in FIG. 28 onward. Note that in the following description, a situation in which the electric driven reel 1 is connected to the fish finder monitor 120 will be described.

Figure 25:
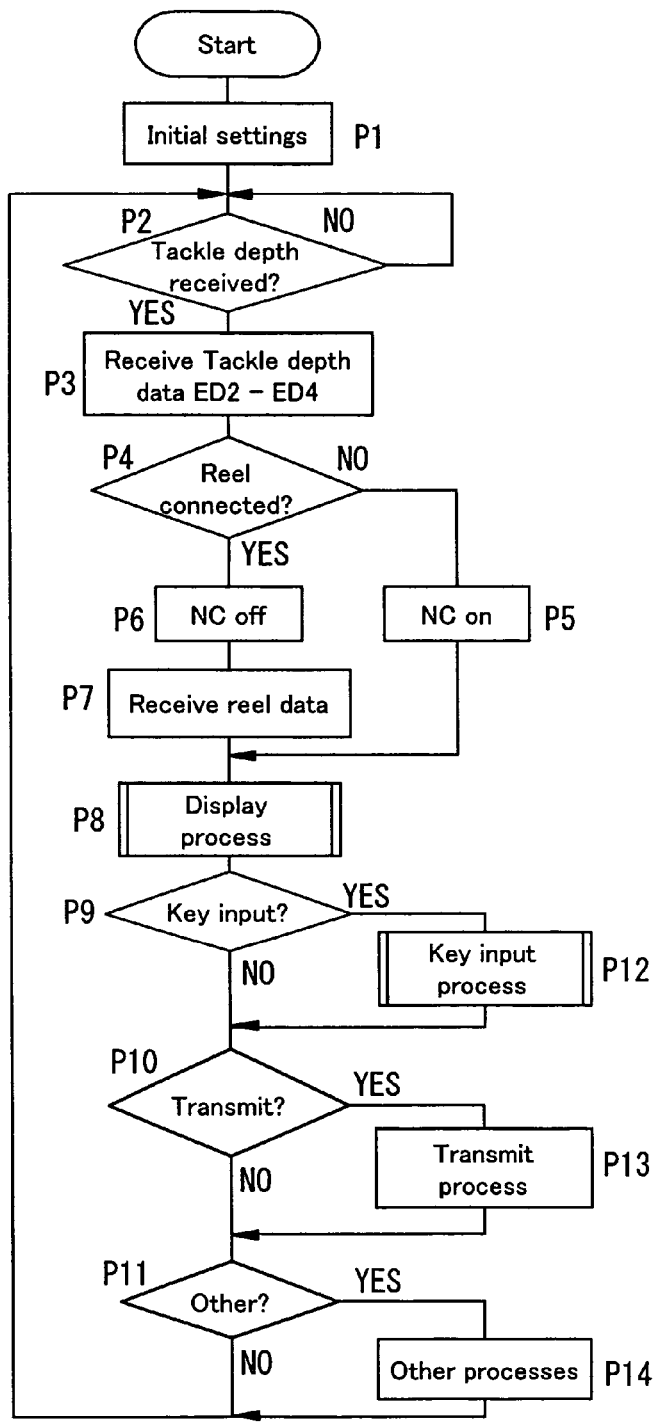
FIG. 25 is a flowchart showing the control details of the main routine of a data display control unit in accordance with the first embodiment of the present invention.

When the power cord 130 is connected to the fish finder monitor 120, the initial settings will be performed in Step P1 of FIG. 25. In the initial setting process, a display mode will be set so as to display an opening screen with a continuous display process. In addition, a correction coefficient K of the water depth data LX of the tackle will be set to 1. In Step P2, it will be determined whether or not fish depth data (more specifically, echo data ED2 of the water depth of the sea bottom of the fishing location, echo data ED3 of the fish location, and numerical data ED4 of the water depth of the bottom) has been received from the fish finder 140. If the fish depth data cannot be received, the routine will wait unit this data can be received. If the fish depth data is received, then the routine will move to Step P3, the received fish depth data ED2–ED4 will be taken in and stored in the memory unit 125. In Step P4, it will be determined whether or not the electric driven reel 1 is connected. If the electric driven reel 1 is not connected, then the routine will move to Step P5, and a flag NC will be turned on in order to indicate that the electric driven reel 1 is not connected. If the electric driven reel 1 is connected, the routine will move from Step P4 to Step P6, and the flag NC will be turned off. At Step P7, the water depth data LX of the tackle that is transmitted from the electric driven reel 1 will be taken in.

In Step P8, the display process shown in FIG. 26 and described below will be performed. This display process, in addition to the opening screen, will switch between a fish finder screen 210 shown in FIG. 29 that shows the tackle water depth data LX obtained from the electric driven reel 1 and the fish depth data ED2–ED4 from the fish finder 140, and a menu screen 200 shown in FIG. 28 that performs various settings. In Step P9, it will be determined whether or not the operation key unit 123 has been operated. In Step P10, it will be determined whether or not there is a transmission request to transmit the set items to the electric driven reel 1. In Step P11, it will be determined whether or not other processes such as a maintenance process or the like caused by hidden commands have been selected, and if this determination is "No", then the routine will return to Step P2. If the operation key unit 123 has been operated, the routine will move from Step P9 to Step P12, and a key input process described below will be performed. If there was a transmission request, then the routine will move from Step P10 to Step P13, and setting data set with a menu process described below will be transmitted to the electric driven reel 10 via the data transmission unit 125. If other processes have been selected, then the routine will move from Step P11 to Step P14, the other selected processes will be executed, and the routine will then return to Step P2.

Display Process

Figure 26:
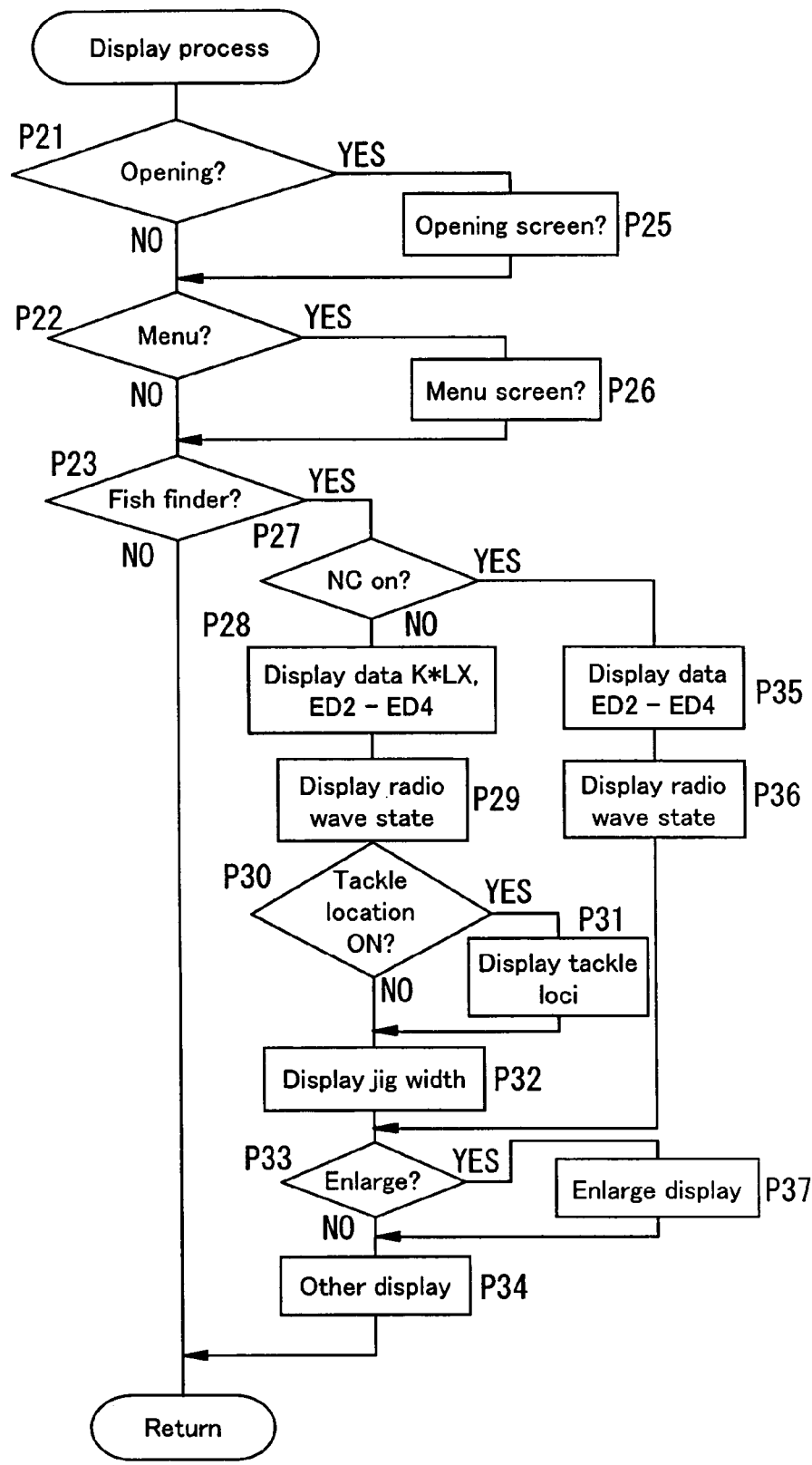
FIG. 26 is a control flowchart of a display process subroutine in accordance with the first embodiment of the present invention.

In the display process of Step P8, it will be determined whether or not the opening screen has been set in Step P21 of FIG. 26. The opening screen is displayed only once if the power cord 13 is connected and power is being supplied. In Step P22, it will be determined whether or not the menu screen has been set by the screen switch button 131. In Step P23, it will be determined whether or not the fish finder screen has been selected by the screen switch button 131, and if the fish finder screen has not been set, then the routine will return to the main routine shown in FIG. 25.

If the opening screen has been set, then the routine will move from Step P21 to Step P25, and the opening screen will be displayed. If the menu screen has been set, then the routine will move from Step P22 to Step P23. In Step P23, the menu screen 200 shown in FIG. 28 will be displayed. In this menu screen 200, the reception state 201 of the radio waves output from the fish finder 140 will be displayed on the upper left of the screen. Note that the reception state 201 of the radio waves will be displayed with an antenna mark 201a and 3 bars 201b, and this will be displayed in all display modes. Below this, setting items 202 for various modes of the electric driven reel 1 (more specifically, fish location stop, jig, jig width, auto-jig, line dispatch, above bottom switch, and strike detection) and the setting details 203 thereof, and setting items 204 of the modes of the fish finder monitor 120 (more specifically, position correction, terminal tackle locations, demo screen, contrast, and backlight) and the setting details 205 thereof are displayed in a hierarchical menu. These setting items 202, 204 are selected by the cursor button 132, and the setting details are finalized by set button 133. If the jig mode is selected, a total of 6 pop-up menus (OFF, and jig patterns 1, 2, 3, 4, and 5) will be displayed. Here, amongst the 5 jig patterns, patterns 1, 2 and 3 are pre-set jig patterns, and patterns 4 and 5 are jig patterns that can be registered by learning. The three pre-set jig patterns are regulated by two factors, the rotational speed of the motor 4 and the stop time during line wind-up. Thus, when in the jig mode and the auto-jig mode, the motor 4 will be controlled at a constant speed. The jig patterns that are learned with jig learning are regulated by the two factors described above in accordance with the jig operation details at this time. If the setting details of the electric reel 10 are set with the electric reel 10, this data will be received and the details thereof will be reflected in the setting details of the menu screen.

Here, position correction will be set when one wants to correct the water depth of the tackle obtained from the electric reel. In addition, the terminal tackle location is set when the fisherman wants to display the chronological changes in the location of the water depth of the terminal tackle. In addition, the jig mode is set when the fisherman wants to perform jig operations from a water depth at with the jig on/off button 134 is operated. The auto-jig mode is set when the fisherman wants to perform jig operations from a fish location stop position.

If the fish finder screen 220 has been set, then the routine will move from Step P23 to Step P27. In Step P27, it will be determined whether or not the electric driven reel 1 is connected by means f the flag NC. If the electric driven reel 1 is connected, then the routine will move from Step P27 to Step P28. In Step P28, the fish finder screen 210 shown in FIG. 29 will be displayed. In Step P28, a water depth scale SC will be displayed on the right edge of the fish finder screen 210, and on the right side of the scale SC, a value (K×LX) in which a correction coefficient K is multiplied by the terminal tackle water depth data LX of the tackle obtained from the electric driven reel 1 will be displayed in the position corresponding with the water depth with a graphic FL that is a hook that symbolizes the terminal tackle. Note that in this embodiment, although the terminal tackle water depth data before correction will be displayed because the correction coefficient is set to 1 before correction, it is also possible for the terminal tackle water depth data LX of the tackle to be displayed as is prior to correction being performed, and the corrected terminal tackle water depth data K×LX to be displayed after correction is performed.

In addition, water depth echo data ED2 on the sea bottom and echo data ED3 on the location of fish that are received from the fish finder 140 will be chronologically displayed in positions corresponding to the water depth on the left side of the scale SC. Furthermore, the numerical value ED4 of the water depth data of the sea bottom will be displayed on the lower left of the fish finder screen 210, and the numerical value LXn of the terminal tackle water depth data (K×LX) of the terminal tackle will be displayed on the upper left of the fish finder screen 210. In addition, a fish location timer value (the stationary time of the tackle that is set in order to automatically set the location of fish) will be displayed below the tackle water depth data LXn.

Figure 29:
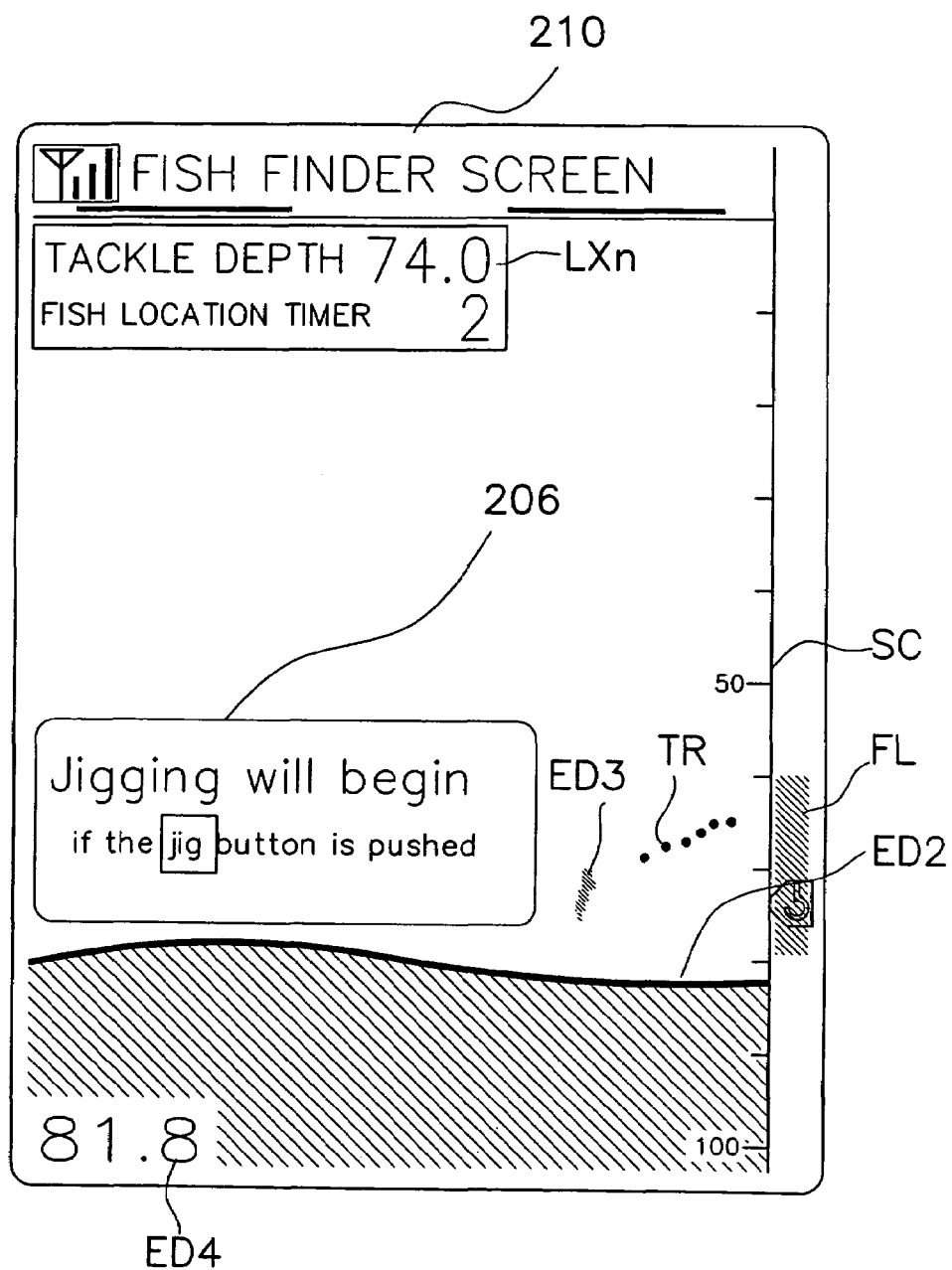
FIG. 29 is a figure showing one example of a fish finder screen of the fish finder monitor in accordance with the first embodiment of the present invention.

In Step P29, like with the menu screen 200, the reception state 201 of the radio waves from the fish finder 120 will be displayed with the antenna mark 201a and the three bars 201b on the upper left portion of the screen. In Step P30, it will be determined whether or not the display setting of the terminal tackle location is turned on. This setting determines whether or not the terminal tackle location is turned on via the menu screen 200. If the terminal tackle location display is turned on, the routine will move to Step P31. In Step P31, the location TR of the terminal tackle (the chronological changes in the terminal tackle water depth data LX of the tackle) will be displayed with dots as shown in FIG. 29. In Step P32, the jig width SA of the jig mode will be displayed as shown with the hatching on the right side of the scale SC. This will not be displayed if the jig mode or the auto-jig mode is turned off.

In Step P33, it will be determined whether or not the enlarged display mode has been set. If the screen switch button 131 is pressed for an extended period of time (3 seconds or greater) with the key input process, the enlarged display mode can be set. At Step P34, other display processes will be performed. As shown in FIG. 29, with the other display processes, for example, text 206 and the like that explains an operation will be displayed on the fish finder screen 210. Thus, because data is displayed on the fish finder screen without being covered, and an operator can instantly understand the meaning of the operation, even beginning users can perform the operation with peace of mind.

If the electric driven reel 1 is not connected in Step P27, then the routine will move from Step P27 to Step P35. In Step P35, only the data obtained from the fish finder 140 will be displayed (except for the tackle water depth data (K×LX). In Step P36, like in Step S29, the radio wave state will be displayed, and the routine will move to Step P33.

Figure 30:
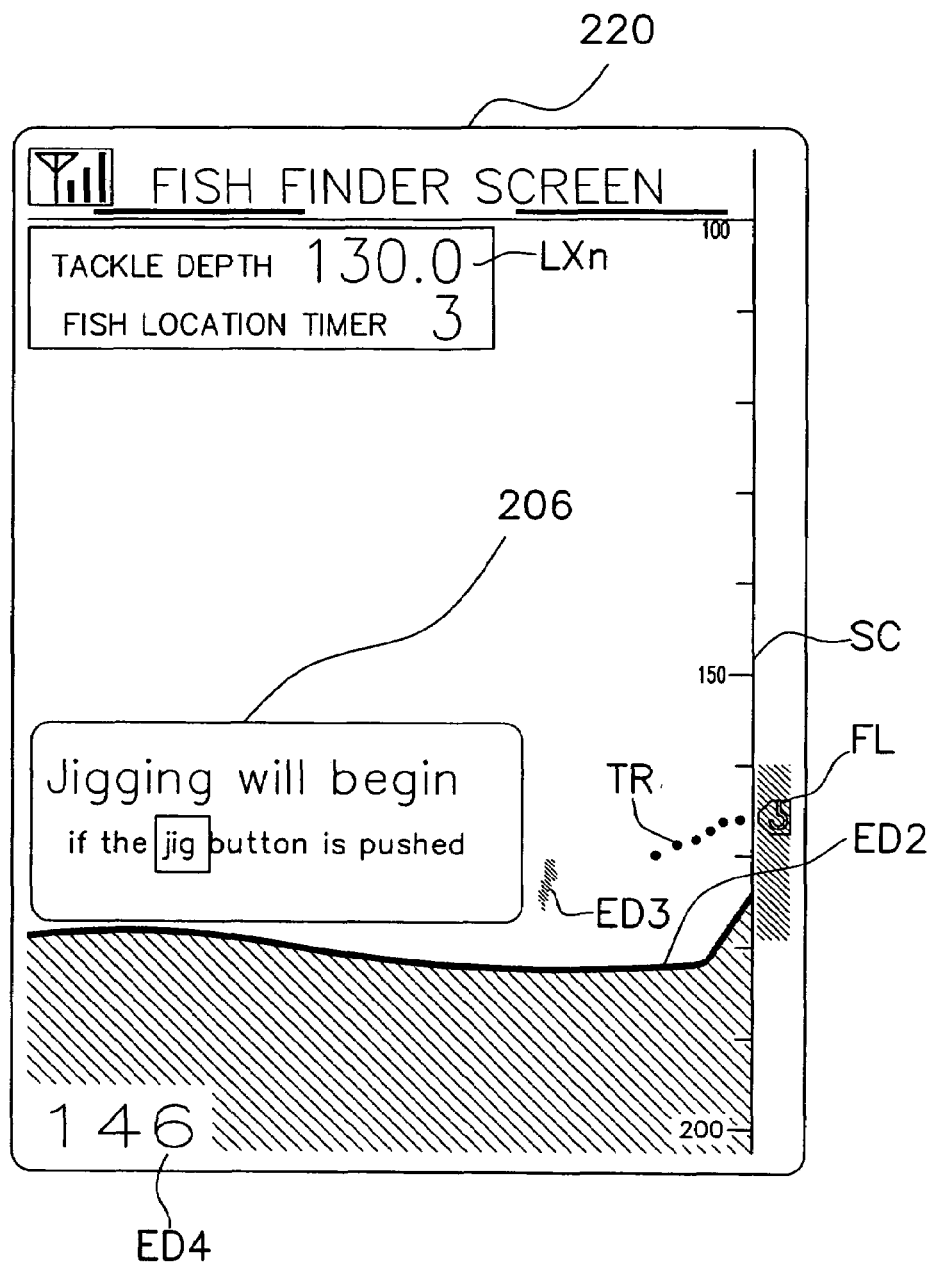
FIG. 30 is a figure showing one example of a fish finder screen of the fish finder monitor in accordance with the first embodiment of the present invention.

If the enlarged display mode is set in Step P33, the routine will move from Step P33 to Step P37, and the enlarged screen 220 will be displayed. The enlarged screen 220, as shown in FIG. 30, will display, for example, the data ED2, ED3 and the graphic FL in corresponding water depth positions from half the water depth of the maximum value of the scale SC. In this way, the display can be enlarged even in a deep water depth location, and the display near the bottom will become easy to see.

With this fish finder screen 210, if the electric driven reel 1 is connected, the water depth of the terminal tackle is displayed together with the water depth data ED2 of the sea bottom and the water depth data ED3 of the location of the fish with the graphic FL, and thus the position of the tackle with respect to the position of the fish can be instantly determined, and the timing at which jigging is performed can be reliably determined.

Key Input Process

Figure 27:
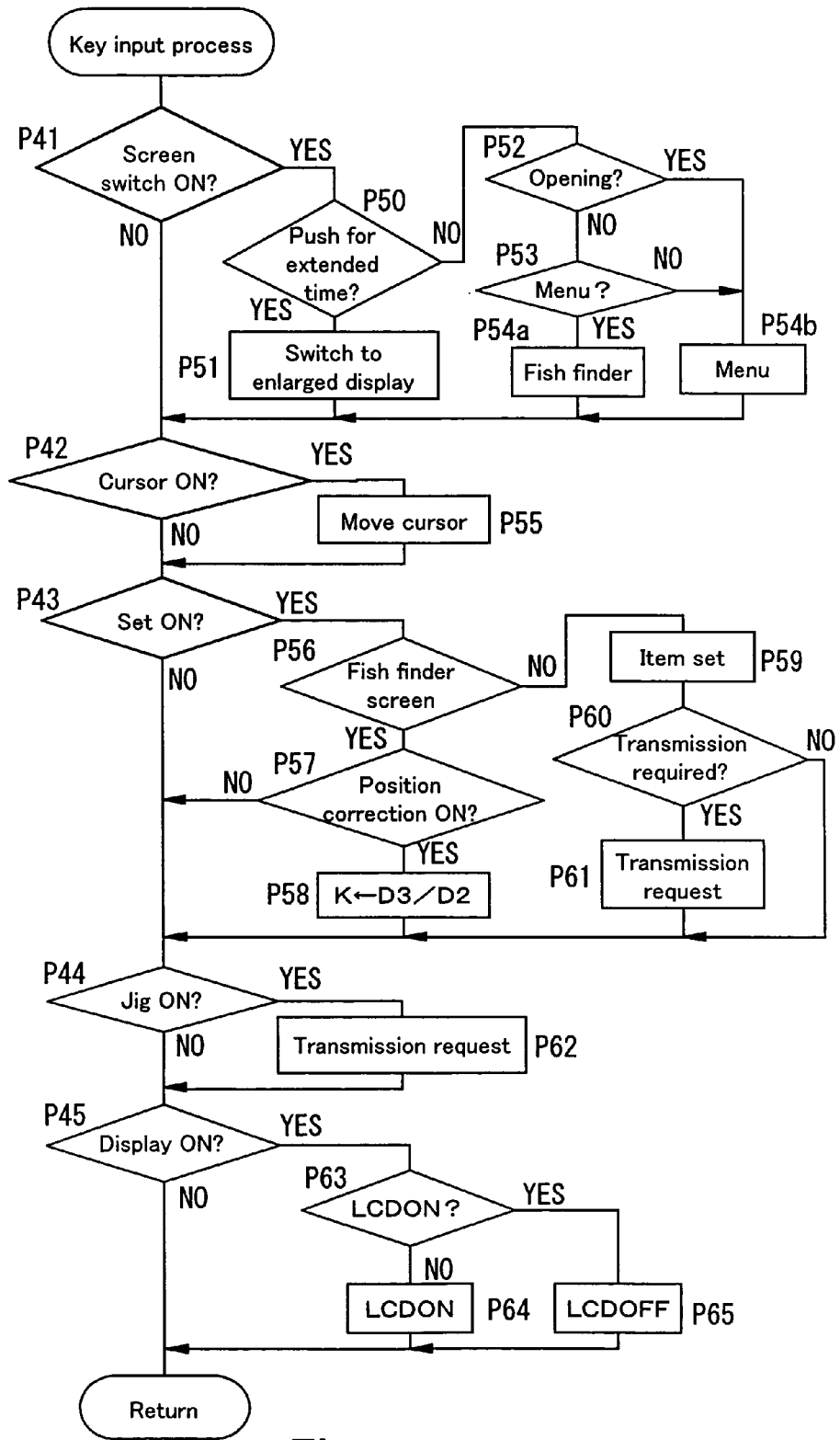
FIG. 27 is a control flowchart of a key input subroutine in accordance with the first embodiment of the present invention.

In Step P9 of FIG. 25, if any of the buttons of the operation key unit 62 are operated, the routine will move from Step P9 to Step P12 and the key input process shown in FIG. 27 will be executed. In the key input process, it will be determined whether or not the screen switch button 131 has been operated in Step P41 of FIG. 27. In Step P42, it will be determined whether or not the cursor button 132 has been operated. In Step P43, it will be determined whether or not the set button 133 has been operated. In Step P44, it will be determined whether or not the jig on/off button 134 has been operated. In Step P45, it will be determined whether or not the on/off button 135 has been operated.

If the screen switch button 131 is operated, the routine will move from Step P41 to Step P50. Note that although not disclosed in Step P50, if the motor 4 of the electric driven reel 1 is rotating, the key input of the screen switch button 131 will be invalid. This is done so that the screen cannot be switched while the line is being wound up. In Step P50, it will be determined whether or not the screen switch button 131 has been pushed for an extended period of time (e.g., three seconds or greater). If it is determined that the screen switch button 131 has been pushed for an extended period of time, the routine will move from Step P50 to Step P51.

In Step P51, the enlarged display mode will be set. In this way, in the display process described above, the display on the fish depth display 210 will be from approximately half the water depth of the water depth from the bottom, rather than the water depth from the water surface. Note that each time the extended pushing operation is performed, the enlarged display mode and the standard display mode can be sequentially set.

If the screen switch button 131 has not been pushed for an extended period of time, the routine will move from Step P50 to Step P52. In Step P52, it will be determined whether or not the opening screen has been set. If the opening screen has been set, the routine will move to Step S54b, and the display mode will be set to the menu screen. In this way, the menu screen will be displayed with the display process of Step S8 of FIG. 25. If the opening screen is not set, the routine will move to Step S53, and it will be determined whether or not the menu screen is set. If the menu screen has been set, the routine will move to Step S54a, and the display mode will be set to the fish finder screen. In this way, the fish finder screen will be displayed with the display process of Step S8. If the menu screen has not been set, then the display mode will be set to the menu screen. When these processes are complete, the routine will move to Step S42.

If the cursor button 132 is operated in Step P42, the routine will move from Step P42 to Step P55. In Step P55, the cursor will move one by one on the setting items and the setting details in the menu screen in response to the direction in which the cursor button 132 is operated. For example, the on/off state of the jig mode or the auto-jig mode will be set. If the jig mode or the auto-jig mode was set, the jig width SA described above can be set. When the jig width is to be set, the cursor will be moved to the location of the numerical value of the jig width, and the numerical value can be changed by operating the cursor button 132 up and down. In addition, when the jig pattern is to be set, when the cursor is moved to the display location of the jig pattern, the text ON, OFF and pattern 1 through pattern 5 will be vertically displayed with a pop-up menu as described above, and when the cursor is placed on any of these and the set button 133 is pushed, that pattern will be selected. Note that if patterns 4 and 5 are to be selected, an additional jig pattern can be learned.

If the set button 133 is operated, the process will move from Step P43 to Step P56. In Step P56, it will be determined whether or not it is the fish finder screen 210. If it is the fish finder screen 210, then the routine will move to Step P57. In Step P57, it will be determined whether or not the position correction mode has been set (turned on). If the position correction mode is set, then the routine will move to Step P58, and position correction will be performed. Here, if the set button 133 is operated during the fish finder screen, a correction initiation signal will be output and the correction process will be performed.

Normally, when a fisherman drops the terminal tackle to the bottom and performs bottom fishing, this operation will be performed if the terminal tackle water depth data LX of the terminal tackle is greatly different than the actual sea bottom data ED2 and an anomaly is produced on the display. For example, with respect to an actual water depth ED2 of the sea bottom that is 73 meters, in the event that the terminal tackle water depth data LX is a line release of 85 meters when terminal tackle has reached the sea bottom due to the impact of ocean currents and the like, if the fisherman operates the set button 133, the routine will move to Step P57 via Step P56, and at this timing the received actual water depth data ED2 of the sea bottom will be divided by the terminal tackle water depth data LX of the terminal tackle to calculate a correction coefficient K. The correction coefficient K will be multiplied by the terminal tackle water depth data LX in the display process. For example, the aforementioned correction coefficient K will be 73/85, and after that the terminal tackle water depth data LX of the terminal tackle will be multiplied by the correction coefficient K and displayed until the next correction process is performed. As a result, the water depth data displayed with the graphic FL and the data LXn of the numerical value display will be corrected to the corrected terminal tackle water depth data (=73 meters). Note that if the power cord 13 is pulled out and power is cut, the correction coefficient will be set to 1 in the initial settings. In addition, this type of correction process will not be performed on the electric driven reel 1 side. This is because if this type of correction is performed with the electric driven reel 1, the boat side stop position and the like will shift only by the amount of correction when winding up the fishing line. Thus, this correction must be performed only with the fish finder monitor 120.

If the position correction is turned off in Step P56, the routine will move to Step P44. If it is determined that it is not the fish finder screen 210, then the routine will move from Step P56 to Step P59. In Step P59, the details of the setting item selected with the cursor will be set and stored in the memory unit 45. In Step S60, it is determined whether or not the setting item is related to the electric driven reel 1, i.e., whether or not there is a need to transmit the setting item to the electric driven reel 1. If there is a need to transmit, a transmission request to transmit the selected setting will be output. In this way, the setting data will be transmitted to the electric driven reel 1 in Step P13, and on the electric driven reel 1 side, the data will be received in Step S11 of FIG. 18 and various modes set with the fish finder monitor 120 will be set on the electric driven reel 1 side.

If the jig on/off button 134 is operated, the routine will move from Step P44 to Step P62. In Step P62, a transmission request will be output so as to turn the motor 4 on and off with the jig pattern set in the set jig width.

If the on/off button 135 is operated, the routine will move from Step P45 to Step P63. In Step P63, it will be determined whether or not the monitor display unit 122 is turned on. If the monitor display unit 122 is not yet turned on, then the routine will move to Step P64 and the monitor display unit 122 will be turned on. If the monitor display unit 122 is already turned on, then the routine will move to Step P65 and the monitor display unit 122 will be turned off.

Here, because the water depth data, which is obtained and displayed based upon the terminal tackle water depth data LX of the terminal tackle from the electric driven reel 1 and the relatively accurate water depth data ED2 of the sea bottom from the fish finder 140, can be corrected, and because the corrected first water depth data will be displayed on the monitor display unit 122, the water depth of the terminal tackle can be displayed more accurately even if the fishing line is curved due to tidal currents.

Furthermore, since the first terminal tackle water depth data LX indicating the location of the terminal tackle and the second sea bottom water depth data indicating the sea bottom location can be displayed as graph data ED2 not as numerical data ED4, it is easy for the fisherman to recognize the positional relationship between location of the terminal tackle and the location of the sea bottom quickly. Furthermore, since the third water depth data ED3, which is output from the fish finder 140 and indicates the fish location, is displayed at a position that corresponds to the position of its water depth along with the first and second water depth FL, ED2, the fisherman can accurately recognize the position of the fish location even if the position of the fish location changes overtime. Furthermore, since the locations of the terminal tackle and the fish location are displayed graphically, it is easy to determine whether the terminal tackle is positioned at the fish location.

In addition, in the jig mode or the auto-jig mode, when the jig width is set and jigging begins, the jig mode is performed in which on/off control is performed only between the set jig width that corresponds to the jig pattern. Thus, by setting the jig width to the width of the location where fish are gathered, a jigging operation can be performed only at the fish location with good efficiency and with a simple operation. In addition, because the jig operation will automatically stop when the line wind-up is performed up to of the jig width is finished, no further motor on/of control will be required if the fishing line is wound up after the completion of the jigging operation. Therefore, the line wind-up efficiency can be improved with a simple operation.

Second Embodiment

In the first embodiment, the jig width and the jig pattern settings were performed on the fish depth monitor side. In the second embodiment, the screen display of data from the fish finder 140 and various reel settings will all be performed on the electric reel 1 without employing the fish finder. Note that in the description below, the portions that differ from the first embodiment will be primarily described, and a description of the same or similar portions will be omitted.

Figure 31:
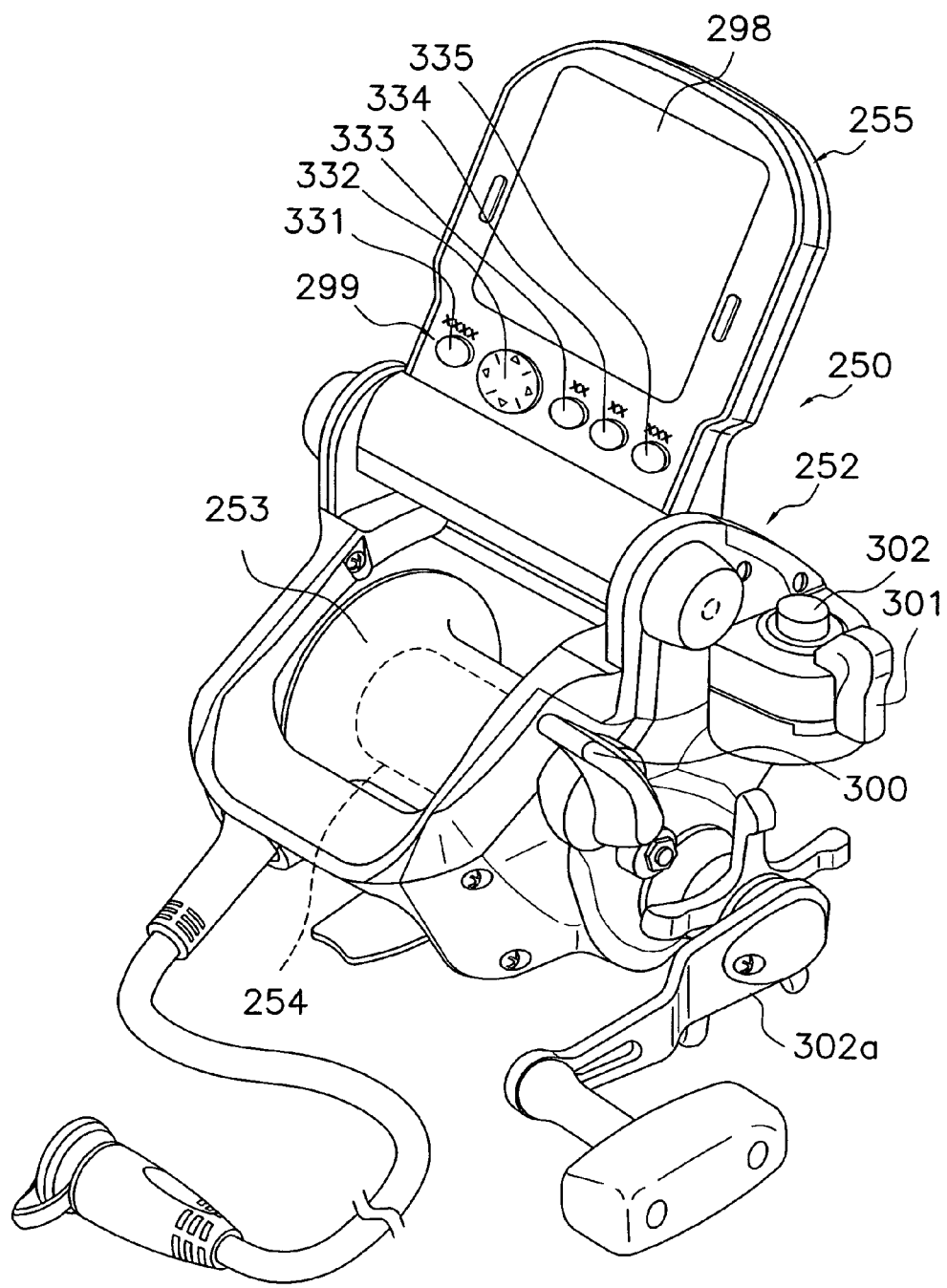
FIG. 31 is an oblique view of the electric reel in accordance with a second embodiment of the present invention.

In FIG. 31, the electric driven reel 250 primarily includes a reel unit 252 having a handle 252a mounted thereon, a spool 253 that is rotatively mounted on the reel unit 252, and a motor 254 that is mounted inside the spool 253. A counter 255 having a water depth display unit 298 is pivotably mounted on the upper portion of the reel unit 252. In addition, a variable speed lever 301 that serves to vary the rotation of the spool 253 is pivotably mounted on the front side of the reel unit 252, and a clutch operation lever 300 that serves to turn a clutch mechanism 257 (described below) on and off is pivotably mounted on the rear side of the reel unit 252.

The adjustment lever 301 is pivotable mounted in a range of, for example, approximately 140 degrees in this embodiment, a potentiometer 314 (FIG. 32) is mounted on the pivot shaft of the pivot lever 301, and a speed winding button 302 is arranged on the central portion of the adjustment lever 301.

The interior of the reel unit 252 includes a rotation transmission mechanism having the same configuration as the aforementioned embodiment, a clutch mechanism that is arranged along the rotation transmission mechanism, a clutch switching mechanism that switches the clutch mechanism, a first one-way clutch that prevents reverse rotation in the line release direction of the handle 252a, a second one-way clutch that prevents reverse rotation in the line release direction of the motor 254, a first clutch return mechanism that returns the clutch mechanism to the clutch on state by reverse rotation of the motor 254, and a second clutch return mechanism that returns the clutch mechanism to the clutch on state by rotation in the line winding direction of the handle 252a. A description of the aforementioned configuration will be omitted because it is the same as that of the aforementioned first embodiment.

The counter 255 displays the water depth of the tackle mounted on the end of the fishing line and fishing data from the fish finder 140, and is provided in order to control the motor 254. A water depth display unit 298 formed of a liquid crystal display that serves to display the water depth LX of the tackle and the location of fish with two references (from the water surface and from the bottom), and an operation key unit 299 formed of a plurality of switches disposed around the periphery of the water depth display unit 298, are arranged on the counter 255.

The monitor display unit 298 employs, for example, a monochrome 256 gray scale dot matrix type of liquid crystal display having 160 horizontal dots and 120 vertical dots. The water depth display unit 298 will display the terminal tackle water depth data LX of the terminal tackle as a graphical image, and when echo data of the bottom location, numerical data of the bottom location, and echo data of the location of fish of a fishing location are obtained from the fish finder 140, these will be displayed on the water depth data display unit 298 together with the water display data LX of the terminal tackle. In addition, text and graphical images indicating various modes (fish location stop mode, display from bottom mode, line dispatch mode, jig mode, and the like) will be displayed.

The operation key unit 299 includes 5 buttons 331–335 that are aligned on the lower portion of the water depth display unit 298. The screen switch button 331 is a button that switches the display of the water depth display unit between a menu display and a fishing display. A cursor button 332 is a button that serves to move a cursor up, down, left, and right in a menu process that performs various settings of the electric reel 250. The set button 333 is a button which serves to set the items selected during various settings. The memo button 334 is a button which serves to store the location at which fish are present and the location of the bottom. A jig on/off button 335 is a button which is used for the initiation of a jig operation. An on/off button 335 is a button which serves to turn the display on and off.

Figure 32:
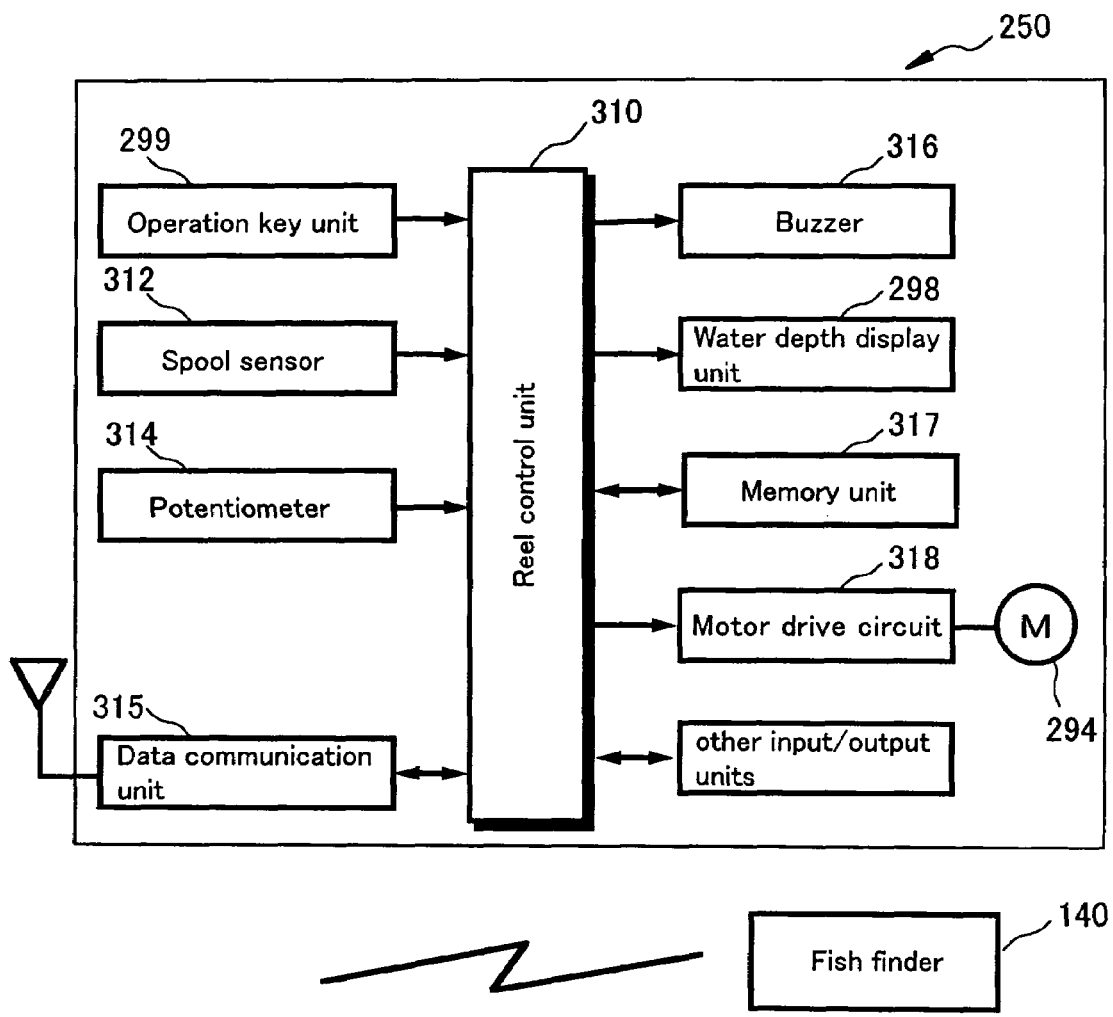
FIG. 32 is a block diagram of a fishing data display system in accordance with the second embodiment of the present invention.

In addition, as shown in FIG. 32, a reel control unit 310 formed of a microcomputer that serves to control the water depth display unit 98 and the motor 4 is arranged in the interior of the counter 255. The reel control unit 310 can also include other conventional components such as an input interface circuit, an output interface circuit, and storage devices such as a ROM (Read Only Memory) device and a RAM (Random Access Memory) device. The reel control unit 310 is configured to be able to selectively control any of the components of the electric driven reel 1 shown in FIG. 32. An operation key unit 299, a spool sensor 312 that detects the number of rotations and the rotational direction of the spool 3 with, for example, two Hall elements aligned in the rotational direction, a potentiometer 314 linked to an adjustment lever 301 which serves to adjust the speed of the spool 293 and the tension on the fishing line, and a data communication unit 315 which serves to exchange data with the fish finder 140, are connected to the reel control unit 301.

In addition, a buzzer 316 for various types of warnings, a water depth display unit 298 that displays water depth data, a memory unit 317 that stores various data, a motor drive circuit 318 that drives the motor 294 with a pulse width modulated (PWM) duty ratio, and other input/output units, are connected to the reel control unit 310. These structural elements are the same as those of the aforementioned first embodiment. However, data communication unit 315 can exchange data with the fish finder 140 by means of wireless communication, such as a specific low voltage, Bluetooth™, or wireless LAN.

Control Operation of Reel Control Unit

Next, the control operation of the reel control unit 310 will be described based upon the control flowcharts of FIG. 33 and beyond.

Figure 33:
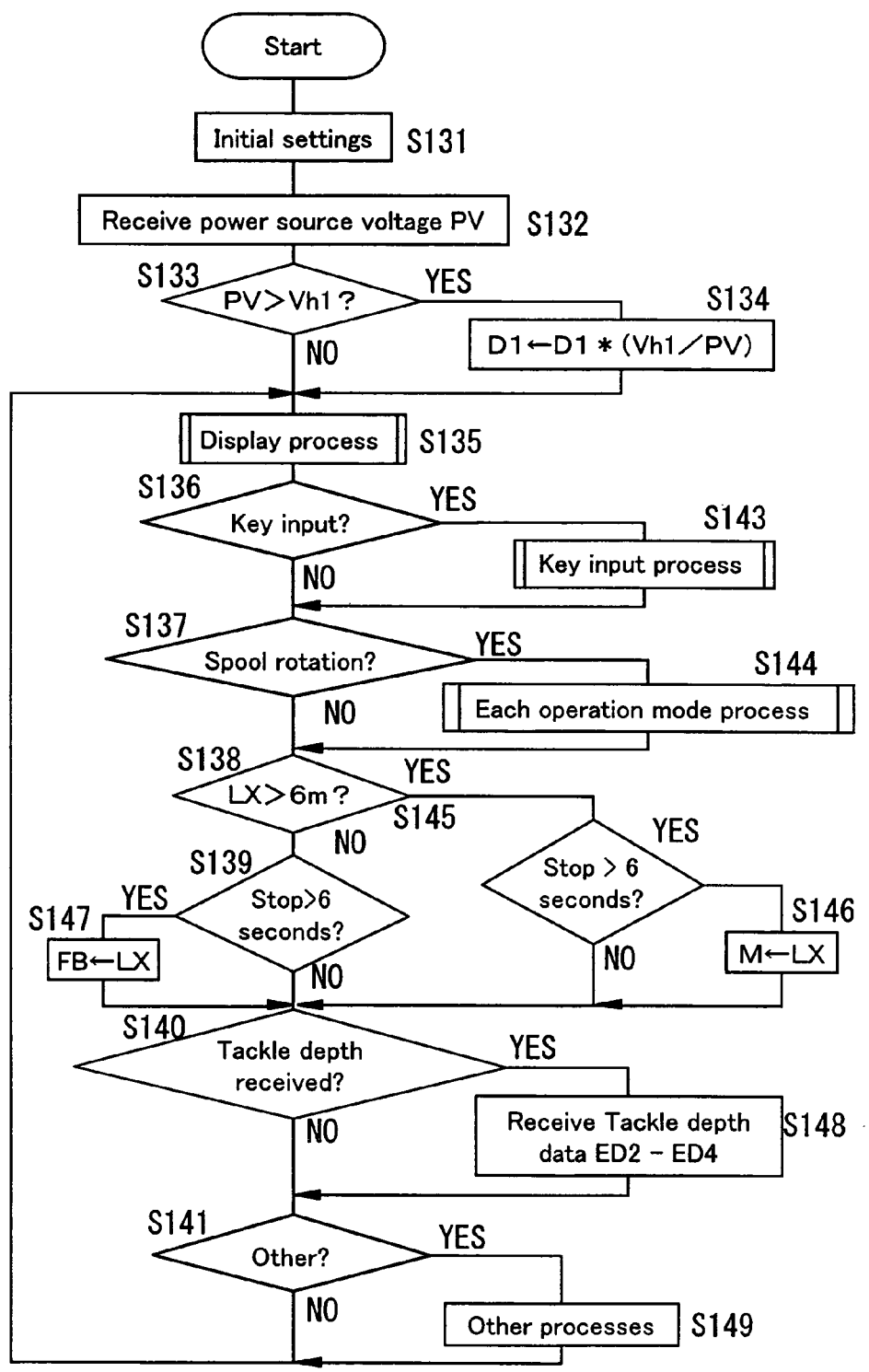
FIG. 33 is a control flowchart of a main routine of a reel control unit in accordance with the second embodiment of the present invention.

When the electric reel is connected to an external power source, the initial settings will be performed in Step S131 of FIG. 33. In these initial settings, like in Step S1 of FIG. 18, the discrete value of the number of spool rotations will be reset, and various variables and flags will be reset. The processes of Step S132 to Step S134, Step S136 to Step S138, Step S142, and Step S144 to Step S149 are the same as the processes of Step S2 to Step S4, Step S6, Step S7, Step S9, Step S10a, Step S12 to Step S14, Step S15 to Step S17, and Step S20 in FIG. 18, and thus a description thereof will be omitted.

Figure 34:
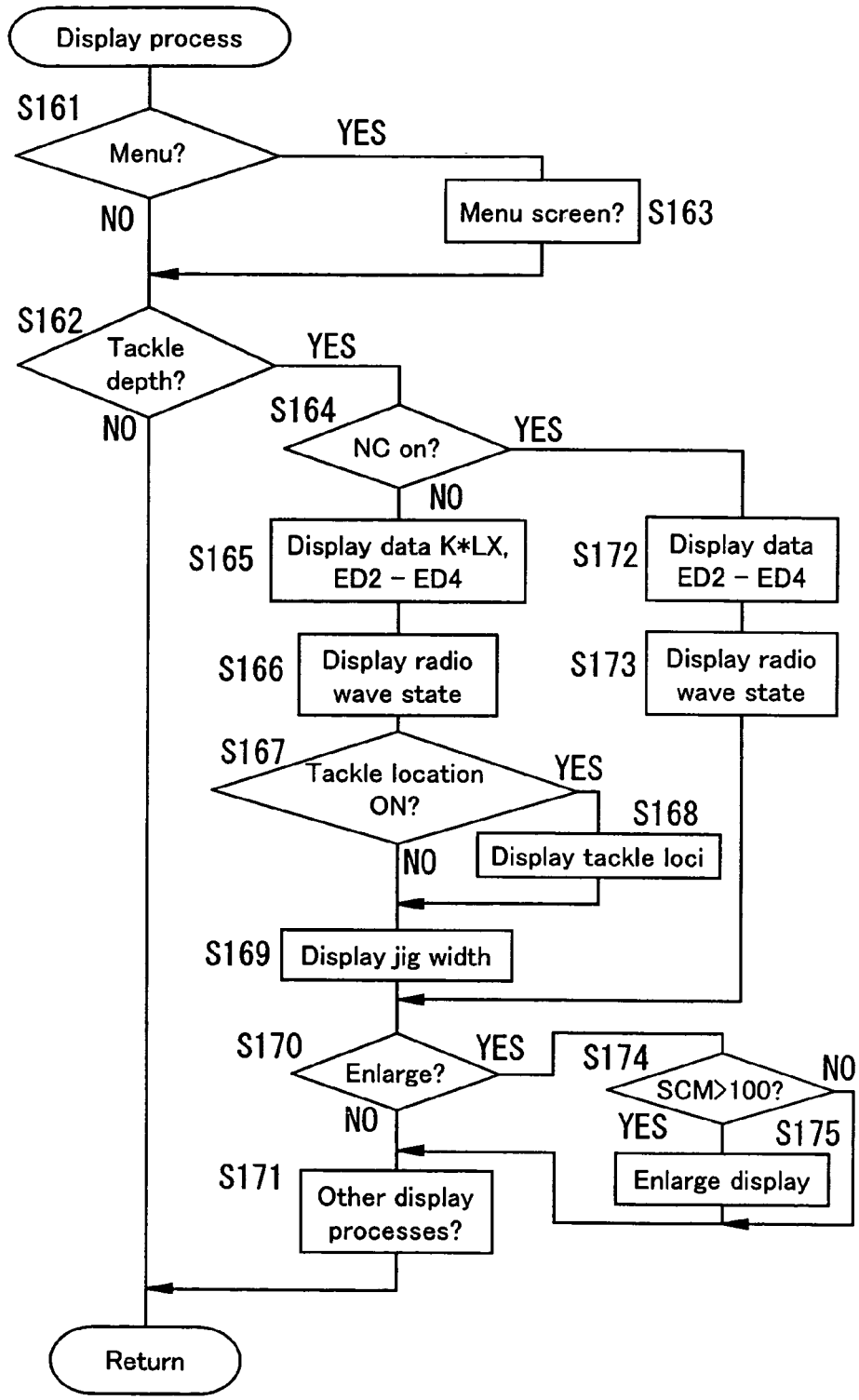
FIG. 34 is a control flowchart of a display process subroutine in accordance with the second embodiment of the present invention.
Figure 35:
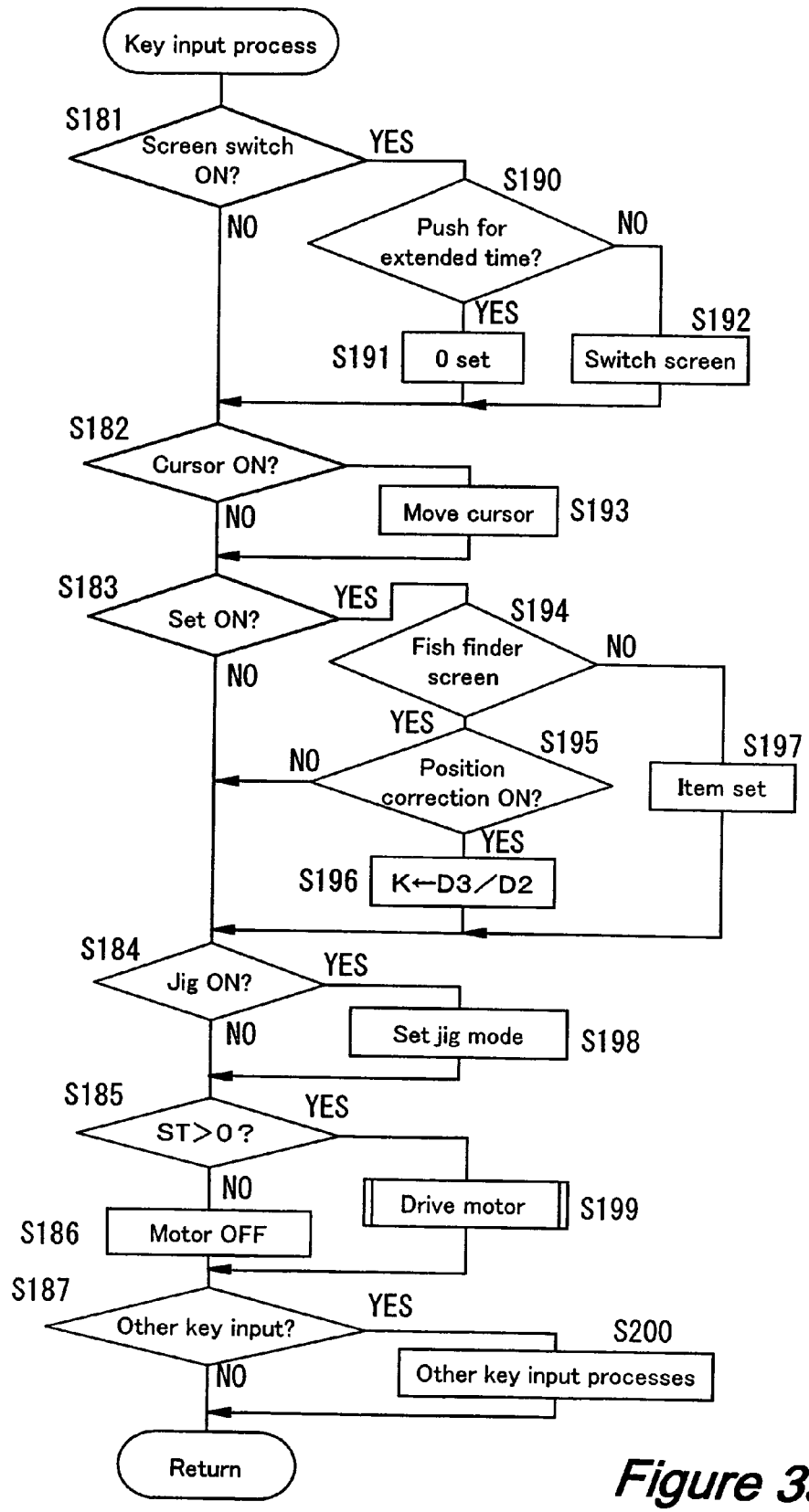
FIG. 35 is a control flowchart of a key input subroutine in accordance with the second embodiment of the present invention.

The display process of Step S135 is the display process performed in FIG. 34. In Step S140, it will be determined whether or not data from the fish finder 140 has been received.

Display Process

Figure 36:
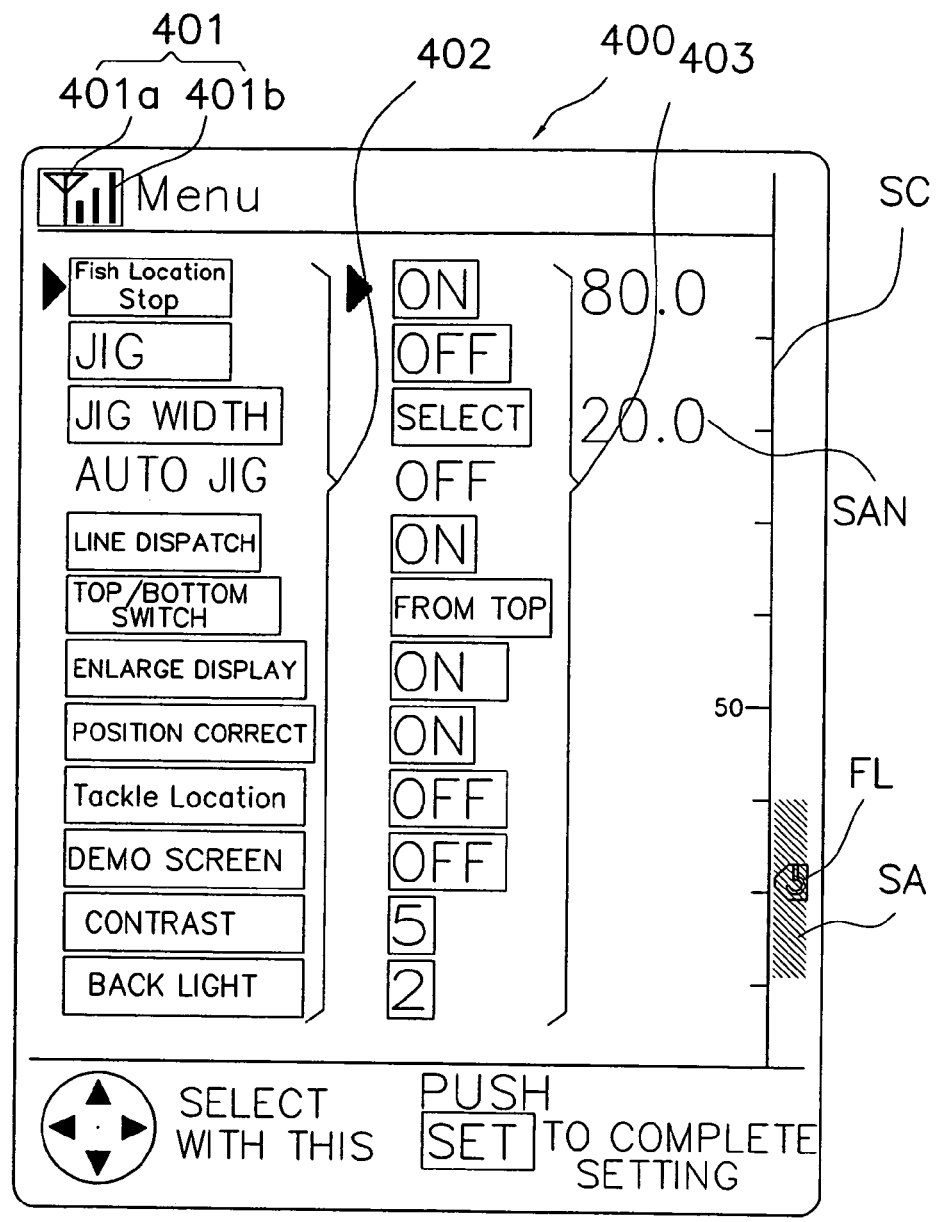
FIG. 36 is a figure showing a menu screen of a fish finder monitor in accordance with the second embodiment of the present invention.

In the switch input process of Step S135, it will be determined whether or not the menu screen has been selected in Step S161 of FIG. 34. The selection of the menu screen is performed by operation of the screen switch button of the key input process. If the menu screen has been selected, the routine will move from Step S161 to Step S163, and the screen 400 shown in FIG. 36 will be displayed. In this menu screen 400, like with the menu screen 200 of FIG. 28, the reception state 401 of the radio waves output from the fish finder 140 will be displayed on the upper left of the screen. Note that the reception state 401 of the radio waves will be displayed with an antenna mark 401a and 3 bars 401b, and this display will be displayed in all display modes. Below that, setting items 402 of various modes of the electric driven reel 250 (more specifically, fish location stop mode, jig mode, jig width, auto-jig mode, line dispatch mode, above bottom switch, enlarged display mode, position correction mode, terminal tackle location mode, demo screen, contrast, and backlight), and the setting details 403 thereof are displayed in a hierarchical menu.

Here, except for the enlarged display item, the items noted below are the same as those of the first embodiment shown in FIG. 28, and the position correction is set when one wants to correct the terminal tackle water depth data LX by the sea bottom data obtained from the fish finder 140. In addition, the terminal tackle location is set when one wants to display the chronological changes in the path of the tackle with the terminal tackle water depth. In addition, the jig mode is set when one wants to perform jig operations from a water depth at with the jig on/off button 334 is operated. The auto-jig mode is set when one wants to perform jig operations from a fish location stop position. The enlarged display mode is different from that of the first embodiment, which was set by pushing the screen switch button 131 for an extended period of time. In the second embodiment, the enlarged display mode is set with the menu screen. When the enlarged display mode is set, if the maximum value SCM of the scale SC displayed on the fish finder screen 420 shown in FIG. 37 exceeds 100 meters (an example of the threshold value), the fish depth data will normally be displayed from the sea surface. However, in this display process, the fish depth data will be displayed from half the water depth of the maximum value SCM. For example, in FIG. 37, because the maximum value SCM is 200 meters, the fish depth data will be displayed from a water depth of 100 meters.

Figure 37:
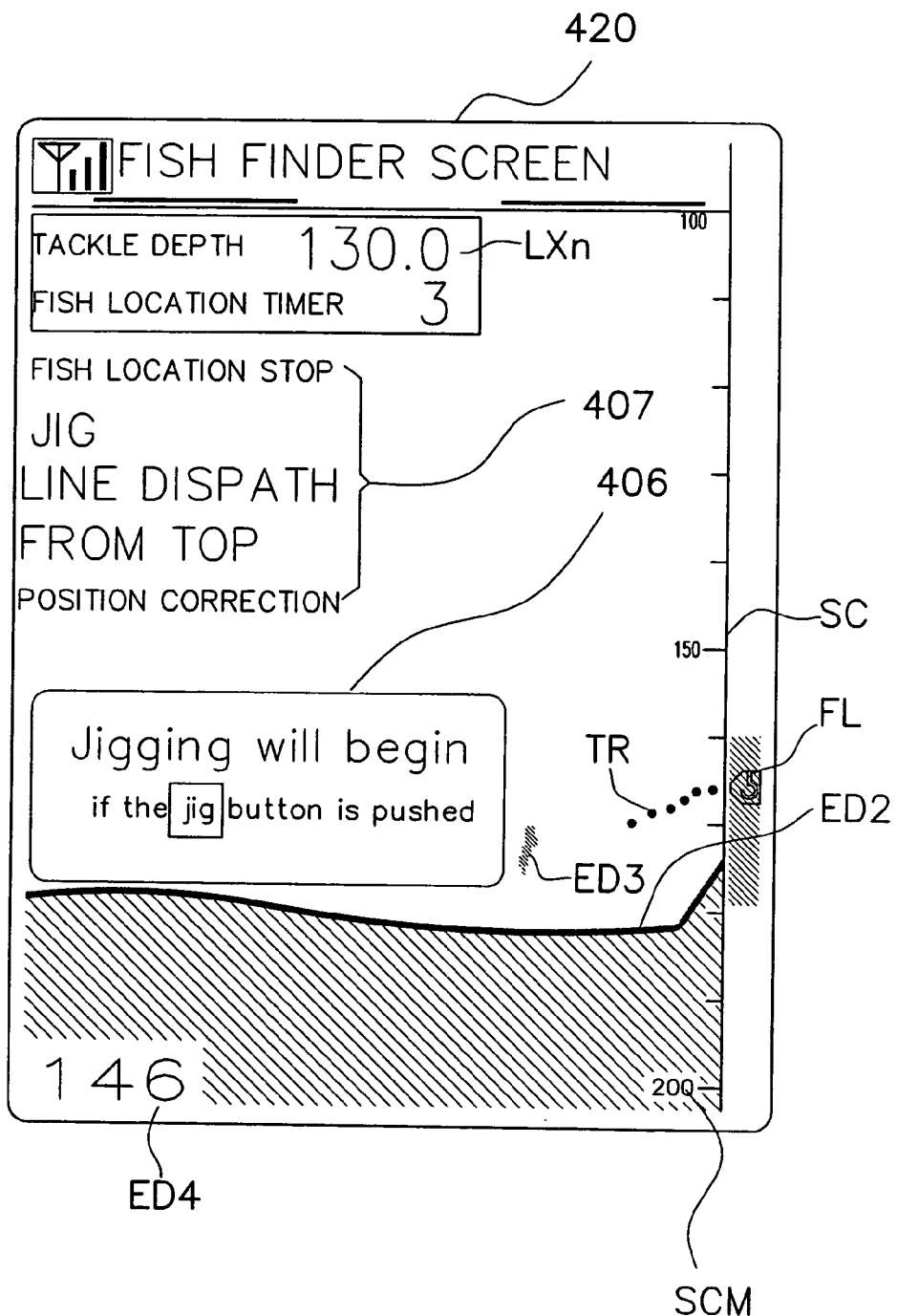
FIG. 37 is a figure showing one example of a fish finder screen of the fish finder monitor in accordance with the second embodiment of the present invention.

If the fish finder screen has been selected, then the routine will move from Step P162 to Step P164. A description of the process from Step S164 to Step S173 will be omitted because it is the same as the process from Step P27 to Step P36 of FIG. 26. However, as shown in FIG. 37, the water depth scale SC will be displayed on the right end of the fish finder screen 420, and the value (K×LX) that is the correction coefficient K multiplied by the terminal tackle water depth data LX of the tackle will be displayed on the right side of the scale SC with the graphic FL that is a hook that symbolizes the terminal tackle in a position corresponding to the water depth. Note that it is also possible for the tackle water depth data LX of the terminal tackle to be displayed as is before correction is performed, and for the corrected tackle water depth data LX of the terminal tackle to be displayed after correction is performed.

In addition, water depth data D2 on the sea bottom and water depth data D3 on the location of fish that are received from the fish finder 140 will be chronologically displayed in positions corresponding to the water depth on the left side of the scale SC with echo data images. Furthermore, the numerical value ED4 of the water depth data of the sea bottom will be displayed on the lower left of the fish finder screen 210, and the numerical value LXn of the water depth data (K×LX) of the terminal tackle will be displayed on the upper left of the fish finder screen 210. In addition, a fish location timer value (the threshold time for the terminal tackle to remain stationary that is set in order to automatically set the location of fish) will be displayed below the numerical value LXn. Furthermore, if the terminal tackle location display is turned on, the location TR of the terminal tackle (the chronological changes of the water depth data (K×LX) of the terminal tackle) will be displayed, and the jig width SA of the jig mode will be displayed as shown with hatching on the right side of the scale SC. This will not be displayed if the jig mode or the auto-jig mode is turned off.

Furthermore, in the other display processes of Step S170, the mode setting details of the electric reel 250 will be displayed on the fish finder screen 420 near the left central portion of the screen. For example, the fish location stop mode, the jig mode, the line dispatch mode, the from above mode (a mode that displays the fish location from the water surface), and the position correction mode will be displayed as in FIG. 37. These set modes will not be displayed if a mode has not been set.

If the enlarged display mode is set, the routine will move from Step S169 to Step S174. In Step S174, it will be determined whether or not the maximum value SCM of the scale SC that indicates the water depth displayed on the fish finder screen described below exceeds 100 meters. The scale SC is automatically set in accordance with the terminal tackle water depth data LX. If the maximum value SCM exceeds 100 meters, the routine will move to Step S175, and an enlarged display will be performed. As shown in FIG. 37, this enlarged display will display, for example, the data ED2, ED3 and the graphic FL in corresponding water depth positions from half the water depth of the maximum value of the scale SC. In this way, the display can be enlarged even in a deep water depth location, and the display near the bottom will become easy to see.

Key Input Process

If the operation key unit 299, the adjustment lever 301, or the speed winding button 301 is operated, the routine will move from Step S136 to Step S143. In Step S143, the key input process in FIG. 33 will be performed. In the key input process, it will be determined whether or not the screen switch button 331 has been operated in Step S181 of FIG. 33. In Step S182, it will be determined whether or not the cursor button 332 has been operated. In Step S183, it will be determined whether or not the set button 333 has been operated. In Step S184, it will be determined whether or not the jig on/off button 334 has been operated. In Step S185, it will be determined whether or not the level ST operated by the adjustment lever 301 is zero. Here, when the level ST is zero, the routine will move to Step S186, and the motor 254 will stop (turn off). Note that when the motor 4 is already stopped, the motor 254 will be held as is in the stopped state. In Step S187, it will be determined whether or not other key operations have been performed, such as the operation of the speed winding button 302, the operation of the fish location memo button 334, and an extended pushing time operation. If other key operations have been performed, the routine will move from Step S187 to Step S200, and the processes corresponding to the operation will be performed. If the speed winding button 302 has been operated, the motor 254 will be controlled at a 95% duty ratio, for example, and when the fish location memo button 334 has been operated, the fish location and the bottom location will be set. For example, if the fish location memo button 334 is pushed for an extended period of time, the water depth LX of the terminal tackle will be set to the bottom location.

If the screen switch button 131 is operated, the routine will move from Step S181 to Step S190. Note that although not disclosed in Step S190, if the motor 254 of the electric reel 250 is rotating, the key input of the screen switch button 331 will have no effect. This is done so that the screen cannot be switched while the line is being wound up. In Step S190, it will be determined whether or not the screen switch button 331 has been pushed for an extended period of time (e.g., three seconds or greater). If the screen switch button 331 is pushed for an extended period of time, the water depth LX of the terminal tackle will be set to zero with a zero set process. Normally, when the terminal tackle reaches the water surface at the beginning of fishing, the fisherman will push the screen switch button 331 for an extended period of time and perform the zero set process. If the button is not pushed for an extended period of time, then the routine will move from Step S190 to Step S192. In Step S192, the screen can be switched and set to either the menu screen or the fish finder screen. Each time the screen switch button 331 is operated, this screen switching can be sequentially set between the menu screen 400 and the fish finder screen 420. The screen set in the display process will be displayed by these settings. When these processes are complete, the routine will move to Step S182.

If the cursor button 332 is operated, the routine will move from Step S182 to Step S193. In Step S193, the cursor will move one by one on the setting items and the setting details in the menu screen in response to the direction in which the cursor button 332 is operated. For example, the on/off state of the jig mode or the auto-jig mode will be set. If the jig mode or the auto-jig mode was set, the jig width SA described above can be set. When the jig width is to be set, the cursor will be moved to the location of the numerical value of the jig width, and the numerical value can be changed by operating the cursor button 332 up and down. In addition, when the jig pattern is to be set, when the cursor is moved to the display location of the jig pattern, text indicating pattern 1 to pattern 5 will be vertically displayed with a pop-up menu as described above, and when the cursor is placed on any of these and the set button 333 is pushed, that pattern will be selected. Note that if patterns 4 and 5 are to be selected, an additional jig pattern can be learned.

If the set button 333 is operated, the process will move from Step S183 to Step S194. In Step S194, it will be determined whether or not it is the fish finder screen 420. If it is the fish finder screen 420, then the routine will move to Step S195. In Step S195, it will be determined whether or not position correction has been set (turned on). If the position correction is set, then the routine will move to Step S196, and position correction will be performed. Here, if the set button 333 is operated during the fish finder screen, a correction initiation signal will be output and the correction process will be performed.

Normally, like in the first embodiment in which the fish finder monitor 120 is used, this operation will be performed when the terminal tackle water depth data LX of the terminal tackle greatly differs from the actual sea bottom data ED2 and an anomaly is produced.

If the position correction is turned off in Step S195, the routine will move to Step S184. If it is determined that it is not the fish finder screen 420, then the routine will move from Step S194 to Step S197. In Step S197, the details of the setting item selected with the cursor will be set and stored in the memory unit 317, and the routine will move to Step S184.

If the jig on/off button 355 is operated, the routine will move from Step S184 to Step S198. In Step 198, the jig mode will be set so as to turn the motor 254 on and off with the jig pattern set in the set jig width.

If the level ST of the adjustment lever 301 is not zero, the routine will move from Step S185 to Step S199. In Step S199, the motor drive process that is the same as that shown in FIG. 20 will be performed, and the routine will move to Step S187. In other words, the motor 254 will be speed controlled or torque controlled in accordance with the rotational angle of the adjustment lever 301. Note that only speed control may be performed, and only torque control may be performed.

Here, because the water depth data that will be displayed based upon the tackle water depth data LX of the tackle that is obtained from the electric reel 250 and the relatively accurate water depth data ED2 of the sea bottom that is obtained from the fish finder 140 can be corrected, and the corrected first water depth data will be displayed on the water depth display unit 298, the water depth of the tackle can be displayed more accurately even if the fishing line is curved due to tidal currents. However, in this situation, the terminal tackle water depth data LX prior to correction is already stored in the storage unit 317, and the zero set position and the boat side stop position in which the impact of the bending of the fishing line will rarely occur, will be controlled by the terminal tackle water depth data LX prior to correction.

In addition, in the second embodiment as well, in the jig mode or the auto-jig mode, when the jig width is set and jigging begins, the jig mode is performed in which on/off control is performed only between the set jig width that corresponds to the jig pattern. Thus, by setting the jig width to the width of the location where fish are gathered, a jigging operation can be performed only at the fish location with good efficiency and with a simple operation. Furthermore, because the jig operation will automatically complete when the line wind-up of the jig width is complete even if the jig operation has begun, excessive motor on/of control due to the winding up of the fishing line at the point of completion will no longer be necessary, and the line wind-up efficiency can be improved with a simple operation.

Other Embodiments (a) In the aforementioned embodiment, a hook was used to graphically symbolize the terminal tackle, but the shape of the symbol is not limited in the aforementioned embodiment. For example, it may be simply displayed with a round or square symbol.

(b) In the aforementioned embodiment, the position of the terminal tackle was displayed on the right side of the scale SC, but it may be displayed on the left side.

(c) In the aforementioned embodiment, position correction is performed by operation of the set button, but the configuration of the correction initiation is not limited to manual operation as in the aforementioned embodiment. For example, correction may be performed by observing the increase or decrease in the first water depth data, setting the deepest first water depth data during a particular period of time as the sea bottom on the electric driven reel 1 side, further comparing the deepest first water depth data to the second water depth data, and automatically outputting a correction initiation signal when the values of the first and second water depth data are at or above a predetermined value.

(d) In the two aforementioned embodiments, data from the fish finder 140 is received wirelessly, but may also be received via a wire.

Figure 39:
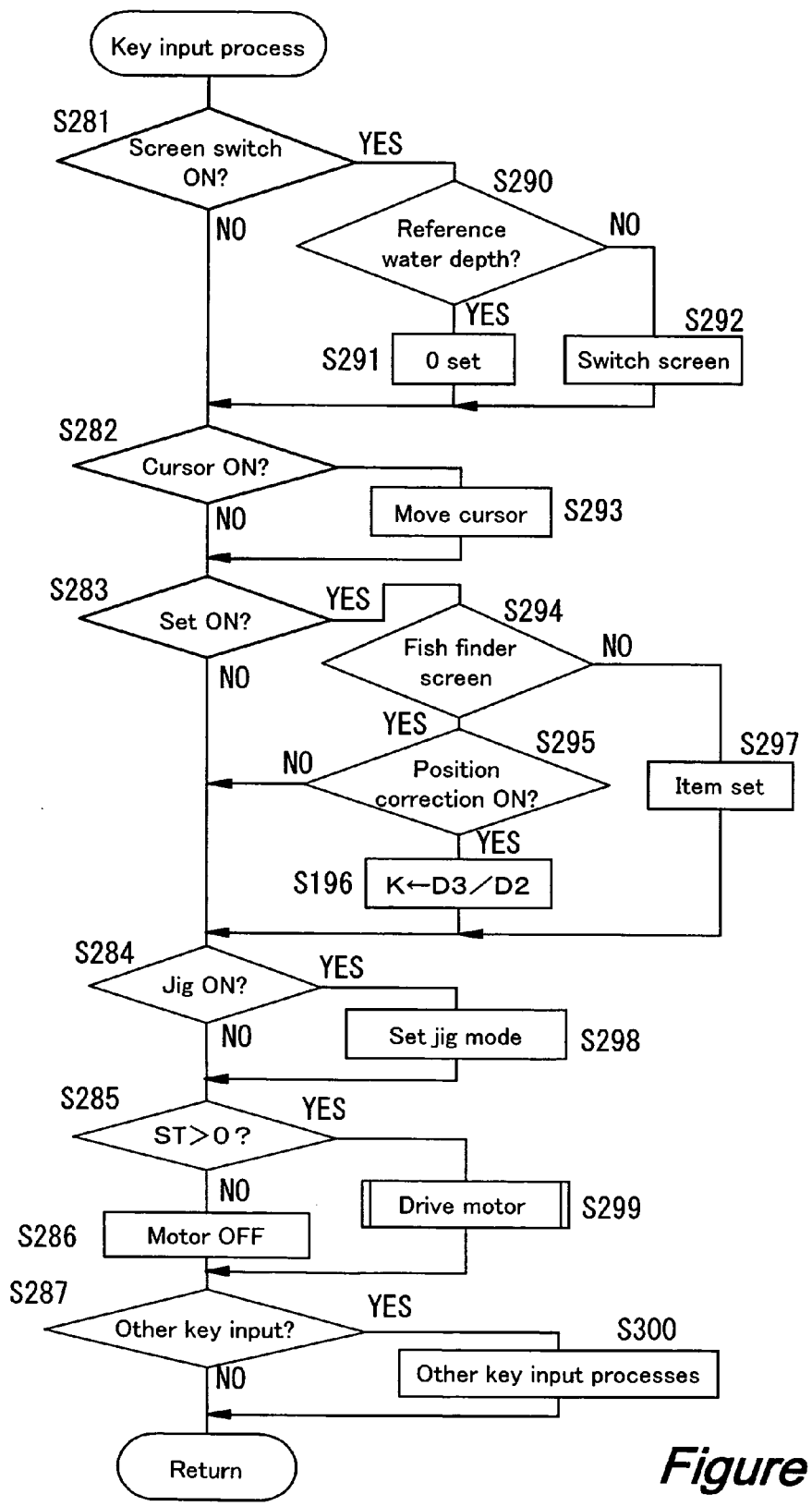
FIG. 39 is a control flowchart of a key input subroutine in accordance with still another embodiment of the present invention.

(e) In the two aforementioned embodiments, in the enlarged display mode, the fishing data was displayed from half the water depth of the bottom water depth. However, the display of the fishing data in the enlarged display mode is not limited to the aforementioned embodiments. For example, as seen in Step S290 of FIG. 39, a reference water depth may be set (e.g., 50 meters), and when the water depth is deeper than the reference water depth, the display may be enlarged with a magnification that differs in accordance with the water depth of the bottom. More specifically, if the water depth of the bottom is 80 meters, the display may be enlarged by 80/50=1.6 times.

(f) The method of correction is not limited in the aforementioned embodiment. For example, fishing line map data that is selected with the fish depth monitor may be stored, and correction may be performed with respect to that map data. In this situation, the value of the spool counter 42 may be received from the electric reel 10.

(g) In the aforementioned embodiment, in order to prevent interference when there are radio waves from a plurality of fish finders 80, the device was configured to receive the strongest radio waves and not receive the other radio waves. However, the frequency on the fish finder side may be changed, and a corresponding change can be made on the fish depth monitor side. In addition, identifying information can be set on the fish finder and the fish depth monitor in order to prevent interference.

Figure 38:
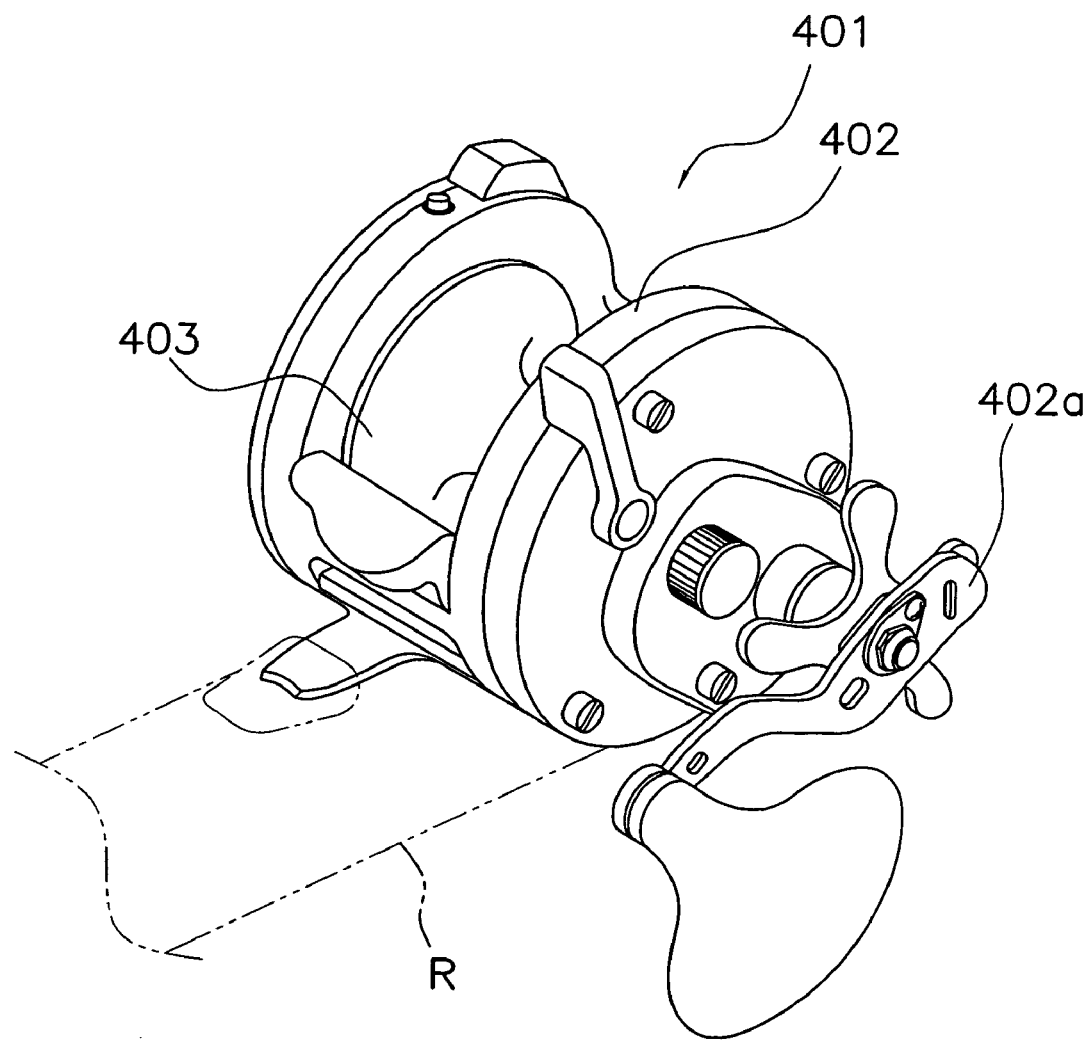
FIG. 38 is an oblique view of the electric reel in accordance with still another embodiment of the present invention.

(h) The electric reel is used for example in the aforementioned embodiment, however, the hand-winding dual bearing reel 401 as shown in FIG. 38 can be connected to the fishing data display device of the present invention. The dual bearing reel 401 includes a reel unit 402 to which a handle 402a is attached, and a spool 403 that is rotatively mounted to the reel unit 402, being possible to output data showing the location of the tackle of the dual bearing reel.

Although a counter including a display device for displaying water depth of a tackle is not provided in FIG. 38, a dual bearing reel provided with a counter can be applied to the present invention. In this case, similar to the second embodiment, various setting of a monitor and a reel can be performed from the fish finder 140 on the dual bearing reel side without employing a fish finder monitor.

According to the present invention, because the first water depth data that indicates the position of the tackle and the second water depth data that indicates the position of the bottom are graphically displayed, rather than as numerical values, so as to correspond to the water depth, positional relationship between the position of the tackle and the position of the bottom can be instantly recognized.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-405727, 2003-405726, 2004-009177. The entire disclosure of Japanese Patent Applications Nos. 2003-405727, 2003-405726, 2004-009177 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing data display device adapted to communicate with a fish finder and be operatively coupled to a fishing reel, a fishing line with a terminal tackle being adapted to be reeled out from a spool of the fishing reel, the fishing data display device comprising:
    a case;
    a first reception portion that is arranged in the case and is configured to receive from the fishing reel first water depth data that indicates a location of the terminal tackle;
    a second reception portion that is arranged in the case and is configured to receive from the fish finder second water depth data that indicates a location of a bottom of a fishing location, the second reception portion being further configured to recieve from the fish finder third water depth data that indicates a fish location at which fish are gathered;
    a display unit arranged in the case so as to be visible from an exterior; and
    a control unit operatively coupled to the first and second reception portions and the display unit, the control unit being configured to graphically display the first, second and third water depth data on the display unit, so as to show a positional relationship of the terminal tackle, the bottom of the fishing location and the fish location.

2. The fishing data display device set forth in claim 1, wherein
    the control unit is further configured to display at least one of the first and second water depth data as a numerical value on the display unit.

3. The fishing data display device set forth in claim 1, wherein
    the control unit is further configured to display the first, second and third water depth data on the display unit chronologically and graphically.

4. The fishing data display device set forth in claim 1, wherein
    the case is arranged separately on the fishing reel, and
    the fishing reel is adapted to transmit the first water depth data to the fishing data display device.

5. The fishing data display device set forth in claim 1, wherein
    the display unit is configured to assume one of a standard display mode and an enlarged display mode, and
    the control unit is configured to display each of the first, second and third water depth data in one of the standard display mode and the enlarged display mode so as to show a positional relationship of the terminal tackle, the bottom of the fishing location, and the fish location, and is further configured to switch to either the standard display mode or the enlarged display mode based on which of the first, second and third water depth data is being displayed.

6. The fishing data display device set forth in claim 5, further comprising:
    an operation key unit configured for operation by a fisherman,
    the control unit being configured to switch between the standard display mode and the enlarged display mode when the fisherman operates the operation key unit to request a mode switch.

7. The fishing data display device set forth in claim 5, wherein
    the control unit is configured to switch between the standard display mode and the enlarged display mode based on the second water depth data obtained from the fish finder.

8. The fishing data display device set forth in claim 5, wherein
    the control unit is further configured to display the first, second and third water depth data on the display unit chronologically and graphically, and
    when switched to the enlarged display mode, the control unit graphically displays the first water depth data that is in a range between half of a maximum water depth of the second water depth data and the maximum second water depth data.

9. A fishing data display device adapted to communicate with a fish finder and be operatively coupled to a fishing reel, a fishing line with a terminal tackle being adapted to be reeled out from a spool of the fishing reel, the fishing data display device comprising:
    a case;

a first reception portion that is arranged in the case and is configured to recieve from the fishing reel first water depth data that indicates a location of the terminal tackle;

a second reception portion that is arranged in the case and is configured to recieve from the fish finder second water depth data that indicates a location of a bottom of a fishing location;

a display unit arranged in the case so as to be visible from an exterior; and a control unit operatively coupled to the first and second reception portions and the display unit, the control unit being configured to graphically display the first second water depth data on the display unit, so as to show a positional relationship of the terminal tackle the bottom of the fishing location, the control unit being further configured to correct the first water depth data based on the second water depth data and obtain corrected first water depth data, and the control unit being further configured to display the corrected first water depth data on the display unit.

10. The fishing data display device set forth in claim 9, wherein;

the control unit is further configured to graphically display the corrected first water depth data on the display unit.

11. The fishing data display device set forth in claim 10, wherein the corrected first water depth data is obtained by first calculating a correction coefficient which is obtained by dividing the second water depth data with the first water depth data, and then multiplying the correction coefficient by the first water depth data.

12. The fishing data display device set forth in claim 10, wherein the control unit is configured to assume a position correction mode and to obtain the corrected first water depth data when the control unit is in the position correction mode.

13. The fishing data display device set forth in claim 9, further comprising an operation key unit that a fisherman is adapted to operate, the control unit being configured to assume the position correction mode when the fisherman operates the operation key unit and sets the position correction mode.

* * * * *